US009282186B2

(12) United States Patent
Siminoff

(10) Patent No.: US 9,282,186 B2
(45) Date of Patent: *Mar. 8, 2016

(54) SYSTEM AND METHOD FOR MODIFYING COMMUNICATION INFORMATION (MCI)

(71) Applicant: NobelBiz, Inc., Carlsbad, CA (US)

(72) Inventor: James Siminoff, Pacific Palisades, CA (US)

(73) Assignee: NobelBiz, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/030,384

(22) Filed: Sep. 18, 2013

(65) Prior Publication Data

US 2014/0029738 A1 Jan. 30, 2014

Related U.S. Application Data

(63) Continuation of application No. 13/676,546, filed on Nov. 14, 2012, now Pat. No. 8,565,399, which is a continuation of application No. 13/013,233, filed on Jan. 25, 2011, which is a continuation of application (Continued)

(51) Int. Cl.
*H04M 3/42* (2006.01)
*H04M 3/436* (2006.01)
*H04M 1/57* (2006.01)

(52) U.S. Cl.
CPC .............. *H04M 3/436* (2013.01); *H04M 1/57* (2013.01); *H04M 3/42059* (2013.01); *H04M 3/42068* (2013.01); *H04M 3/42195* (2013.01)
USPC ............ 379/201.01; 379/220.01; 379/221.01; 379/142.06

(58) Field of Classification Search
USPC .............. 379/201.01, 220.01, 221.01, 142.06
See application file for complete search history.

(56) References Cited

U.S. PATENT DOCUMENTS

| 3,727,003 | A | 4/1973 | Paraskevakos |
| 4,242,539 | A | 12/1980 | Hashimoto |
| 5,274,699 | A | 12/1993 | Ranz |
| 5,590,184 | A | 12/1996 | London |
| 5,740,538 | A | 4/1998 | Joyce et al. |

(Continued)

FOREIGN PATENT DOCUMENTS

WO 1997033418 A1 9/1997

OTHER PUBLICATIONS

Civil docket for *SafeSoft Solutions, Inc.* v. *NobelBiz, Inc.*, 2:13-cv-07915-ODW-CW (C.D. Ca.).

(Continued)

*Primary Examiner* — Quynh Nguyen
(74) *Attorney, Agent, or Firm* — White and Williams LLP

(57) ABSTRACT

A system for handling an outbound call from a call originator to a plurality of call targets, including a database storing a plurality of outgoing telephone numbers, each outgoing telephone number having one of two or more area codes. The system including an information processor configured to process at least an area code of a telephone number of the call targets, select from the database telephone numbers from the plurality of outgoing telephone numbers where the selected telephone numbers have at least an area code the same as the area code of the telephone number of the call targets, set caller identification data of the outbound calls to the selected telephone numbers, and transmit the caller identification data to the call targets in connection with the outbound calls.

28 Claims, 5 Drawing Sheets

Related U.S. Application Data

No. 11/584,176, filed on Oct. 20, 2006, now Pat. No. 7,899,169.

(60) Provisional application No. 60/728,717, filed on Oct. 20, 2005.

(56) References Cited

U.S. PATENT DOCUMENTS

| | | | |
|---|---|---|---|
| 5,784,444 | A | 7/1998 | Snyder |
| 5,864,612 | A | 1/1999 | Strauss et al. |
| 5,901,209 | A | 5/1999 | Tannenbaum et al. |
| 6,101,246 | A | 8/2000 | Heinmiller et al. |
| 6,137,870 | A | 10/2000 | Scherer |
| 6,343,120 | B1 | 1/2002 | Rhodes |
| 6,704,406 | B1 | 3/2004 | Pearce et al. |
| 6,714,535 | B1 | 3/2004 | Herh |
| 6,829,340 | B2 | 12/2004 | Wei |
| 6,975,718 | B1 * | 12/2005 | Pearce et al. ............ 379/221.01 |
| 7,020,256 | B2 | 3/2006 | Jain et al. |
| 7,027,575 | B1 | 4/2006 | Burgess |
| 7,551,731 | B2 | 6/2009 | Durga et al. |
| 7,640,009 | B2 | 12/2009 | Belkin et al. |
| 7,756,253 | B2 | 7/2010 | Breen et al. |
| 7,925,003 | B2 | 4/2011 | Haug, Jr. et al. |
| 7,925,033 | B2 | 4/2011 | Okazawa |
| 8,027,332 | B1 | 9/2011 | Martin et al. |
| 8,040,875 | B2 | 10/2011 | Barclay et al. |
| 2002/0061100 | A1 | 5/2002 | DiCamillo et al. |
| 2002/0080942 | A1 | 6/2002 | Clapper |
| 2002/0181681 | A1 | 12/2002 | Mani |
| 2003/0007616 | A1 | 1/2003 | Alves et al. |
| 2003/0147519 | A1 * | 8/2003 | Jain et al. ................ 379/211.02 |
| 2003/0198326 | A1 | 10/2003 | Wei |
| 2005/0053213 | A1 | 3/2005 | Giannoit |
| 2006/0045243 | A1 | 3/2006 | Durga et al. |
| 2006/0140200 | A1 | 6/2006 | Black et al. |
| 2007/0064895 | A1 | 3/2007 | Wong et al. |

OTHER PUBLICATIONS

Civil docket for *TCN v. NobelBiz, Inc.*, 2:13-cv-00969-BCW (D. Utah).
Civil docket for *Global Connect, LLC v. NobelBiz, Inc.*, 2:13-cv-01938-GMN-PAL (D. Nev.).
Exhibit A4, LiveVox's Prior Art Invalidity Chart—U.S. Appl. No. 11/286,310 to Black et al. ("Black '310").
Exhibit A5, LiveVox's Prior Art Invalidity Chart—U.S. Pat. No. 7,756,253 to Breen et al. ("Breen '253").
Exhibit A6, LiveVox's Prior Art Invalidity Chart—U.S. Pat. No. 7,027,575 to Burgess ("'Burgess 575").
Exhibit A7, LiveVox's Prior Art Invalidity Chart—U.S. Appl. No. 09/745,703 to Clapper ("Clapper '703").
Exhibit A8, LiveVox's Prior Art Invalidity Chart—U.S. Appl. No. 10/665,880 to Giannoit ("Giannoit '880").
Exhibit A9, LiveVox's Prior Art Invalidity Chart—U.S. Pat. No. 7,027,575 to Haug ("Haug '003").
Exhibit A10, LiveVox's Prior Art Invalidity Chart—U.S. Pat. No. 7,925,003 to Herh ("Herh '003").
Exhibit A11, LiveVox's Prior Art Invalidity Chart—U.S. Pat. No. 7,020,256 to Jain et al. ("Jain '256").
Exhibit A12, LiveVox's Prior Art Invalidity Chart—U.S. Pat. No. 5,740,538 to Joyce et al. ("Joyce '538").
Exhibit A13, LiveVox's Prior Art Invalidity Chart—U.S. Pat. No. 5,590,184 to London ("London '184").
Exhibit A14, LiveVox's Prior Art Invalidity Chart—U.S. Pat. No. 8,027,332 to Martin et al. ("Martin '332").
Exhibit A15, LiveVox's Prior Art Invalidity Chart—star38.com.
Exhibit A16, LiveVox's Prior Art Invalidity Chart—U.S. Pat. No. 5,901,209 to Tannenbaum et al. ("Tannenbaum '209").
Exhibit A17, LiveVox's Prior Art Invalidity Chart—Torrone, "Questions About the Caller I.D. Falsification (Caller ID Spoofing) Service Answered . . .," Aug. 31, 2004 <http://www.engadget.com/2004/08/31/questions-about-the-caller-i-d-falsification-callerid/ >("Torrone").
Exhibit A18, LiveVox's Prior Art Invalidity Chart—U.S. Appl. No. 11/223,649 to Wong et al. ("Wong '649").
Exhibit A19, LiveVox's Prior Art Invalidity Chart—U.S. Pat. No. 6,975,718 to Pearce ("Pearce '718").
Exhibit B1, LiveVox's Prior Art Invalidity Chart—U.S. Appl. No. 09/737,137 to Dicamillo et al. ("Dicamillo '137").
Exhibit B2, LiveVox's Obviousness Prior Art Chart.
Global Connect, L.L.C.'s Disclosures of Invalidity Contentions and Accompanying Document Production, Apr. 26, 2013, 6:12-cv-00244-MHS (E.D. Tex. 2012).
TCN, Inc.'s Invalidity Contentions, Apr. 26, 2013, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).
Five 9, Inc.'s Disclosure of Invalidity Contentions, May 13, 2013, *NobelBiz, Inc.* v. *Five 9, Inc*, 4:13-cv-01846-YGR (N. D. Cal. 2013).
LiveVox, Inc.'s Disclosure of Invalidity Contentions, May 13, 2013, *NobelBiz, Inc.* v. *LiveVox, Inc.*, 4:13-Cv-01773-YGR (N.D. Cal. 2013).
Exhibit A, Global Connect's Representative Claim Chart (Invalidity) for Global Connect's 2004 System.
Exhibit B, Global Connect's Representative Claim Chart (Invalidity) for Sep. 2004 GC Users Guide.
Exhibit C, Global Connect's Representative Claim Chart (Invalidity) for U.S. Pat. No. 7,640,009 to Belkin et al. ("Belkin '009 Patent").
Exhibit D, Global Connect's Representative Claim Chart (Invalidity) for U.S. Pat. No. 8,027,332 to Martin et al. ("Martin '332 Patent").
Exhibit E, Global Connect's Representative Claim Chart (Invalidity) for U.S. Pat. No. 5,901,209 to Tannenbaum et al. ("Tannenbaum '209 Patent").
Exhibit F, Global Connect's Representative Claim Chart (Invalidity) for U.S. Pat. No. 7,925,003 to Haug, Jr. et al. ("Haug, Jr. '003 Patent").
Exhibit G, Global Connect's Representative Claim Chart (Invalidity) for U.S. Appl. No. 11/286,3101 to Black et al. ("Black '310 Application").
Exhibit H, Global Connect's Representative Claim Chart (Invalidity) for U.S. Pat. No. 7,756,253 to Breen et al. ("Breen '253 Patent").
Exhibit I, Global Connect's Representative Claim Chart (Invalidity) for U.S. Pat. No. 5,590,184 to Thomas B. London ("London '184 Patent").
Exhibit J, Global Connect's Representative Claim Chart (Invalidity) for U.S. Appl. No. 10/655,8801 to Jim Giannoit ("Giannoit '880 Application").
Exhibit K, Global Connect's Representative Claim Chart (Invalidity) for Torrone, Phillip, "Questions About the Caller ID Falsification(Caller ID Spoofing) Service Answered . . ." www.engadget.com (Aug. 31, 2004). ("Torrone").
Exhibit A.1 TCN's Claim Chart for Belkin (U.S. Pat. No. 7,640,009).
Exhibit A.2 TCN's Claim Chart for Black (U.S. 2006/0140200).
Exhibit A.3 TCN's Claim Chart for Breen (U.S. Pat. No. 7,756,253).
Exhibit A.4 TCN's Claim Chart for Giannoit (U.S. 2005/0053213).
Exhibit A.5 TCN's Claim Chart for Haug, Jr. (U.S. Pat. No. 7,925,003).
Exhibit A.6 TCN's Claim Chart for Joyce (U.S. Pat. No. 5,740,538).
Exhibit A.7 TCN's Claim Chart for London (U.S. Pat. No. 5,590,184).
Exhibit A.8 TCN's Claim Chart for Martin (U.S. Pat. No. 8,027,332).
Exhibit A.9 TCN's Claim Chart for Tannenbaum (U.S. Pat. No. 5,901,209).
Exhibit A.10 TCN's Claim Chart for Torrone (Questions about the Caller ID falsification service answered, www.engadget.com (Aug. 31, 2004).
Exhibit A.11 TCN's Claim Chart for TCN, Inc.'S 2004 System.
Exhibit A1, Five9's Prior Art Invalidity Chart - Ringcentral.
Exhibit A2, Five9's Prior Art Invalidity Chart — U.S. Appl. No. 09/898,787 to Alves et al. ("Alves '787").
Exhibit A3, Five9's Prior Art Invalidity Chart — U.S. Pat. No. 7,640,009 to Beklin ("Belkin '009").
Exhibit A4, Five9's Prior Art Invalidity Chart — U.S. Appl. No. 11/286,310 to Black et al. ("Black '310").

(56) References Cited

OTHER PUBLICATIONS

Exhibit A5, Five9's Prior Art Invalidity Chart — U.S. Pat. No. 7,756,253 to Breen et al. ("Breen '253").
Exhibit A6, Five9's Prior Art Invalidity Chart — U.S. Pat. No. 7,027,575 to Burgess ("Burgess '575").
Exhibit A7, Five9's Prior Art Invalidity Chart — U.S. Appl. No. 09/745,703 to Clapper ("Clapper '703").
Exhibit A8, Five9's Prior Art Invalidity Chart — U.S. Appl. No. 10/665,880 to Giannoit ("Giannoit '880").
Exhibit A9, Five9's Prior Art Invalidity Chart — U.S. Pat. No. 7,027,575 to Haug ("Haug '003").
Exhibit A10, Five9's Prior Art Invalidity Chart — U.S. Pat. No. 7,925,003 to Herh ("Herh '003").
Exhibit A11, Five9's Prior Art Invalidity Chart — U.S. Pat. No. 7,020,256 to Jain et al. ("Jain '256").
Exhibit A12, Five9's Prior Art Invalidity Chart — U.S. Pat. No. 5,740,538 to Joyce et al. ("Joyce '538").
Exhibit A13, Five9's Prior Art Invalidity Chart — U.S. Pat. No. 5,590,184 to London ("London '184").
Exhibit A14, Five9's Prior Art Invalidity Chart — U.S. Pat. No. 8,027,332 to Martin et al. ("Martin '332").
Exhibit A15, Five9's Prior Art Invalidity Chart — star38.com.
Exhibit A16, Five9's Prior Art Invalidity Chart — U.S. Pat. No. 5,901,209 to Tannenbaum et al. ("Tannenbaum '209").
Exhibit A17, Five9's Prior Art Invalidity Chart — Torrone, "Questions About the Caller I.D. Falsification (Caller ID Spoofing) Service Answered . . .," Aug. 31, 2004 <http://www.engadget.com/2004/08/31/questions-about-the-caller-i-d-falsification-callerid/ >("Torrone");.
Exhibit A18, Five9's Prior Art Invalidity Chart — U.S. Appl. No. 11/223,649 to Wong et al. ("Wong '649").
Exhibit A19, Five9's Prior Art Invalidity Chart—U.S. Pat. No. 6,975,718 to Pearce ("Pearce '718").
Exhibit B1, Five9's Prior Art Invalidity Chart—U.S. Appl. No. 09/737,137 to Dicamillo et al. ("Dicamillo '137").
Exhibit B2, Five9's Obviousness Prior Art Chart.
Exhibit A1, LiveVox's Prior Art Invalidity Chart—Ringcentral.
Exhibit A2, LiveVox's Prior Art Invalidity Chart—U.S. Appl. No. 09/898,787 to Alves et al. ("Alves '787").
Exhibit A3, LiveVox's Prior Art Invalidity Chart—U.S. Pat. No. 7,640,009 to Beklin ("Belkin '009").
Plaintiff Nobelbiz, Inc.'S Notice of Compliance With the Court'S Scheduling and Discovery Order for Trial on the Merits, Jan. 31, 2014, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
Plaintiff Nobelbiz, Inc.'S Notice of Compliance With the Court'S Scheduling and Discovery Order for Trial on the Merits—Exhibit A—Letter to the Honorable Michael H. Schneider regarding permission to file summary judgment motions.
Order on Letter Briefs, Feb. 3, 2014, *Nobelbiz, Inc.* v. *Global Connect, L.L.C.*, 6:12-cv-244 (E.D. Tex.) and *Nobelbiz, Inc.* v. *T C N, INC.* 6:12-cv-247 (E.D. Tex.).
Notice of Compliance With the Court'S Limitations on Motion Practice, Feb. 14, 2014, *Nobelbiz, Inc.* v. *Global Connect, L.L.C.*, 6:12-cv-244 (E.D. Tex.) and *Nobelbiz, Inc.* v. *T C N, Inc.* 6:12- cv-247 (E.D. Tex.).
Notice of Compliance With the Court's Limitations on Motion Practice—Exhibit A—Letter to the Honorable Michael H. Schneider regarding Answering Letter Brief Opposing Request to File Motion(s) for Summary Judgment.
Plaintiff Nobelbiz, Inc.'S Request to File a Motion to Strike and Daubert Motion Regarding TCN's Invalidity Expert Report and Testimony, Feb. 14, 2014, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
Plaintiff Nobelbiz, Inc.'s Request to File a Motion to Strike and Daubert Motion Regarding TCN's Invalidity Expert Report and Testimony—Exhibit A—Letter to the Honorable Michael H. Schneider regarding Answering Letter Brief Opposing Request to File Motion(s) for Summary Judgment.permission to file Daubert motions had passed.
Plaintiff Nobelbiz, Inc.'s Notice of Compliance With the Court's Scheduling and Discovery Order for Trial on the Merits, Feb. 19, 2014, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
Plaintiff Nobelbiz, Inc.'s Notice of Compliance With the Court's Scheduling and Discovery Order for Trial on the Merits—Letter to the Honorable Michael H. Schneider regarding NobelBiz's further support of its request to move for summary judgment.
Notice of Compliance With the Court's Limitations on Motion Practice, Feb. 24, 2014, *Nobelbiz, Inc.* v. *Global Connect, L.L.C.*, 6:12-cv-244 (E.D. Tex.) and *Nobelbiz, Inc.* v. *T C N, Inc.* 6:12- cv-247 (E.D. Tex.).
Notice of Compliance With the Court's Limitations on Motion Practice—Exhibit A—Letter to the Honorable Michael H. Schneider regarding Answering Letter Brief Opposing Request to Challenge Expert Witness.
Plaintiff Nobelbiz, Inc.'s Notice of Compliance With the Court's Scheduling and Discovery Order for Trial on the Merits, Feb. 25, 2014, *Nobelbiz, Inc.* v. *Global Connect, L.L.C.*, 6:12- cv-244 (E.D. Tex.) and *Nobelbiz, Inc.* v. *T C N, Inc.* 6:12-cv-247 (E.D. Tex.).
Plaintiff Nobelbiz, Inc.'s Notice of Compliance With the Court's Scheduling and Discovery Order for Trial on the Merits—Exhibit A—Letter to the Honorable Michael H. Schneider regarding NobelBiz, Inc. further support of its request to strike Defendants' expert report and testimony.
Defendant's Notice of Withdrawal of the Disclosure of the Identity of Jesse Bird Pursuant to Fed. R. Civ. P. 26(a)(2), Mar. 6, 2014, *Nobelbiz, Inc.* v. *Global Connect, L.L.C.*, 6:12- cv-244 (E.D. Tex.) and *Nobelbiz, Inc.* v. *T C N, Inc.* 6:12-cv-247 (E.D. Tex.).
Proposed Third Amended Scheduling and Discovery Order for Trial on the Merits, Mar. 10, 2014, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
Proposed Third Amended Scheduling and Discovery Order for Trial on the Merits—Exhibit A: NobelBiz's Proposed Consolidated Schedule.
Proposed Third Amended Scheduling and Discovery Order for Trial on the Merits—Exhibit B: Defendants' Proposed Consolidated Schedule.
Answer to Complaint Filed in Case No. 6:13-Cv-805, Mar. 12, 2014, *Nobelbiz, Inc.* v. *Global Connect, L.L.C.*, 6:12-cv-244 (Ed. Tex.) and *Nobelbiz, Inc.* v. *T C N, Inc.* 6:12-cv-247 (E.D. Tex.).
Plaintiff Nobelbiz, Inc.'S Answer to Defendant T C N, Inc.'S Counterclaims, Mar. 31, 2014, *Nobelbiz, Inc.* v. *Global Connect, L.L.C.*, 6:12-cv-244 (E.D. Tex.) and *Nobelbiz, Inc.* v. *T C N, Inc.* 6:12- cv-247 (E.D. Tex.).
Third Amended Scheduling and Discovery Order for Trial on the Merits, Apr. 9, 2014, *Nobelbiz, Inc.* v. *Global Connect, L.L.C.*, 6:12-cv-244 (E.D. Tex.) and *Nobelbiz, Inc.* v. *T C N, Inc.* 6:12- cv-247 (E.D. Tex.).
T C N, Inc.'S Disclosure of the Identity of Jesse Bird Pursuant to Fed. R. Civ. P. 26(a)(2), Feb. 14, 2014, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
T C N, Inc.'S Disclosure of the Identity of Jesse Bird Pursuant to Fed. R. Civ. P. 26(a)(2) - Exhibit B.1 — Belkin (U.S. Pat. No. 7,640,009).
T C N, Inc.'S Disclosure of the Identity of Jesse Bird Pursuant to Fed. R. Civ. P. 26(a)(2) - Exhibit B.2 — Black (U.S. 2006/0140200).
T C N, Inc.'S Disclosure of the Identity of Jesse Bird Pursuant to Fed. R. Civ. P. 26(a)(2) - Exhibit B.3 — Breen (U.S. Pat. No. 7,756,253).
T C N, Inc.'S Disclosure of the Identity of Jesse Bird Pursuant to Fed. R. Civ. P. 26(a)(2) - Exhibit B.4 — Giannoit (U.S. 2005/0053213).
T C N, Inc.'S Disclosure of the Identity of Jesse Bird Pursuant to Fed. R. Civ. P. 26(a)(2) - Exhibit B.5 — Haug, Jr. (U.S. Pat. No. 7,925,003).
T C N, Inc.'S Disclosure of the Identity of Jesse Bird Pursuant to Fed. R. Civ. P. 26(a)(2) - Exhibit B.6 — Joyce (U.S. Pat. No. 5,740,538).
T C N, Inc.'S Disclosure of the Identity of Jesse Bird Pursuant to Fed. R. Civ. P. 26(a)(2) - Exhibit B.7 — London (U.S. Pat. No. 5,590,184).

(56) References Cited

OTHER PUBLICATIONS

T C N, Inc.'S Disclosure of the Identity of Jesse Bird Pursuant to Fed. R. Civ. P. 26(a)(2) - Exhibit B.8 — Martin (U.S. Pat. No. 8,027,332).
T C N, Inc.'S Disclosure of the Identity of Jesse Bird Pursuant to Fed. R. Civ. P. 26(a)(2) - Exhibit B.9 — Tannenbaum (U.S. Pat. No. 5,901,209).
T C N, Inc.'S Disclosure of the Identity of Jesse Bird Pursuant to Fed. R. Civ. P. 26(a)(2) -Exhibit B.10 — Torrone (Questions about the Caller ID falsification service answered, www.engadget.corn (Aug. 31, 2004)).
T C N, Inc.'S Disclosure of the Identity of Jesse Bird Pursuant to Fed. R. Civ. P. 26(a)(2) - Exhibit B.11 — TCN, Inc.'S 2004 System.
TCN Inc'S Initial Disclosures Pursuant to Fed. R. Civ. P. 26(a)(1), Apr. 26, 2013, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
TCN Inc.'S Supplemental Initial Disclosures in View of U.S. Pat. No. 8,565,399 and Pursuant to Fed. R. Civ. P. 26(a)(1), Mar. 12, 2014, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
TCN, Inc.'S Supplemental Invalidity Contentions in View of U.S. Pat. No. 8,565,399, Mar. 12, 2014, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
http://en.wikipedia.org/wiki/Caller_ID.
http://en.wikipedia.org/wiki/Asterisk_(PBX).
Trubow, George B., "Caller ID: Harbinger of Privacy Invasion to Come?", IEEE Software 8:5, (Sep. 1991), pp. 97-99.
Powers, Ray, "Calling Name Delivery", IEEE International Conference on Communications, Jun. 1992, vol. 4, pp. 1908-1913.
Hashimoto, Kazuo, "Fight heats up over patents on Caller ID", http://www.highbeam.com/doc/1G1-16909535.html (Communication News, Apr. 1, 1995).
Michael W. Link and Robert W. Oldendick, "Call Screening: Is It Really a Problem for Survey Research?", The Public Opinion Quarterly, vol. 63, No. 4 (Winter, 1999), pp. 577-589.
Leysia Palen, Marilyn Salzman, Ed Youngs, "Going wireless: behavior & practice of new mobile phone users", Proceedings of the 2000 ACM conference on Computer supported cooperative work, Dec. 2000.
http://lists.digium.com/pipermail/asterisk-users/2005-June/106480. html. This version can be downloaded at http://lists.digium.com/pipermail/asterisk-users/2005-June/106480.html.
Hardy, Quentin, "Dial D for Disruption", http://www.forbes.com/forbes/200610410/063.html (Forbes, Mar. 24, 2006).
Memorandum in Opposition to Plaintiff's Application for Preliminary Injunction—Exhibit B—Nobelbiz Brochure.
Memorandum in Opposition to Plaintiff's Application for Preliminary Injunction—Exhibit C—Nobelbiz Brochure.
Defendant T.C.N., Inc.'S Answer, May 25, 2012, *NobelBiz, Inc.* v. *TCN, Inc.*, Civil No. 6:12-cv-00247-LED (E.D. Tex.).
Joint Discovery/Case Management Plan, Mar. 14, 2013, *Nobelbiz, Inc.* v. *Five 9, Inc.*, 6:12-cv-243 (E. D. Tex.), *Nobelbiz, Inc.* v. *Global Connect, L.L.C.*, 6:12-cv-244 (E.D. Tex.), *Nobelbiz, Inc.* v. *Livevox, Inc.* (E.D. Tex.) and *Nobelbiz, Inc.* v. *T C N, Inc.* 6:12-cv-247 (E.D. Tex.).
Order, Apr. 24, 2013, *Nobelbiz, Inc.* v. *T C N, Inc.* 6:12-cv-247 (E.D. Tex.).
Answer to Amended Complaint, May 9, 2013, *Nobelbiz, Inc.* v. *T C N, Inc.* 6:12-cv-247 (E.D. Tex.).
Joint Claim Construction and Prehearing Statement (P.R. 4-3), Jun. 28, 2013, *Nobelbiz, Inc.* v. *Global Connect, L.L.C.*, 6:12-cv-244 (E.D. Tex.) and *Novelbiz, Inc.* v. *T C N, Inc.* 6:12-cv-247 (E.D. Tex.).
Joint Claim Construction and Prehearing Statement (P.R. 4-3), Exhibit A—Jun. 28, 2013, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
Nobelbiz's Opening Claim Construction Brief, Aug. 12, 2013, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).

Defendants' Joint Claim Construction Brief, Aug. 28, 2013, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
Declaration of Ross Spencer Garsson in Support of Defendants' Joint Claim Construction Brief, Aug. 28, 2013, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
Declaration of Ross Spencer Garsson in Support of Defendants' Joint Claim Construction Brief—Exhibit 1—true and correct copy of the Notice of Allowability of the '122 Patent application, mailed Jan. 31, 2013 (which Notice included an Applicant-Initiated Interview Summary with an Examiners Amendment).
Declaration of Ross Spencer Garsson in Support of Defendants' Joint Claim Construction Brief—Exhibit 2A—true and correct copies of excerpts from the Free Dictionary, from American Heritage Dictionary of the English Language (4th Ed.Houghton Miffin Co.) (2000).
Declaration of Ross Spencer Garsson in Support of Defendants' Joint Claim Construction Brief—Exhibit 3A—true and correct copies of excerpts from the Merriam-Webster's Collegiate Dictionary (10th Ed. Merriam-Webster, Incorporated) (1998).
Declaration of Ross Spencer Garsson in Support of Defendants' Joint Claim Construction Brief—Exhibit 3B—true and correct copies of excerpts from the Merriam-Webster's Collegiate Dictionary (10th Ed. Merriam-Webster, Incorporated) (1998).
Declaration of Ross Spencer Garsson in Support of Defendants' Joint Claim Construction Brief—Exhibit 3C—true and correct copies of excerpts from the Merriam-Webster's Collegiate Dictionary (10th Ed. Merriam-Webster, Incorporated) (1998).
Declaration of Ross Spencer Garsson in Support of Defendants' Joint Claim Construction Brief—Exhibit 4—true and correct copies of excerpts from the Merriam-Webster's Collegiate Dictionary (10th Ed. Merriam-Webster, Incorporated) (1998).
Declaration of Ross Spencer Garsson in Support of Defendants' Joint Claim Construction Brief—Exhibit 5A-5E—are true and correct copies of excerpts from Dictionary.com.
Defendants' Motion for Partial Summary Judgment of Indefiniteness of Claims 6-24 of U.S. Pat. No. 8,135,122, Aug. 28, 2013, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
Declaration of Clinton E. Duke in Support of Defendants' Motion for Partial Summary Judgment of Indefiniteness of Claims 6-24 of U.S. Pat. No. 8,135,122, Aug. 28, 2013, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
Declaration of Clinton E. Duke in Support of Defendants' Motion for Partial Summary Judgment of Indefiniteness of Claims 6-24 of U.S. Pat. No. 8,135,122—Exhibit A—true and correct copy of U.S. Pat. No. 8,135,122.
Declaration of Clinton E. Duke in Support of Defendants' Motion for Partial Summary Judgment of Indefiniteness of Claims 6-24 of U.S. Pat. No. 8,135,122—Exhibit B—true and correct copy of an excerpt from the prosecution history file for U.S. Appl. No. 13/294,486, which issued as U.S. Pat. No. 8,135,122.
Declaration of Clinton E. Duke in Support of Defendants' Motion for Partial Summary Judgment of Indefiniteness of Claims 6-24 of U.S. Pat. No. 8,135,122—Exhibit C—true and correct copy of the web page at http://dictionary.reference.com/browse/geographic region which was accessed on May 23, 2013 and produced to the plaintiff in the above-captioned action.
Declaration of Clinton E. Duke in Support of Defendants' Motion for Partial Summary Judgment of Indefiniteness of Claims 6-24 of U.S. Pat. No. 8,135,122—Exhibit D—true and correct copy of the web page at http://dictionary.reference.com/browse/region which was accessed on May 23, 2013 and produced to the plaintiff in the above-captioned action.
Declaration of Clinton E. Duke in Support of Defendants' Motion for Partial Summary Judgment of Indefiniteness of Claims 6-24 of U.S. Pat. No. 8,135,122—Exhibit E—true and correct copy of the web page at http://merriam-webster.comldictionary/region which was accessed on May 23, 2013 and produced to the plaintiff in the above-captioned action.
Declaration of Clinton E. Duke in Support of Defendants' Motion for Partial Summary Judgment of Indefiniteness of Claims 6-24 of U.S.

(56) References Cited

OTHER PUBLICATIONS

Pat. No. 8,135,122—Exhibit F—true and correct copy of the district court's opinion in *Matlink, Inc.* v. *Home Depot U.S.A., Inc.*, 07-CV-1994 DMS BLM, 2008 WL 8504768 (S.D. Cal. Sep. 18, 2008).
Order Granting Defendants' Motion for Partial Summary Judgment of Indefiniteness of Claims 6-24 of U.S. Pat. No. 8,135,122, Aug. 28, 2013, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
Nobelbiz's Opposition to Defendants' Motion for Summary Judgment of Indefiniteness, Sep. 11, 2013, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
Order Denying Defendants' Motion for Summary Judgment of Indefiniteness, Sep. 11, 2013, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
Nobelbiz's Claim Construction Reply Brief, Sep. 11, 2013, *Nobelbiz, Inc.* v. *Global Connect, L.L.C.*, 6:12-cv-244 (Ed. Tex.) and *Nobelbiz, Inc.* v. *T C N, Inc.* 6:12-cv-247 (E.D. Tex.).
Joint Claim Construction Chart, U.S. Pat. No. 8,135,122, Sep. 18, 2013, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
Defendants' Reply in Support of Their Motion for Partial Summary Judgment of Indefiniteness of Claims 6-24 of U.S. Pat. No. 8,135,122, Sep. 18, 2013, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
Defendants' Additional Briefing As Requested by the Court, Oct. 16, 2013, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
Nobelbiz's Response to the Court'S Claim Construction Question, Oct. 16, 2013, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
Nobelbiz's Response to the Court's Claim Construction Question—Exhibit A—Order—*Input/Output, Inc.* and *I/O Sensors, Inc.*, v. *Sercel, Inc.*, 5:06-Cv-236 (E.D.Tex.).
Nobelbiz's Response to the Court's Claim Construction Question—Exhibit B—Order—*the Western Union Company* v. *Moneygram International, Inc.*, A-07-CA-372-SS (W.D.Tex.).
Order Denying Defendants' Motion for Partial Summary Judgment of Indefiniteness, Dec. 13, 2013, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
Memorandum Opinion and Order, Dec. 13, 2013, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
Memorandum Opinion and Order—Attachment A—the Court adopts the constructions set forth above and summarized in Attachment A.
Notice of Compliance With the Court's Limitations on Motion Practice, Jan. 10, 2014, *Nobelbiz, Inc.* v. *Global Connect, L.L.C.*, 6:12-cv-244 (E.D. Tex.) and *Nobelbiz, Inc.* v. *T C N, Inc.* 6:12- cv-247 (E.D. Tex.).
Notice of Compliance With the Court's Limitations on Motion Practice—Exhibit A—Letter to The Honorable Michael H. Schneider regarding Letter Brief Requesting Leave to File Motion(s) for Summary Judgment.
Plaintiff Nobelbiz, Inc.'s Notice of Compliance With the Court's Scheduling and Discovery Order for Trial on the Merits, Jan. 24, 2014, *Nobelbiz, Inc.* v. *Global Connect, L.L.C.*, 6:12- cv-244 (E.D. Tex.) and *Nobelbiz, Inc.* v. *T C N, Inc.* 6:12-cv-247 (E.D. Tex.).
Plaintiff Nobelbiz, Inc.'s Notice of Compliance With the Court's Scheduling and Discovery Order for Trial on the Merits—Exhibit—Letter to The Honorable Michael H. Schneider regarding request that the Court deny TCN, Inc.'s request for permission to file a motion for summary judgment on the issues of non-infringement and invalidity of all claims of U.S. Pat. No. 8,135,122 ("The '122 patent"), and no lost profits damages.
Reply to Notice of Compliance With the Court's Limitations on Motion Practice, Jan. 31, 2014, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
Reply to Notice of Compliance With the Court'S Limitations on Motion Practice, Jan. 31, 2014—Exhibit A—Letter to The Honorable Michael H. Schneider regarding Letter Brief Requesting Leave to File Motion(s) for Summary Judgment.
LiveVox, Inc.'s Disclosure of Invalidity Contentions Re U.S. Pat. No. 8,565,399, Feb. 6, 2014, *NobelBiz, Inc.* v. *LiveVox, Inc.*, 4:13-CV-01773-YGR (n.D. Cal. 2013).
LiveVox, Inc.'s Disclosure of Invalidity Contentions Re U.S. Pat. No. 8,565,399, Exhibit A1, '399 Patent Prior Art Chart—Ringcentral.
LiveVox, Inc.'s Disclosure of Invalidity Contentions Re U.S. Pat. No. 8,565,399, Exhibit A2, Prior ,399 Patent Art Chart—U.S. Appl. No. 09/898,787 to Alves et al. ("Alves ,787").
LiveVox, Inc.'s Disclosure of Invalidity Contentions Re U.S. Pat. No. 8,565,399, Exhibit A3, '399 Patent Prior Art Chart—U.S. Pat. No. 7,640,009 to Beklin ("Belkin •009").
LiveVox, Inc.'s Disclosure of Invalidity Contentions Re U.S. Pat. No. 8,565,399, Exhibit A4, 399 Patent Prior Art Chart—U.S. Appl. No. 11/286,310 to Black et al. ("Black ,310").
LiveVox, Inc.'s Disclosure of Invalidity Contentions Re U.S. Pat. No. 8,565,399, Exhibit A5, 399 Patent Prior Art Chart - U.S. Pat. No. 7,756,253 to Breen et al ("Breen ,253").
LiveVox, Inc.'s Disclosure of Invalidity Contentions Re U.S. Pat. No. 8,565,399, Exhibit A6, 399 Patent Prior Art Chart—U.S. Pat. No. 7,027,575 to Burgess (",Burgess 575").
LiveVox, Inc.'s Disclosure of Invalidity Contentions Re U.S. Pat. No. 8,565,399, Exhibit A7, 399 Patent Prior Art Chart—U.S. Appl. No. 09/745,703 to Clapper ("Clapper ,703").
LiveVox, Inc.'s Disclosure of Invalidity Contentions Re U.S. Pat. No. 8,565,399, Exhibit A9, 399 Patent Prior Art Chart—U.S. Pat. No. 7,925,003 to Haug ("Haug ,003").
LiveVox, Inc.'s Disclosure of Invalidity Contentions Re U.S. Pat. No. 8,565,399, Exhibit A10, 399 Patent Prior Art Chart—U.S. Pat. No. 6,714,535 to Herh ("Herh ,535").
LiveVox, Inc.'s Disclosure of Invalidity Contentions Re U.S. Pat. No. 8,565,399, Exhibit All, 399 Patent Prior Art Chart—U.S. Pat. No. 7,020,256 to Jain et al. ("Jain ,256").
LiveVox, Inc.'s Disclosure of Invalidity Contentions Re U.S. Pat. No. 8,565,399, Exhibit A12—399 Patent Prior Art Chart—U.S. Pat. No. 5,740,538 to Joyce et al ("Joyce ,538").
LiveVox, Inc.'s Disclosure of Invalidity Contentions Re U.S. Pat. No. 8,565,399, Exhibit A14—399 Patent Prior Art Chart—U.S. Pat. No. 8,027,332 to Martin et al. ("Martin ,332").
LiveVox, Inc.'s Disclosure of Invalidity Contentions Re U.S. Pat. No. 8,565,399, Exhibit A15—399 Patent Prior Art Chart—star38.com ("STAR38").
LiveVox, Inc.'s Disclosure of Invalidity Contentions Re U.S. Pat. No. 8,565,399, Exhibit A16—'399 Patent Prior Art Chart—U.S. Pat. No. 5,901,209 to Tannenbaum et al. ("Tannenbaum ,209").
LiveVox, Inc.'s Disclosure of Invalidity Contentions Re U.S. Pat. No. 8,565,399, Exhibit A17—'399 Patent Prior Art Chart—Torrone, "Questions About the Caller I.D. Falsification (Caller ID Spoofing) Service Answered . . . ," Aug. 31, 2004 ("Torrone").
LiveVox, Inc.'s Disclosure of Invalidity Contentions Re U.S. Pat. No. 8,565,399, Exhibit A18—'399 Patent Prior Art Chart—U.S. Patent Appl. No. 11/223,649 to Wong et al. ("Wong ,649").
LiveVox, Inc.'s Disclosure of Invalidity Contentions Re U.S. Pat. No. 8,565,399, Exhibit A19—'399 Patent Prior Art Chart—U.S. Pat. No. 6,975,718 to Pearce ("Pearce ,718").
LiveVox, Inc.'s Disclosure of Invalidity Contentions Re U.S. Pat. No. 8,565,399, Exhibit A20—399 Patent Prior Art Chart—U.S. Pat. No. 5,274,699 to Ranz ("Ranz ,699").
LiveVox, Inc.'s Disclosure of Invalidity Contentions Re U.S. Pat. No. 8,565,399, Exhibit A21—399 Patent Prior Art Chart—U.S. Pat. No. 5,784,444 to Snyder et al. ("Snyder ,444").
LiveVox, Inc.'s Disclosure of Invalidity Contentions Re U.S. Pat. No. 8,565,399, Exhibit A22—'399 Patent Prior Art Chart—U.S. Pat. No. 5,864,612 to Strauss, et al. ("Strauss '612").

(56) References Cited

OTHER PUBLICATIONS

LiveVox, Inc.'s Disclosure of Invalidity Contentions Re U.S. Pat. No. 8,565,399, Exhibit A23—'399 Patent Prior Art Chart—U.S. Pat. No. 6,101,246 to Heinmiller et al. ("Heinmiller ,246").
LiveVox, Inc.'s Disclosure of Invalidity Contentions Re U.S. Pat. No. 8,565,399, Exhibit A24—'399 Patent Prior Art Chart—U.S. Pat. No. 6,343,120 ("Rhodes ,120").
LiveVox, Inc.'s Disclosure of Invalidity Contentions Re U.S. Pat. No. 8,565,399, Exhibit A25—'399 Patent Prior Art Chart—U.S. Pat. No. 6,829,340 to Wei ("Wei '340").
LiveVox, Inc.'s Disclosure of Invalidity Contentions Re U.S. Pat. No. 8,565,399, Exhibit A26—'399 Patent Prior Art Chart—U.S. Pat. No. 7,551,731 to Durga, et al. ("Durga '731").
LiveVox, Inc.'s Disclosure of Invalidity Contentions Re U.S. Pat. No. 8,565,399, Exhibit A27—,399 Patent Prior Art Chart—U.S. Patent Application No. 09/871,289 to Mani ("Mani ,289").
LiveVox, Inc.'s Disclosure of Invalidity Contentions Re U.S. Pat. No. 8,565,399, Exhibit B1—'399 Patent Prior Art Chart—U.S. Patent Appl. No. 09/737,137 to Dicamillo et al. ("Dicamillo '137").
LiveVox, Inc.'s Disclosure of Invalidity Contentions Re U.S. Pat. No. 8,565,399, Exhibit B2—'399 Patent Obviousness Prior Art Chart.
Five 9, Inc.'s Disclosure of Invalidity Contentions—Exhibit A1—Prior Art Invalidity Chart—Ringcentral.
Five 9, Inc.'s Disclosure of Invalidity Contentions—Exhibit A2—Prior Art Invalidity Chart—U.S. Patent Application No. 09/898,787 to Alves et al. ("Alves '787").
Five 9, Inc.'s Disclosure of Invalidity Contentions—Exhibit A3—Prior Art Invalidity Chart—U.S. Pat. No. 7,640,009 to Beklin ("Belkin '009").
Five 9, Inc.'s Disclosure of Invalidity Contentions—Exhibit A4—Prior Art Invalidity Chart—U.S. Patent Appl. No. 11/286,310 to Black et al. ("Black '310").
Five 9, Inc.'s Disclosure of Invalidity Contentions—Exhibit A5—Prior Art Invalidity Chart—U.S. Pat. No. 7,756,253 to Breen et al. ("Breen '253").
Five 9, Inc.'s Disclosure of Invalidity Contentions—Exhibit A6—Prior Art Invalidity Chart—U.S. Pat. No. 7,027,575 to Burgess ("Burgess '575").
Five 9, Inc.'s Disclosure of Invalidity Contentions—Exhibit A7—Prior Art Invalidity Chart—U.S. Patent Appl. No. 09/745,703 to Clapper ("Clapper '703").
Five 9, Inc.'s Disclosure of Invalidity Contentions—Exhibit A8—Prior Art Invalidity Chart—U.S. Patent Appl. No. 10/665,880 to Giannoit ("Giannoit '880").
Five 9, Inc.'s Disclosure of Invalidity Contentions—Exhibit A9—Prior Art Invalidity Chart—U.S. Pat. No. 7,027,575 to Haug ("Haug '003").
Five 9, Inc.'s Disclosure of Invalidity Contentions—Exhibit A10—Prior Art Invalidity Chart—U.S. Pat. No. 7,925,003 to Herh ("Herh '003").
Five 9, Inc.'s Disclosure of Invalidity Contentions—Exhibit A11—Prior Art Invalidity Chart—U.S. Pat. No. 7,020,256 to Jain et al. ("Jain '256").
Five 9, Inc.'s Disclosure of Invalidity Contentions—Exhibit Al2—Prior Art Invalidity Chart—U.S. Pat. No. 5,740,538 to Joyce et al. ("Joyce '538").
Five 9, Inc.'s Disclosure of Invalidity Contentions—Exhibit A13—Prior Art Invalidity Chart—U.S. Pat. No. 5,590,184 to London ("London '184").
Five 9, Inc.'s Disclosure of Invalidity Contentions—Exhibit A14—Prior Art Invalidity Chart—U.S. Pat. No. 8,027,332 to Martin et al. ("Martin '332").
Five 9, Inc.'s Disclosure of Invalidity Contentions—Exhibit A15—Prior Art Invalidity Chart—star38.com.
Five 9, Inc.'s Disclosure of Invalidity Contentions—Exhibit A16—Prior Art Invalidity Chart—U.S. Pat. No. 5,901,209 to Tannenbaum et al. ("Tannenbaum '209").
Five 9, Inc.'s Disclosure of Invalidity Contentions—Exhibit A17—Prior Art Invalidity Chart—Torrone, "Questions About the Caller I.D. Falsification (Caller ID Spoofing) Service Answered . . .," Aug. 31, 2004 <http://wwvv.engadget.com/2004/08/31/questions-about-the-caller-i-dfalsification-caller-id/> ("Torrone").
Five 9, Inc.'s Disclosure of Invalidity Contentions—Exhibit A18—Prior Art Invalidity Chart—U.S. Appl. No. 11/223,649 to Wong et al. ("Wong '649").
Five 9, Inc.'s Disclosure of Invalidity Contentions—Exhibit A19—Prior Art Invalidity Chart—U.S. Pat. No. 6,975,718 to Pearce ("Pearce '718").
Five 9, Inc.'s Disclosure of Invalidity Contentions—Exhibit B1—Prior Art Invalidity Chart—U.S. Appl. No. 09/737,137 to Dicamillo et al. ("Dicamillo '137").
Five 9, Inc.'s Disclosure of Invalidity Contentions—Exhibit B2—Obviousness Prior Art Chart.
Five 9, Inc.'s Disclosure of Invalidity Contentions Re U.S. Pat. No. 8,565,399—Exhibit A1—'399 Patent Prior Art Chart—Ringcentral.
Five 9, Inc.'s Disclosure of Invalidity Contentions Re U.S. Pat. No. 8,565,399—Exhibit A2—'399 Patent Prior Art Chart—U.S. Appl. No. 09/898,787 to Alves et al. ("Alves ,787").
Five 9, Inc.'s Disclosure of Invalidity Contentions Re U.S. Pat. No. 8,565,399—Exhibit A3—'399 Patent Prior Art Chart—U.S. Pat. No. 7,640,009 to Beklin ("Belkin •009").
Five 9, Inc.'s Disclosure of Invalidity Contentions Re U.S. Pat. No. 8,565,399—Exhibit A4—'399 Patent Prior Art Chart—U.S. Appl. No. 11/286,310 to Black et al. ("Black ,310").
Five 9, Inc.'s Disclosure of Invalidity Contentions Re U.S. Pat. No. 8,565,399—Exhibit A5—399 Patent Prior Art Chart—U.S. Pat. No. 7,756,253 to Breen et al. ("Breen ,253").
Five 9, Inc.'s Disclosure of Invalidity Contentions Re U.S. Pat. No. 8,565,399—Exhibit A6—399 Patent Prior Art Chart—U.S. Pat. No. 7,027,575 to Burgess ("Burgess ,575").
Five 9, Inc.'s Disclosure of Invalidity Contentions Re U.S. Pat. No. 8,565,399—Exhibit A7—399 Patent Prior Art Chart—U.S. Patent Appl. No. 09/745,703 to Clapper ("Clapper ,703").
Five 9, Inc.'s Disclosure of Invalidity Contentions Re U.S. Pat. No. 8,565,399—Exhibit A9—399 Patent Prior Art Chart—U.S. Pat. No. 7,925,003 to Haug ("Haug ,003").
Five 9, Inc.'s Disclosure of Invalidity Contentions Re U.S. Pat. No. 8,565,399—Exhibit A10—399 Patent Prior Art Chart—U.S. Pat. No. 6,714,535 to Herh ("Herh ,535").
Five 9, Inc.'s Disclosure of Invalidity Contentions Re U.S. Pat. No. 8,565,399—Exhibit A11—399 Patent Prior Art Chart—U.S. Pat. No. 7,020,256 to Jain et al. ("Jain ,256").
Five 9, Inc.'s Disclosure of Invalidity Contentions Re U.S. Pat. No. 8,565,399—Exhibit Al2—'399 Patent Prior Art Chart—U.S. Pat. No. 5,740,538 to Joyce et al. ("Joyce ,538").
Five 9, Inc.'s Disclosure of Invalidity Contentions Re U.S. Pat. No. 8,565,399—Exhibit A14—'399 Patent Prior Art Chart—U.S. Pat. No. 8,027,332 to Martin et al. ("Martin ,332").
Five 9, Inc.'s Disclosure of Invalidity Contentions Re U.S. Pat. No. 8,565,399—Exhibit A15—'399 Patent Prior Art Chart—star38.com ("STAR38").
Five 9, Inc.'s Disclosure of Invalidity Contentions Re U.S. Pat. No. 8,565,399—Exhibit A16—'399 Patent Prior Art Chart—U.S. Pat. No. 5,901,209 to Tannenbaum et al. ("Tannenbaum ,209").
Five 9, Inc.'s Disclosure of Invalidity Contentions Re U.S. Pat. No. 8,565,399—Exhibit A17—'399 Patent Prior Art Chart—Torrone, "Questions About the Caller I.D. Falsification (Caller ID Spoofing) Service Answered . . .," Aug. 31, 2004 ("Torrone").
Five 9, Inc.'s Disclosure of Invalidity Contentions Re U.S. Pat. No. 8,565,399—Exhibit A18—'399 Patent Prior Art Chart—U.S. Appl. No. 11/223,649 to Wong et al. ("Wong ,649").
Five 9, Inc.'s Disclosure of Invalidity Contentions Re U.S. Pat. No. 8,565,399—Exhibit A19—'399 Patent Prior Art Chart—U.S. Pat. No. 6,975,718 to Pearce ("Pearce ,718").
Five 9, Inc.'s Disclosure of Invalidity Contentions Re U.S. Pat. No. 8,565,399—Exhibit A20—399 Patent Prior Art Chart—U.S. Pat. No. 5,274,699 to Ranz ("Ranz ,699").
Five 9, Inc.'s Disclosure of Invalidity Contentions Re U.S. Pat. No. 8,565,399—Exhibit A21—399 Patent Prior Art Chart—U.S. Pat. No. 5,784,444 to Snyder et al. ("Snyder ,444").
Five 9, Inc.'s Disclosure of Invalidity Contentions Re U.S. Pat. No. 8,565,399—Exhibit A22—'399 Patent Prior Art Chart—U.S. Pat. No. 5,864,612 to Strauss, et al. ("Strauss '612").

(56) References Cited

OTHER PUBLICATIONS

Five 9, Inc.'s Disclosure of Invalidity Contentions Re U.S. Pat. No. 8,565,399—Exhibit A23—'399 Patent Prior Art Chart—U.S. Pat. No. 6,101,246 to Heinmiller et al. ("Heinmiller ,246").
Five 9, Inc.'s Disclosure of Invalidity Contentions Re U.S. Pat. No. 8,565,399—Exhibit A24—'399 Patent Prior Art Chart—U.S. Pat. No. 6,343,120 ("Rhodes ,120").
Five 9, Inc.'s Disclosure of Invalidity Contentions Re U.S. Pat. No. 8,565,399—Exhibit A25—'399 Patent Prior Art Chart—U.S. Pat. No. 6,829,340 to Wei ("Wei '340").
Five 9, Inc.'s Disclosure of Invalidity Contentions Re U.S. Pat. No. 8,565,399—Exhibit A26—'399 Patent Prior Art Chart—U.S. Pat. No. 7,551,731 to Durga, et al. ("Durga '731").
Five 9, Inc.'s Disclosure of Invalidity Contentions Re U.S. Pat. No. 8,565,399—Exhibit A27—399 Patent Prior Art Chart—U.S. Patent Application No. 09/871,289 to Mani ("Mani ,289").
Five 9, Inc.'s Disclosure of Invalidity Contentions Re U.S. Pat. No. 8,565,399—Exhibit B1—'399 Patent Prior Art Chart—U.S. Patent Appl. No. 09/737,137 to Dicamillo et al. ("Dicamillo '137").
Five 9, Inc.'s Disclosure of Invalidity Contentions Re U.S. Pat. No. 8,565,399—Exhibit B2—'399 Patent Obviousness Prior Art Chart.
Live Vox, Inc.'s Disclosure of Invalidity Contentions—Exhibit A1—Prior Art Invalidity Chart—Ringcentral.
Live Vox, Inc.'s Disclosure of Invalidity Contentions—Exhibit A2—Prior Art Invalidity Chart—U.S. Appl. No. 09/898,787 to Alves et al ("Alves '787").
Live Vox, Inc.'s Disclosure of Invalidity Contentions—Exhibit A3—Prior Art Invalidity Chart—U.S. Pat. No. 7,640,009 to Beklin ("Belkin '009").
Live Vox, Inc.'s Disclosure of Invalidity Contentions—Exhibit A4—Prior Art Invalidity Chart—U.S. Appl. No. 11/286,310 to Black et al. ("Black '310").
Live Vox, Inc.'s Disclosure of Invalidity Contentions—Exhibit A5—Prior Art Invalidity Chart—U.S. Pat. No. 7,756,253 to Breen et al. ("Breen '253").
Live Vox, Inc.'s Disclosure of Invalidity Contentions—Exhibit A6—Prior Art Invalidity Chart—U.S. Pat. No. 7,027,575 to Burgess ("Burgess '575").
Live Vox, Inc.'s Disclosure of Invalidity Contentions—Exhibit A7—Prior Art Invalidity Chart—U.S. Appl. No. 091745,703 to Clapper ("Clapper '703").
Live Vox, Inc.'s Disclosure of Invalidity Contentions—Exhibit A8—Prior Art Invalidity Chart—U.S. Appl. No. 10/665,880 to Giannoit ("Giannoit '880").
Live Vox, Inc.'s Disclosure of Invalidity Contentions—Exhibit A9—Prior Art Invalidity Chart—U.S. Pat. No. 7,027,575 to Haug ("Haug '003").
Live Vox, Inc.'s Disclosure of Invalidity Contentions—Exhibit A10—Prior Art Invalidity Chart—U.S. Pat. No. 7,925,003 to Herh ("Herh '003").
Live Vox, Inc.'s Disclosure of Invalidity Contentions—Exhibit A11—Prior Art Invalidity Chart—U.S. Pat. No. 7,020,256 to Jain et al. ("Jain '256").
Live Vox, Inc.'s Disclosure of Invalidity Contentions—Exhibit A12—Prior Art Invalidity Chart—U.S. Pat. No. 5,740,538 to Joyce et al ("Joyce '538").
Live Vox, Inc.'s Disclosure of Invalidity Contentions—Exhibit A13—Prior Art Invalidity Chart—U.S. Pat. No. 5,590,184 to London ("London '184").
Live Vox, Inc.'s Disclosure of Invalidity Contentions—Exhibit A14—Prior Art Invalidity Chart—U.S. Pat. No. 8,027,332 to Martin et al. ("Martin '332").
Live Vox, Inc.'s Disclosure of Invalidity Contentions—Exhibit A15—Prior Art Invalidity Chart—star38.com.
Live Vox, Inc.'s Disclosure of Invalidity Contentions—Exhibit A16—Prior Art Invalidity Chart—U.S. Pat. No. 5,901,209 to Tannenbaum et al. ("Tannenbaum '209").
Live Vox, Inc.'s Disclosure of Invalidity Contentions—Exhibit A17—Prior Art Invalidity Chart—Torrone, "Questions About the Caller I.D. Falsification (Caller ID Spoofing) Service Answered . . .," Aug. 31, 2004 <http://wwvv.engadget.com/2004/08/31/questions-about-the-caller-i-d-falsification-caller-id/> ("Torrone").
Plaintiff Nobelbiz, Inc.'s Answer to Defendant Global Connect, L.L.C.'S Counterclaims, Mar. 31, 2014, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).
Third Amended Scheduling and Discovery Order for Trial on the Merits, Apr. 9, 2014, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).
Third Amended Scheduling and Discovery Order for Trial on the Merits—Ex. A—Global Connect's Representative Claim Chart (Invalidity) for Global Connect's 2004 System.
Third Amended Scheduling and Discovery Order for Trial on the Merits—Ex. C—Global Connect's Representative Claim Chart (Invalidity) for U.S. Pat. No. 7,640,009 to Belkin et al. ("Belkin '009 Patent").
Third Amended Scheduling and Discovery Order for Trial on the Merits - Ex. D—Global Connect's Representative Claim Chart (Invalidity) for U.S. Pat. No. 8,027,332 to Belkin et al. ("Martin '332 Patent") Martin et al. ("Martin '332 Patent").
Third Amended Scheduling and Discovery Order for Trial on the Merits—Ex. E—Global Connect's Representative Claim Chart (Invalidity) for U.S. Pat. No. 5,901,209 to Tannenbaum et al. ("Tannenbaum '209 Patent").
Third Amended Scheduling and Discovery Order for Trial on the Merits—Ex. F—Global Connect's Representative Claim Chart (Invalidity) for U.S. Pat. No. 7,925,003 to Haug, Jr. et al. ("Haug, Jr. '003 Patent").
Third Amended Scheduling and Discovery Order for Trial on the Merits—Ex. G—Global Connect's Representative Claim Chart (Invalidity) for U.S. Appl. No. 11/286,3101 to Black et al. ("Black '310 Application").
Third Amended Scheduling and Discovery Order for Trial on the Merits—Ex. H—Global Connect's Representative Claim Chart (Invalidity) for U.S. Pat. No. 7,756,253 to Breen et al. ("Breen '253 Patent").
Third Amended Scheduling and Discovery Order for Trial on the Merits—Ex. I - Global Connect's Representative Claim Chart (Invalidity) for U.S. Pat. No. 5,590,184 to Thomas B. London ("London '184 Patent").
Third Amended Scheduling and Discovery Order for Trial on the Merits - Ex. J - Global Connect's Representative Claim Chart (Invalidity) for U.S. Appl. No. 10/655,8801 to Jim Giannoit ("Giannoit '880 Application").
Third Amended Scheduling and Discovery Order for Trial on the Merits—Ex. K—Global Connect's Representative Claim Chart (Invalidity) for Torrone, Phillip, "Questions About the Caller ID Falsification (Caller ID Spoofing) Service Answered . . ." www.engadget.com (Aug. 31, 2004). ("Torrone").
Third Amended Scheduling and Discovery Order for Trial on the Merits—Ex. L—Global Connect's Representative Claim Chart (Invalidity) for U.S. Pat. No. 5,740,538 to Joyce et al. ("Joyce '538 Patent"). ("Torrone").
LlveVox, Inc.'s Disclosure of Invalidity Contentions—Exhibit A18—Prior Art Invalidity Chart—U.S. Appl. No. 11/223,649 to Wong et al. ("Wong '649").
LlveVox, Inc.'s Disclosure of Invalidity Contentions—Exhibit A19—Prior Art Invalidity Chart—U.S. Pat. No. 6,975,718 to Pearce ("Pearce '718").
LlveVox, Inc.'s Disclosure of Invalidity Contentions—Exhibit B1—Prior Art Invalidity Chart—U.S. Appl. No. 09/737,137 to Dicamillo et al. ("Dicamillo '137").
LlveVox, Inc.'s Disclosure of Invalidity Contentions—Exhibit B2—Obviousness Prior Art Chart.
Global Connect, L.L.C.'s Disclosures of Invalidity Contentions for U.S. Pat. No. 8,565,399 and accompanying Document Production, Mar. 12, 2014, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).
TCN, Inc.'s Supplemental Invalidity Contentions in view of U.S. Pat. No. 8,565,399, Mar. 12, 2014, *NobelBiz, Inc.* v. *Global Connect,*

(56) References Cited

OTHER PUBLICATIONS

L.L.C., 6:12-cv-00244-MHS (E.D. Tex. 2012), *NobelBiz, Inc. v. TCN, Inc.*, 6:12-cv-00247-MHS (E. D. Tex. 2012).
Defendant Global Connect, L.L.C.'s Original Answer to Complaint of Infringement of U.S. Pat. No. 8,565,399 and Counterclaim, Mar. 12, 2014, *NobelBiz, Inc. v. Global Connect, L.L.C.*, 6:12-cv-00244-MHS (E.D. Tex. 2012), *NobelBiz, Inc. v. TCN, Inc.*, 6:12-cv-00247-MHS (E.D. Tex. 2012).
TCN, Inc.'s Answer to Complaint filed in Case No. 6:13-Cv-805, Mar. 12, 2014, *NobelBiz, Inc. v. Global Connect, L.L.C.*, 6:12-cv-00244-MHS (E.D. Tex. 2012), *NobelBiz, Inc. v. TCN, Inc.*, 6:12-cv-00247-MHS (E.D. Tex. 2012).
Five 9, Inc's Order Granting Motion to Transfer, Mar. 28, 2013, *NobelBiz, Inc. v. Five 9 Inc.*, 6:12-cv-00243-MHS (E.D. Tex. 2012).
Joint Case Management Statement and [Proposed] Order, Sep. 16, 2013, *NobelBiz, Inc. vs. LiveVox, Inc.*, 4:13-CV-01843-YGR (n. D. Cal. 2013), *NobelBiz, Inc. vs. Five 9, Inc.*, 4:13-CV-01843-YGR (N.D. Cal. 2013).
Amended Joint Case Management Statement and [Proposed] Order, Dec. 2, 2013, *NobelBiz, Inc. vs. LiveVox, Inc.*, 4:13-CV-01846-YGR (N.D. Cal. 2013), *NobelBiz, Inc. vs. Five 9, Inc.*, 4:13-CV-01846-YGR (N.D. Cal. 2013).
Defendant Five 9's Answer to Corrected Complaint, Dec. 9, 2013, *NobelBiz, Inc. vs. Five 9, Inc.*, 4:13-CV-01846-YGR (N.D. Cal. 2013).
Five 9, Inc.'s Disclosure of Invalidity Contentions Re U.S. Pat. No. 8,565,399 and accompanying Exhibits, Feb. 6, 2014, *NobelBiz, Inc. vs. Five 9, Inc.*, 4:13-CV-01846-YGR (N.D. Cal. 2013).
Maney, Kevin, "Who's calling? It might not be who you think it is"., May 14, 2012, USA today, http://www.usatoday.com/money/industries/telecom/2004-09-01-spoof_x:htm.
Belson, Ken, "A Commercial Software Service Aims to Outfox Caller ID", Sep. 2, 2004, http://wwwnytimes.com/2004109/02/technology/02caller.htm.
Torrone, Phillip, "Questions about the Caller I.D. falsification (Caller ID Spoofing) service answered . . .", Aug. 31, 2004, www.engadget.com/2004/08/31/questions-about-the-caller-i-d-falsification-caller-id/.
Five 9, Inc.'s Disclosure of Invalidity Contentions Re U.S. Pat. No. 8,565,399, Exhibit A1, '399 Patent Prior Art Chart—Ringcentral.
Five 9, Inc.'s Disclosure of Invalidity Contentions Re U.S. Pat. No. 8,565,399, Exhibit A2, Prior '399 Patent Art Chart—U.S. Appl. No. 09/898,787 to Alves et al. ("Alves '787").
Five 9, Inc.'s Disclosure of Invalidity Contentions Re U.S. Pat. No. 8,565,399, Exhibit A3, '399 Patent Prior Art Chart—U.S. Pat. No. 7,640,009 to Beklin ("Belkin •009").
Five 9, Inc.'s Disclosure of Invalidity Contentions Re U.S. Pat. No. 8,565,399, Exhibit A4, '399 Patent Prior Art Chart—U.S. Appl. No. 11/286,310 to Black et al. ("Black '310").
Five 9, Inc.'s Disclosure of Invalidity Contentions Re U.S. Pat. No. 8,565,399, Exhibit A5, '399 Patent Prior Art Chart—U.S. Pat. No. 7,756,253 to Breen et al. ("Breen '253").
Five 9, Inc.'s Disclosure of Invalidity Contentions Re U.S. Pat. No. 8,565,399, Exhibit A6, '399 Patent Prior Art Chart—U.S. Pat. No. 7,027,575 to Burgess ("Burgess '575").
Five 9, Inc.'s Disclosure of Invalidity Contentions Re U.S. Pat. No. 8,565,399, Exhibit A7, '399 Patent Prior Art Chart—U.S. Appl. No. 09/745,703 to Clapper ("Clapper '703").
Five 9, Inc.'s Disclosure of Invalidity Contentions Re U.S. Pat. No. 8,565,399, Exhibit A8, '399 Patent Prior Art Chart—U.S. Appl. No. 10/665,880 to Giannoit ("Giannoit '880").
Five 9, Inc.'s Disclosure of Invalidity Contentions Re U.S. Pat. No. 8,565,399, Exhibit A9, '399 Patent Prior Art Chart—U.S. Pat. No. 7,925,003 to Haug ("Haug '003").
Five 9, Inc.'s Disclosure of Invalidity Contentions Re U.S. Pat. No. 8,565,399, Exhibit A10, '399 Patent Prior Art Chart—U.S. Pat. No. 6,714,535 to Herh ("Herh '535").
Five 9, Inc.'s Disclosure of Invalidity Contentions Re U.S. Pat. No. 8,565,399, Exhibit All, '399 Patent Prior Art Chart—U.S. Pat. No. 7,020,256 to Jain et al. ("Jain '256").
Five 9, Inc.'s Disclosure of Invalidity Contentions Re U.S. Pat. No. 8,565,399, Exhibit Al2, '399 Patent Prior Art Chart—U.S. Pat. No. 5,740,538 to Joyce et al. ("Joyce '538").
Five 9, Inc.'s Disclosure of Invalidity Contentions Re U.S. Pat. No. 8,565,399, Exhibit A13, '399 Patent Prior Art Chart—U.S. Pat. No. 5,590,184 to London ("London '184").
Five 9, Inc.'s Disclosure of Invalidity Contentions Re U.S. Pat. No. 8,565,399, Exhibit A14, '399 Patent Prior Art Chart—U.S. Pat. No. 8,027,332 to Martin et al. ("Martin '332").
Five 9, Inc.'s Disclosure of Invalidity Contentions Re U.S. Pat. No. 8,565,399, Exhibit A15, '399 Patent Prior Art Chart—star38.com ("STAR38").
Five 9, Inc.'s Disclosure of Invalidity Contentions Re U.S. Pat. No. 8,565,399, Exhibit A16, '399 Patent Prior Art Chart—U.S. Pat. No. 5,901,209 to Tannenbaum et al. ("Tannenbaum '209").
Five 9, Inc.'s Disclosure of Invalidity Contentions Re U.S. Pat. No. 8,565,399, Exhibit A17, '399 Patent Prior Art Chart—Torrone, "Questions About the Caller I.D. Falsification (Caller ID Spoofing) Service Answered . . .," Aug. 31, 2004 ("Torrone").
Five 9, Inc.'s Disclosure of Invalidity Contentions Re U.S. Pat. No. 8,565,399, Exhibit A18, '399 Patent Prior Art Chart—U.S. Appl. No. 11/223,649 to Wong et al ("Wong '649").
Five 9, Inc.'s Disclosure of Invalidity Contentions Re U.S. Pat. No. 8,565,399, Exhibit A19, '399 Patent Prior Art Chart—U.S. Pat. No. 6,975,718 to Pearce ("Pearce '718").
Five 9, Inc.'s Disclosure of Invalidity Contentions Re U.S. Pat. No. 8,565,399, Exhibit A20, '399 Patent Prior Art Chart—U.S. Pat. No. 5,274,699 to Ranz ("Ranz 699").
Five 9, Inc.'s Disclosure of Invalidity Contentions Re U.S. Pat. No. 8,565,399, Exhibit A21, '399 Patent Prior Art Chart—U.S. Pat. No. 5,784,444 to Snyder et al. ("Snyder '444").
Five 9, Inc.'s Disclosure of Invalidity Contentions Re U.S. Pat. No. 8,565,399, Exhibit A22, '399 Patent Prior Art Chart—U.S. Pat. No. 5,864,612 to Strauss, et al. ("Strauss '612").
Five 9, Inc.'s Disclosure of Invalidity Contentions Re U.S. Pat. No. 8,565,399, Exhibit A23, '399 Patent Prior Art Chart—U.S. Pat. No. 6,101,246 to Heinmiller et al. ("Heinmiller '246").
Five 9, Inc.'s Disclosure of Invalidity Contentions Re U.S. Pat. No. 8,565,399, Exhibit A24, '399 Patent Prior Art Chart—U.S. Pat. No. 6,343,120 ("Rhodes '120").
Five 9, Inc.'s Disclosure of Invalidity Contentions Re U.S. Pat. No. 8,565,399, Exhibit A25, '399 Patent Prior Art Chart—U.S. Pat. No. 6,829,340 to Wei ("Wei '340").
Five 9, Inc.'s Disclosure of Invalidity Contentions Re U.S. Pat. No. 8,565,399, Exhibit A26, '399 Patent Prior Art Chart—U.S. Pat. No. 7,551,731 to Durga, et al. ("Durga '731").
Five 9, Inc.'s Disclosure of Invalidity Contentions Re U.S. Pat. No. 8,565,399, Exhibit A27, '399 Patent Prior Art Chart—U.S. Appl. No. 09/871,289 to Mani ("Mani '289").
Five 9, Inc.'s Disclosure of Invalidity Contentions Re U.S. Pat. No. 8,565,399, Exhibit B1, '399 Patent Prior Art Chart—U.S. Appl. No. 09/737,137 to Dicamillo et al. ("Dicamillo '137").
Five 9, Inc.'s Disclosure of Invalidity Contentions Re U.S. Pat. No. 8,565,399, Exhibit B2, '399 Patent Obviousness Prior Art Chart.
Defendant Global Connect, L.L.C.'s Answer and Affirmative Defenses to Nobelbiz, Inc.'S Complaint, May 25, 2012, *NobelBiz, Inc. v. Global Connect, L.L.C.*, 6:12-cv-00244-MHS (E.D. Tex. 2012).
Joint Discovery/Case Management Plan, Mar. 14, 2013, *NobelBiz, Inc. v. Five 9 Inc.*, 6:12-cv-00243-MHS (E.D. Tex. 2012), *NobelBiz, Inc. v. Global Connect, L.L.C.*, 6:12-cv-00244-MHS (E.D. Tex. 2012), *NobelBiz, Inc. v. TCN, Inc.*, 6:12-cv-00247-MHS (E.D. Tex. 2012), *NobelBiz, Inc. v. LiveVox, Inc.*, 6:12-cv-00246-MHS (E.D. Tex. 2012).
Order, Apr. 24, 2013, *NobelBiz, Inc. v. Global Connect, L.L.C.*, 6:12-cv-00244-MHS (E.D. Tex. 2012).
Defendant Global Connect, L.L.C.'s Answer to Amended Complaint, May 9, 2013, *NobelBiz, Inc. v. Global Connect, L.L.C.*, 6:12-cv-00244-MHS (E.D. Tex. 2012).
Joint Claim Construction and Prehearing Statement (P.R. 4-3), Jun. 28, 2013, *NobelBiz, Inc. v. Global Connect, L.L.C.*, 6:12-cv-00244-MHS (E.D. Tex. 2012), *NobelBiz, Inc. v. TCN, Inc.*, 6:12-cv-00247-MHS (E.D. Tex. 2012).

(56) References Cited

OTHER PUBLICATIONS

Livevox Inc.'s Disclosure of Invalidity Contentions Re U.S. Pat. No. 8,565,399, Exhibit A23 '399 Patent Prior Art Chart—U.S. Pat. No. 6,101,246 to Heinmiller et al. ("Heinmiller '246").
Livevox Inc.'s Disclosure of Invalidity Contentions Re U.S. Pat. No. 8,565,399, Exhibit A24—'399 Patent Prior Art Chart—U.S. Pat. No. 6,343,120 ("Rhodes '120").
Livevox Inc.'s Disclosure of Invalidity Contentions Re U.S. Pat. No. 8,565,399, Exhibit A25—'399 Patent Prior Art Chart—U.S. Pat. No. 6,829,340 to Wei ("Wei '340").
Livevox Inc.'s Disclosure of Invalidity Contentions Re U.S. Pat. No. 8,565,399, Exhibit A26—'399 Patent Prior Art Chart—U.S. Pat. No. 7,551,731 to Durga, et al. ("Durga '731").
Livevox Inc.'s Disclosure of Invalidity Contentions Re U.S. Pat. No. 8,565,399, Exhibit A27—'399 Patent Prior Art Chart—U.S. Appl. No. 09/871,289 to Mani ("Mani '289").
Livevox Inc.'s Disclosure of Invalidity Contentions Re U.S. Pat. No. 8,565,399, Exhibit B1—'399 Patent Prior Art Chart—U.S. Appl. No. 09/737,137 to Dicamillo et al. ("Dicamillo '137").
Livevox Inc.'s Disclosure of Invalidity Contentions Re U.S. Pat. No. 8,565,399, Exhibit B2—'399 Patent Obviousness Prior Art Chart.
Civil docket for *Global Connect, LLC* v. *NobelBiz, Inc.*, 2:13-cv-01938-GMN-PAL (D. Nev.).
Civil docket for *NobelBiz, Inc.*, v. *AireSpring, Inc.*, 6:12-cv-00242-LED (E.D. Tex.).
Civil docket for *NobelBiz, Inc.*, v. *Connect First, Inc.*, 6:12-cv-00549-LED (E.D. Tex.).
Civil docket for *NobelBiz, Inc.*, v. *Five 9, Inc.*, 6:12-cv-00243-MHS (E.D. Tex.).
Civil docket for *NobelBiz, Inc.*, v. *Five 9, Inc.*, 4:13-cv-01846-YGR (N.D. Ca.).
Civil docket for *NobelBiz, Inc.* v. *Global Connect, LLC* v. *T C N, Inc.* and *Global Connect, L.L.C.* v. *NobelBiz, Inc.*, 6:12- cv-00244-MHS (E.D. Tex.).
Civil docket for *NobelBiz, Inc.* v. *inContact, Inc.*, 6:12-cv-00272-LED (E.D. Tex.).
Civil docket for *NobelBiz, Inc.* v. *InsideSales.com*, 6:13-cv-00360-MHS (E.D. Tex.).
Civil docket for *NobelBiz, Inc.* v. *Intelligent Contacts, Inc.*, 6:12-cv-00831-MHS (E.D. Tex.).
Civil docket for *NobelBiz, Inc.* v. *LiveVox Inc.*, 6:12-cv-00246-MHS (E.D. Tex.).
Civil docket for *NobelBiz, Inc.* v. *LiveVox Inc.*, 4:13-cv-01773-YGR (N.D. Ca.).
Civil docket for *NobelBiz, Inc.* v. *SafeSoft Solutions Inc.*, 4:13-cv-02423-YGR (N.D. Ca.).
Civil docket for *NobelBiz, Inc.* v. *Stage 2 Networks, L.L.C.*, 6:12-cv-00308-LED (E.D. Tex.).
Civil docket for *NobelBiz, Inc.* v. *T C N, Inc.*, 6:12-cv-00247-MHS (E.D. Tex.).
Civil docket for *NobelBiz, Inc.* v. *Veracity Networks, LLC*, 4:13-cv-02518-YGR (N.D. Ca.).
Civil docket for *NobelBiz, Inc.* v. *Omega Services, LLC*, 6:12-cv-00432-LED (E.D. Tex.).
Civil docket for *Safesoft Solutions Inc.* v. *NobelBiz Inc.*, 2:13-cv-07915-ODW-CW (C.D. Ca.).
Civil docket for *TCN, Inc.* v. *NobelBiz Inc.*, 2:13-cv-00969-BSJ (D. Ut.).
Defendant Global Connect, L.L.C.'s Sur-Reply to Plaintiff's Application for Preliminary Injunction, Jun. 25, 2012, *Nobelbiz, Inc.* v. *Global Connect, L.L.C.*, 6:12-cv-00244-LED (Ed. Tex.).
Defendant Global Connect, L.L.C.'s Sur-Reply to Plaintiff's Application for Preliminary Injunction—Attachment R—Global Connect's Responsive Claim Chart (Non-Infringment and Invalidity).
Defendant Global Connect, L.L.C.'s Opposition to Plaintiff's Application for Preliminary Injunction, May 25, 2012, *Nobelbiz, Inc.* v. *Global Connect, L.L.C.*, 6:12-cv-00244-LED (E.D. Tex.).
Order Denying Plaintiff's Application for Preliminary Injunction, May 25, 2012, *Nobelbiz, Inc.* v. *Global Connect, L.L.C.*, 6:12-cv-00244-LED (E.D. Tex.).
Declaration of Hyrum C. Wray in Support of Defendant Global Connect's Opposition to Plaintiff's Application for Preliminary Injunction.
Declaration of Darrin Bird in Support of Defendant Global Connect's Opposition to Plaintiff's Application for Preliminary Injunction—Attachment A—copy of a press release regarding Collection Advisor for Global Connect.
Declaration of Darrin Bird in Support of Defendant Global Connect's Opposition to Plaintiff's Application for Preliminary Injunction—Attachment B—True and correct copies of Global Connect's business records of the Aug. 14, 2004 broadcast.
Declaration of Darrin Bird in Support of Defendant Global Connect's Opposition to Plaintiff's Application for Preliminary Injunction—Attachment C—True and correct copies of Global Connect's current brochure.
Declaration of Darrin Bird in Support of Defendant Global Connect's Opposition to Plaintiff's Application for Preliminary Injunction—Attachment D—True and correct excerpts of Global Connect's Sep. 2004 User Manual.
Declaration of Darrin Bird in Support of Defendant Global Connect's Opposition to Plaintiff's Application for Preliminary Injunction—Attachment E—True and correct copy of Global Connect's brochure circa Sep. 2004.
Declaration of Darrin Bird in Support of Defendant Global Connect's Opposition to Plaintiff's Application for Preliminary Injunction—Attachment F—true and correct printout from the Internet Wayback Machine showing a page from Global Connect's website circa Sep. 27, 2004. This printout was from http://web.archive.org/web/20040927012742/http://www.gc1.com/ and was printed out on May 18, 2012.
Declaration of Darrin Bird in Support of Defendant Global Connect's Opposition to Plaintiff's Application for Preliminary Injunction—Attachment G—News Article dated Feb. 8, 2012 regarding Global Connect.
Declaration of Darrin Bird in Support of Defendant Global Connect's Opposition to Plaintiff's Application for Preliminary Injunction—Attachment H—Press release dated May 2008 regarding Global Connect.
Declaration of Darrin Bird in Support of Defendant Global Connect's Opposition to Plaintiff's Application for Preliminary Injunction—Attachment I—News Article dated Feb. 13, 2012 regarding Global Connect.
Declaration of Darrin Bird in Support of Defendant Global Connect's Opposition to Plaintiff's Application for Preliminary Injunction—Attachment J—News article dated Mar. 16, 2007 regarding Global Connect.
Declaration of Darrin Bird in Support of Defendant Global Connect's Opposition to Plaintiff's Application for Preliminary Injunction—Attachment K—Press release dated Apr. 1, 2008 regarding Global Connect.
Declaration of Darrin Bird in Support of Defendant Global Connect's Opposition to Plaintiff's Application for Preliminary Injunction—Attachment L—Press release dated Jan. 30, 2008 regarding Global Connect.
Declaration of Darrin Bird in Support of Defendant Global Connect's Opposition to Plaintiff's Application for Preliminary Injunction—Attachment M—Press release dated Jul. 17, 2007 regarding Global Connect.
Declaration of Ross Spencer Garsson in Support of Defendant Global Connect's Opposition to Plaintiff's Application for Preliminary Injunction—Attachment N—excerpt of file history from U.S. Pat. No. 8,135,122.
Declaration of Ross Spencer Garsson in Support of Defendant Global Connect's Opposition to Plaintiff's Application for Preliminary Injunction—Attachment O—excerpt from the '122 Patent Prosecution History File.
Declaration of Ross Spencer Garsson in Support of Defendant Global Connect's Opposition to Plaintiff's Application for Preliminary Injunction—Attachment P—true and correct printout of *Apple, Inc.* v. *Samsung Electronix Co.*__ F.3d __, 2012 WL 1662048 (Fed. Cir. 2012).
Declaration of Ross Spencer Garsson in Support of Defendant Global Connect's Opposition to Plaintiff's Application for Preliminary

(56) References Cited

OTHER PUBLICATIONS

Injunction—Attachment Q—true and correct printout of *TechRadium, Inc. v. Blackboard Connect, Inc.*, 2009 WL 1152985 (E.D. Tex 2009).
Memorandum in Opposition to Plaintiff's Application for Preliminary Injunction—Exhibit A—Declaration of Jesse Bird in Opposition to Plaintiff's Application for Preliminary Injunction.
Memorandum in Opposition to Plaintiff's Application for Preliminary Injunction, May 25, 2012, *NobelBiz, Inc. v. TCN, Inc.*, Civil No. 6:12-cv-00247-LED (Ed. Tex.).
Order Denying Motion for Preliminary Injunction and Expedited Discovery, May 25, 2012, *NobelBiz, Inc. v. TCN, Inc.*, Civil No. 6:12-cv-00247-LED (E.D. Tex.).
Expert Report of Dewayne E. Perry, Ph.D, Regarding Invalidity of U.S. Pat. No. 8,135,122, Feb. 4, 2014, *NobelBiz, Inc. v. Global Connect, L.L.C.*, 6:13-cv-804-MHS (E.D. Tex. 2012), *NobelBiz, Inc. v. TCN, Inc.*, 6:13-cv-805-MHS (E.D. Tex. 2012).
Expert Report of Dewayne E. Perry, Ph.D, Regarding Invalidity of U.S. Pat. No. 8,135,122—Appendix A—Resume of Dewayne E. Perry, Ph.D.
Expert Report of Dewayne E. Perry, Ph.D, Regarding Invalidity of U.S. Pat. No. 8,135,122—Appendix B—Expert Witness Resume: Cases with Depositions/Testimony.
Expert Report of Dewayne E. Perry, Ph.D, Regarding Invalidity of U.S. Pat. No. 8,135,122—Appendix C—List of Documents Provided to Defendants' Expert Witness, Dewayne E. Perry, Ph.D.
Letter to Ralph A. Dengler, Esq., Feb. 4, 2014, *NobelBiz, Inc. v. Global Connect, L.L.C6.*, 6:13-cv-804-MHS (E.D. Tex. 2012), *NobelBiz, Inc. v. TCN, Inc.*, 6:13-cv-805-MHS (E.D. Tex. 2012).
Joint Case Management Statement & [Proposed] Order, Sep. 27, 2013, *NobelBiz, Inc. v. Veracity Networks, LLC*, 4:13-cv-02518-YGR (N.D. Ca. 2013).
Order Granting Motion to Dismiss for Lack of Personal Jurisdiction and Dismissing Case, Sep. 27, 2013, *NobelBiz, Inc. v. Veracity Networks, LLC*, 4:13-cv-02518-YGR (N.D. Ca. 2013).
Complaint, Oct. 23, 2013, *T C N, Inc. v. Nobelbiz, Inc.*, 2:13-cv-00969-BCW (C.D. Ut. 2013).
Notice of Voluntary Dismissal, Mar. 6, 2014, *T C N, Inc. v. Nobelbiz, Inc.*, 2:13-cv-00969-BCW (C.D. Ut. 2013).
Order of Dismissal, Mar. 5, 2014, *T C N, Inc. v. Nobelbiz, Inc.*, 2:13-cv-00969-BCW (C.D. Ut. 2013).
Order Granting Motion to Transfer, Mar. 28, 2013, *NobelBiz, Inc. v. Livevox, Inc.*, 6:12-cv-00246-MHS (E.D. Tex. 2012).
Complaint, Oct. 25, 2013, *Safesoft Solutions, Inc. v. NobelBiz, Inc.*, 2:13-cv-07915-ODW-CW (C.D. Ca. 2013).
Plaintiff Safesoft Solutions, Inc.'s Notice of Voluntary Dismissal Without Prejudice, Apr. 8, 2014, *Safesoft Solutions, Inc. v. NobelBiz, Inc.*, 2:13-cv-07915-ODW-CW (C.D. Ca. 2013).
Joint Case Management Statement & [Proposed] Order, Sep. 16, 2013, *NobelBiz, Inc. v. LiveVox, Inc.*, 4:13-Cv-01773-YGR (N.D. Cal. 2013), *NobelBiz, Inc. v. Five 9, Inc*, 4:13-cv-01846-YGR (N.D. Cal. 2013).
Amended Joint Case Management Statement & [Proposed] Order, Dec. 2, 2013, *NobelBiz, Inc. v. LiveVox, Inc.*, 4:13-Cv-01773-YGR (N.D. Cal. 2013), *NobelBiz, Inc. v. Five 9, Inc*, 4:13-cv-01846-YGR (N.D. Cal. 2013).
Defendant Livevox's Answer to Corrected Amended Complaint, Dec. 9, 2013, *NobelBiz, Inc. v. LiveVox, Inc.*, 4:13-Cv-01773-YGR (N.D. Cal. 2013).
Livevox Inc.'s Disclosure of Invalidity Contentions Re U.S. Pat. No. 8,565,399, Feb. 6, 2014, *NobelBiz, Inc. v. LiveVox, Inc.*, 4:13-Cv-01773-YGR (N.D. Cal. 2013).
Livevox Inc.'s Disclosure of Invalidity Contentions Re U.S. Pat. No. 8,565,399, Exhibit A1 '399 Patent Prior Art Chart—Ringcentral.
Livevox Inc.'s Disclosure of Invalidity Contentions Re U.S. Pat. No. 8,565,399, Exhibit A2 Prior 399 Patent Art Chart—U.S. Patent Application No. 09/898,787 to Alves et al. ("Alves 787").
Livevox Inc.'s Disclosure of Invalidity Contentions Re U.S. Pat. No. 8,565,399, Exhibit A3 '399 Patent Prior Art Chart—U.S. Pat. No. 7,640,009 to Beklin ("Belkin •009").
Livevox Inc.'s Disclosure of Invalidity Contentions Re U.S. Pat. No. 8,565,399, Exhibit A4—'399 Patent Prior Art Chart—U.S. Appl. No. 11/286,310 to Black et al. ("Black '310").
Livevox Inc.'s Disclosure of Invalidity Contentions Re U.S. Pat. No. 8,565,399, Exhibit A5—'399 Patent Prior Art Chart—U.S. Pat. No. 7,756,253 to Breen et al. ("Breen '253").
Livevox Inc.'s Disclosure of Invalidity Contentions Re U.S. Pat. No. 8,565,399, Exhibit A6—'399 Patent Prior Art Chart—U.S. Pat. No. 7,027,575 to Burgess ("Burgess '575").
Livevox Inc.'s Disclosure of Invalidity Contentions Re U.S. Pat. No. 8,565,399, Exhibit A7—,399 Patent Prior Art Chart—U.S. Appl. No. 091745,703 to Clapper ("Clapper 703").
Livevox Inc.'s Disclosure of Invalidity Contentions Re U.S. Pat. No. 8,565,399, Exhibit A8—'399 Patent Prior Art Chart—U.S. Appl. No. 10/665,880 to Giannoit ("Giannoit '880").
Livevox Inc.'s Disclosure of Invalidity Contentions Re U.S. Pat. No. 8,565,399, Exhibit A9—399 Patent Prior Art Chart—U.S. Pat. No. 7,925,003 to Haug ("Haug '003").
Livevox Inc.'s Disclosure of Invalidity Contentions Re U.S. Pat. No. 8,565,399, Exhibit A10—'399 Patent Prior Art Chart—U.S. Pat. No. 6,714,535 to Herh ("Herh '535").
Livevox Inc.'s Disclosure of Invalidity Contentions Re U.S. Pat. No. 8,565,399, Exhibit All—'399 Patent Prior Art Chart—U.S. Pat. No. 7,020,256 to Jain et al. ("Jain '256").
Livevox Inc.'s Disclosure of Invalidity Contentions Re U.S. Pat. No. 8,565,399, Exhibit Al2—'399 Patent Prior Art Chart—U.S. Pat. No. 5,740,538 to Joyce et al. ("Joyce '538").
Livevox Inc.'s Disclosure of Invalidity Contentions Re U.S. Pat. No. 8,565,399, Exhibit A13—'399 Patent Prior Art Chart—U.S. Pat. No. 5,590,184 to London ("London '184").
Livevox Inc.'s Disclosure of Invalidity Contentions Re U.S. Pat. No. 8,565,399, Exhibit A14—'399 Patent Prior Art Chart—U.S. Pat. No. 8,027,332 to Martin et al. ("Martin '332").
Livevox Inc.'s Disclosure of Invalidity Contentions Re U.S. Pat. No. 8,565,399, Exhibit A15—'399 Patent Prior Art Chart—star38.com ("STAR38").
Livevox Inc.'s Disclosure of Invalidity Contentions Re U.S. Pat. No. 8,565,399, Exhibit A16—'399 Patent Prior Art Chart—U.S. Pat. No. 5,901,209 to Tannenbaum et al. ("Tannenbaum 209").
Livevox Inc.'s Disclosure of Invalidity Contentions Re U.S. Pat. No. 8,565,399, Exhibit A17—'399 Patent Prior Art Chart—Torrone, "Questions About the Caller I.D. Falsification (Caller ID Spoofing) Service Answered . . .," Aug. 31, 2004 ("Torrone").
Livevox Inc.'s Disclosure of Invalidity Contentions Re U.S. Pat. No. 8,565,399, Exhibit A18—'399 Patent Prior Art Chart—U.S. Appl. No. 11/223,649 to Wong et al ("Wong '649").
Livevox Inc.'s Disclosure of Invalidity Contentions Re U.S. Pat. No. 8,565,399, Exhibit A19—'399 Patent Prior Art Chart—U.S. Pat. No. 6,975,718 to Pearce ("Pearce '718").
Livevox Inc.'s Disclosure of Invalidity Contentions Re U.S. Pat. No. 8,565,399, Exhibit A20—'399 Patent Prior Art Chart—U.S. Pat. No. 5,274,699 to Ranz ("Ranz '699").
Livevox Inc.'s Disclosure of Invalidity Contentions Re U.S. Pat. No. 8,565,399, Exhibit A21—'399 Patent Prior Art Chart—U.S. Pat. No. 5,784,444 to Snyder et al. ("Snyder 444").
Livevox Inc.'s Disclosure of Invalidity Contentions Re U.S. Pat. No. 8,565,399, Exhibit A22—'399 Patent Prior Art Chart—U.S. Pat. No. 5,864,612 to Strauss, et al. ("Strauss '612").
Nobelbiz's Opening Claim Construction Brief, Aug. 12, 2013, *NobelBiz, Inc. v. Global Connect, L.L.C.*, 6:12-cv-00244-MHS (E.D. Tex. 2012), *NobelBiz, Inc. v. TCN*, Inc., 6:12-cv-00247-MHS (Ed. Tex. 2012).
Defendants' Joint Claim Construction Brief, Aug. 28,2013, *NobelBiz, Inc. v. Global Connect, L.L.C.*, 6:12-cv-00244-MHS (E.D. Tex. 2012), *NobelBiz, Inc. v. TCN, Inc.*, 6:12-cv-00247-MHS (Ed. Tex. 2012).
Declaration of Ross Spencer Garsson in Support of Defendants' Joint Claim Construction Brief including Exhibits 1-5E, Aug. 28, 2013, *NobelBiz, Inc. v. Global Connect, L.L.C.*, 6:12-cv-00244-MHS (E.D. Tex. 2012), *NobelBiz, Inc. v. TCN, Inc.*, 6:12-cv-00247-MHS (Ed. Tex. 2012).
Defendants' Motion for Partial Summary Judgment of Indefiniteness of Claims 6-24 of U.S. Pat. No. 8,135,122, Aug. 28, 2013, *NobelBiz,*

(56) References Cited

OTHER PUBLICATIONS

*Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).
Declaration of Clinton E. Duke in Support of Defendants' Motion for Partial Summary Judgment of Indefiniteness of Claims 6-24 of U.S. Pat. No. 8,135,122, including Exhibits A-F, Aug. 28, 2013, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012),.
Order Granting Defendants' Motion for Partial Summary Judgment of Indefiniteness of Claims 6-24 of U.S. Pat. No. 8,135,122, Aug. 28, 2014, *NobelBiz, Inc.* v. *Global Connect, L.L.C.*, 6:12- cv-00244-MHS (E.D. Tex. 2012), *NobelBiz, Inc.* v. *TCN, Inc.*, 6:12-cv-00247-MHS (Ed. Tex. 2012).
Nobelbiz'S Opposition to Defendants' Motion for Summary Judgment of Indefiniteness, Sep. 11, 2013, *NobelBiz, Inc.* v. *Global Connect, L.L.C.*, 6:12-cv-00244-MHS (Ed. Tex. 2012), *NobelBiz, Inc.* v. *TCN, Inc.*, 6:12-cv-00247-MHS (E.D. Tex. 2012).
Nobelbiz'S Claim Construction Reply Brief, Sep. 11, 2013, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).
Joint Claim Construction Chart, U.S. Pat. No. 8,135,122, Sep. 18, 2013, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).
Defendants' Reply in Support of Their Motion for Partial Summary Judgment of Indefiniteness of Claims 6-24 of U.S. Pat. No. 8,135,122, Sep. 18, 2013, *NobelBiz, Inc.* v. *Global Connect, L.L.C.*, 6:12-cv-00244-MHS (Ed. Tex. 2012), *NobelBiz, Inc,* v. *TCN, Inc.*, 6:12-cv-00247-MHS (E.D. Tex. 2012).
Nobelbiz'S Response to the Court's Claim Construction Question, Oct. 16, 2013, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E. D. Tex. 2012).
Nobelbiz's Response to the Court'S Claim Construction Question—Exhibit A—Order—Apr. 28, 2008—*Input/Output, Inc.* and *I/O Sensors, Inc.*, V. *Sercel, Inc.*, 5:06-CV-236 (E.D. Tex.).
Nobelbiz's Response to the Court'S Claim Construction Question—Exhibit A—Order—Nov. 6, 2008—*the Western Union Company*v. *Moneygram International, Inc.* (E.D. Tex.).
Defendants' Additional Briefing As Requested by the Court, Oct. 16, 2013, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).
Order Denying Defendants' Motion for Partial Summary Judgment of Indefiniteness, Dec. 13, 2013, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).
Memorandum Opinion and Order, Dec. 13, 2013, *NobelBiz, Inc.* v. *Global Connect, L.L.C.*, 6:12- cv-00244-MHS (E.D. Tex. 2012), *NobelBiz, Inc.* v. *TCN, Inc.*, 6:12-cv-00247-MHS (E.D. Tex. 2012).
Defendants' Notice of Compliance With the Court's Scheduling and Discovery Order for Trial on the Merits, Jan. 10, 2014, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).
Nobelbiz's Response to the Court's Claim Construction Question—Exhibit 1—Letter to the Honorable Michael H. Schneider requesting permission to file a motion for summary judgment—Jan. 10, 2014.
Plaintiff Nobelbiz, Inc.'s Notice of Compliance With the Court's Scheduling and Discovery Order for Trial on the Merits, Jan. 24, 2014, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).
Plaintiff Nobelbiz, Inc.'s Notice of Compliance With the Court's Scheduling and Discovery Order for Trial on the Merits,—Exhibit 1—Jan. 24, 2014—Letter to the Honorable Michael H. Schneider requesting that the Court deny Defendant's request for permission to file a motion for summary judgment.
Defendants' Notice of Compliance With the Court's Scheduling and Discovery Order for Trial on the Merits, Jan. 29, 2014, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).
Defendants' Notice of Compliance With the Court's Scheduling and Discovery Order for Trial on the Merits—Exhibit 1—Jan. 29, 2014—Letter to the Honorable Michael H. Schneider regarding Defendants reply to NobelBiz, Inc.'s opposition letter.
Plaintiff Nobelbiz, Inc.'s Notice of Compliance With the Court's Scheduling and Discovery Order for Trial on the Merits, Jan. 31, 2014, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).
Plaintiff Nobelbiz, Inc.'s Notice of Compliance With the Court's Scheduling and Discovery Order for Trial on the Merits—Exhibit 1—Jan. 31, 2014—Letter to the Honorable Michael H. Schneider regarding NobelBiz requesting permission to file summary judgment motions.
Order on Letter Briefs, Feb. 3, 2014, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).
Defendants' Notice of Compliance With the Court's First Amended Scheduling and Discovery Order for Trial on the Merits, Feb. 14, 2014, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (F.D. Tex. 2012).
Defendants' Notice of Compliance With the Court's First Amended Scheduling and Discovery Order for Trial on the Merits—Exhibit 1—Feb. 14, 2014,—Letter to the Honorable Michael H. Schneider regarding Global Connect, L.L.C. opposition to NobelBiz, Inc.'s request for leave to file a summary judgment motion and request for leave to file a Daubert challenge, as set forth in NobelBiz's Jan. 31, 2014, letter to the Court. Doc. No. 125-1.
Nobelbiz's Request to File a Motion to Strike and Daubert Motion Regarding Global Connect's Invalidity Expert Report and Testimony, Feb. 14, 2014, *NobelBiz, Inc.* v. *Global Connect, L.L.C.*, 6:12-cv-00244-MHS (F.D. Tex. 2012), *NobelBiz, Inc.* v. *TCN, Inc.*, 6:12-cv-00247-MHS (E.D. Tex. 2012).
Nobelbiz's Request to File a Motion to Strike and Daubert Motion Regarding Global Connect's Invalidity Expert Report and Testimony—Exhibit 1—Feb. 14, 2014—Letter to the Honorable Michael H. Schneider regarding the Scheduling Order (Dkt. No. 121), the Defendants together served a report by Dr. Perry containing a "statement of all opinions . . . [he] will express" on invalidity.
Plaintiff Nobelbiz, Inc.'s Notice of Compliance With the Court's Scheduling and Discovery Order for Trial on the Merits, Feb. 19, 2014, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).
Plaintiff Nobelbiz, Inc.'s Notice of Compliance With the Court's Scheduling and Discovery Order for Trial on the Merits—Exhibit 1—Feb. 19, 2014—Letter to the Honorable Michael H. Schneider regarding further support of its request to move for summary judgment of no invalidity as to Global Connect, L.L.C. 's and TCN, Inc.'s purported prior art systems (hereafter, "Global Connect's 2004 System," "TCN's 2004 System" and "Defendants' 2004 Systems"); dismissing Global Connect's affirmative defense of unclean hands; and.
Defendants' Notice of Compliance With the Court's Second Amended Scheduling and Discovery Order for Trial on the Merits, Feb. 24, 2014, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).
Defendants' Notice of Compliance With the Court's Second Amended Scheduling and Discovery Order for Trial on the Merits—Exhibit 1—Feb. 24, 2014—Letter to the Honorable Michael H. Schneider regarding Defendant's requests that the Court deny Plaintiff NobelBiz, Inc.'s request for permission to file motions to strike and a Daubert motion (Doc. No. 134-1 ).
Plaintiff Nobelbiz, Inc.'s Notice of Compliance With the Court's Scheduling and Discovery Order for Trial on the Merits, Feb. 25, 2014, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).

(56) References Cited

OTHER PUBLICATIONS

Plaintiff Nobelbiz, Inc.'s Notice of Compliance With the Court's Scheduling and Discovery Order for Trial on the Merits—Exhibit 1—Feb. 25, 2014—Letter to the Honorable Michael H. Schneider regarding Plaintiff NobelBiz, Inc.'s reply letter in further support of its request to strike Defendants' expert report and testimony.
Defendant Global Connect, L.L.C.'s Original Answer to Complaint of Infringement of U.S. Pat. No. 8,565,399 and Counterclaim, Mar. 12, 2014, *NobelBiz, Inc.* v. *Global Connect, L.L.C.*, 6:12- cv-00244-MHS (E.D. Tex. 2012), *NobelBiz, Inc.* v. *TCN, Inc.*, 6:12-cv-00247-MHS (E.D. Tex. 2012).
Plaintiff Nobelbiz, Inc.'s Answer to Defendant Global Connect, L.L.C.'s Counterclaims, Mar.31, 2014, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).
Third Amended Scheduling and Discovery Order for Trial on the Merits, Apr. 9, 2014, *NobelBiz,.Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).
Third Amended Scheduling and Discovery Order for Trial on the Merits—Ex. A—Global Connect's Representative Claim Chart (Invalidity) for Global Connect's 2004 System. Sep. 8, 2013.
Third Amended Scheduling and Discovery Order for Trial on the Merits—Ex. B—Global Connect's Representative Claim Chart (Invalidity) for Sep. 2004 GC Users Guide.
Third Amended Scheduling and Discovery Order for Trial on the Merits—Ex. C—Global Connect's Representative Claim Chart (Invalidity) for U.S. Pat. No. 7,640,009 to Belkin et al. ("Belkin '009 Patent"), Sep. 8, 2013.
Third Amended Scheduling and Discovery Order for Trial on the Merits—Ex. D—Global.Connect's Representative Claim Chart (Invalidity) for U.S. Pat. No. 8,027,332 to Belkin et al. ("Martin '332 Patent"), Sep. 8, 2013
Third Amended Scheduling and Discovery Order for Trial on the Merits—Ex. E—Global.Connect's Representative Claim Chart (Invalidity) for U.S. Pat. No. 5,901,209 to Tannenbaum et al. ("Tannenbaum '209 Patent "), Sep. 8, 2013.
Third Amended Scheduling and Discovery Order for Trial on the Merits—Ex. F—Global.Connect's Representative Claim Chart (Invalidity) for U.S. Pat. No. 7,925,003 to Haug, Jr. et al. ("Haug, Jr. '003 Patent"), Sep. 8, 2013.
Defendant Global Connect's Answers and Objections to Nobelbiz, Inc.'s First Set of Interrogatories (Nos. 1-11), Jun. 14, 2013, *NobelBiz, Inc.* v. *Global Connect, L.L.C.*, 6:12-cv-00244-LED (E.D. Tex. 2012).
Defendant Global Connect, L.L.C.'s Disclosures of Invalidity Contentions for U.S. Pat. No. 8,565,399 and Accompanying Document Production, Mar. 12, 2014, *NobelBiz, Inc.* v. *Global Connect, L.L.C.*, 6:12-cv-00244-MHS (F.D. Tex. 2012), *NobelBiz, Inc.* v. *TCN, Inc.*, 6:12-cv-00247-MHS (E.D. Tex. 2012).
Defendant Global Connect, L.L.C.'s Rule 26(a) Initial Disclosures and the Scheduling and Discovery Order for Trial on the Merits, Apr. 26, 2013, *NobelBiz, Inc.* v. *Global Connect, L.L.C.*, 6:12- cv-00244-LED (E.D. Tex. 2012).
Defendant Global Connect, L.L.C.'s Rule 26(a) Initial Disclosures and the Scheduling and Discovery Order for Trial on the Merits, Mar. 12, 2014, *NobelBiz, Inc.* v. *Global Connect, L.L.C.*, 6:12- cv-00244-MHS (E.D. Tex. 2012), *NobelBiz, Inc.* v. *TCN, Inc.*, 6:12-cv-00247-MHS (Ed. Tex. 2012).
Defendant Global Connect's First Amended Objections and Answers to Nobelbiz, Inc.'s First Set of Interrogatories (Nos. 1-11), Nov. 20, 2013, *NobelBiz, Inc.* v. *Global Connect, L.L.C.*, 6:12-cv-00244-LED (E.D. Tex. 2012).
Complaint for Declaratory Judgment of Non-Infringement and Patent Invalidity, Oct. 23, 2013, *Global Connect, L.L.C.* v. *NobelBiz, Inc.*, 2:13-cv-01938-GMN-PAL (U.S.D.C. Nev. 2013).
Notice of Voluntary Dismissal Without Prejudice, Mar. 19, 2014, Global Connect, L.L.C. v. NobelBiz, Inc., 2:13-cv-01938-Gmn-Pal (U.S.D.C. Nev. 2013).

Joint Discovery/Case Management Plan, Jan. 29, 2014, *NobelBiz, Inc.* v. *Global Connect, L.L.C.*, 6:13- cv-804-MHS (E.D. Tex. 2012), *NobelBiz, Inc.* v. *TCN, Inc.*, 6:13-cv-805-MHS (E.D. Tex. 2012).
Declaration of Darrin Bird in Support of Defendant Global Connect's Opposition to Plaintiff's Application for Preliminary Injunction, with attachments, May 25, 2012, *NobelBiz, Inc.* v. *Global Connect, L.L.C.*, 6:12-cv-00244-LED (E.D. Tex. 2012).
Declaration of Ross Spencer Garsson in Support of Defendant Global Connect's Opposition to Plaintiff's Application for Preliminary Injunction, with attachments, May 25, 2012, *NobelBiz, Inc.* v. *Global Connect, L.L.C.*, 6:12-cv-00244-LED (E.D. Tex. 2012).
Defendant Global Connect, L.L.C.'s Sur-Reply to Plaintiff's Application for Preliminary Injunction, Jun. 25, 2012, *NobelBiz, Inc.* v. *Global Connect, L.L.C.*, 6:12-cv-00244-LED (F.D. Tex. 2012).
Five 9, Inc.'s Disclosure of Invalidity Contentions and Accompanying Exhibits, May 13, 2013, *NobelBiz, Inc.* v. *Five 9, Inc*, 13-cv-01846-EDL (N.D. Cal. 2013).
Expert Report of Dewayne E. Perry, Ph.D, Regarding Invalidity of U.S. Pat. No. 8,135,122, Feb. 4, 2014, *NobelBiz, Inc.* v. *Global Connect, L.L.C.*, 6:12-cv-00244-Mhs (E.D. Tex. 2012), *NobelBiz, Inc.* v. *TCN, Inc.*, 6:12-cv-00247-MHS (E.D. Tex. 2012).
Expert Report of Dewayne E. Perry, Ph.D, Regarding Invalidity of U.S. Pat. No. 8,135,122, Appendix A, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).
Expert Report of Dewayne E. Perry, Ph.D, Regarding Invalidity of U.S. Pat. No. 8,135,122, Appendix B, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).
Expert Report of Dewayne E. Perry, Ph.D, Regarding Invalidity of U.S. Pat. No. 8,135,122, Appendix C, *NobelBiz, Inc.* v. *Global Connect, L.L.C.*, 6:12-cv-00244-MHS (E.D. Tex. 2012), *NobelBiz, Inc.* v. *TCN, Inc.*, 6:12-cv-00247-MHS (E.D. Tex. 2012).
LiveVox, Inc.'s Disclosure of Invalidity Contentions and Accompanying Exhibits A1-B2, May 13, 2013, *NobelBiz, Inc.* v. *LiveVox, Inc.*, 4:13-Cv-01773-YGR (N.D. Cal. 2013).
Five 9, Inc.'s Disclosure of Invalidity Contentions Re U.S. Pat. No. 8,565,399, Feb. 6, 2014, *NobelBiz, Inc.* v. *Five 9, Inc*, 4:13-cv-01846-YGR (N.D. Cal. 2013).
In the Matter of Rules and Regulations Implementing the Telephone Consumer Protection Act of 1991, CG Docket No. 02-278, Section XII. Caller Identification, Federal Communications Commission (Jul. 3, 2003) available at: http://hraunfoss.fcc.goviedocs_publiciattachmatch/FCC-03-153A1.pdf.
Videotaped Deposition of Global Connect, LLC by David "Chris" Crenshaw, Jan. 17, 2014, *Nobelbiz, Inc.* v. *Global Connect, L.L.C.*, 6:12-cv-244 (E.D. Tex.) and *Nobelbiz, Inc.* v. *T C N, Inc.* 6:12- cv-247 (E.D. Tex.).
Defendant T C N, Inc.'s First Amended Counterclaims, Jun. 26, 2014, Regarding U.S. Pat. No. 8,565,399, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
Defendant Global Connect, L.L.C.'s First Amended Counterclaim Regarding U.S. Pat. No. 8,565,399, Jun. 26, 2014, *Nobelbiz, Inc.* v. *Global Connect, L.L.C.*, 6:12-cv-244 (E.D. Tex.) and *Nobelbiz, Inc.* v. *T C N, Inc.* 6:12-cv-247 (E.D. Tex.).
Opening Claim Construction Brief, Jun. 27, 2014, *NobelBiz, Inc.* v. *Livevox, Inc.* and *Nobelbiz, Inc.* v. *Five9, Inc.*, 4:13-cv-01846-YGR (N.D. Cal.).
Declaration of Ralph A. Dengler in Support of Defendant. Nobelbiz's Opening Claim Construction Brief, Jun. 27, 2014, *NobelBiz, Inc.* v. *Livevox, Inc.* and *Nobelbiz, Inc.* v. *Five9, Inc.*, 4:13- cv-01846-YGR (N.D. Cal.).
Declaration of Ralph A. Dengler in Support of Defendant. Nobelbiz's Opening Claim Construction Brief, Jun. 27, 2014, Exhibit A—Memorandum Opinion and Order by the Honorable Michael H. Schneider regarding claim construction of certain terms of U.S. Pat. No. 8,135,122, dated Dec. 13, 2013.
Declaration of Ralph A. Dengler in Support of Defendant. Nobelbiz's Opening Claim Construction Brief, Jun. 27, 2014, Exhibit B—excerpt of LiveVox Inc.'s Disclosure of Invalidity Contentions regarding U.S. Pat. No. 8,135,122 pursuant to Patent Local Rule 3-3, dated May 13, 2013.

(56) References Cited

OTHER PUBLICATIONS

Declaration of Ralph A. Dengler in Support of Defendant. Nobelbiz's Opening Claim Construction Brief, Jun. 27, 2014, Exhibit C—excerpt of LiveVox Inc.'s Disclosure of Invalidity Contentions regarding U.S. Pat. No. 8,565,399 pursuant to Patent Local Rule 3-3, dated Feb. 6, 2014.

Declaration of Ralph A. Dengler in Support of Defendant. Nobelbiz's Opening Claim Construction Brief, Jun. 27, 2014, Exhibit D—Order Denying Defendants' Motion for Partial Summary Judgment of Indefiniteness by the Honorable Michael H. Schneider, dated Dec. 13, 2013.

Declaration of Ralph A. Dengler in Support of Defendant. Nobelbiz's Opening Claim Construction Brief, Jun. 27, 2014, Exhibit E—excerpt of a claim chart as to U.S. Pat. No. 8,565,399.

Defendant's Claim Construction Brief, Jul. 18, 2014, *NobelBiz, Inc.* v. *Livevox, Inc.* and *Nobelbiz, Inc.* v. *Five9, Inc.*, 4:13-Cv-01773-YGR and 4:13-Cv-01846-YGR (N.D. Cal.).

Declaration of Robert Harkins in Support of Defendant's Claim Construction Brief, Jul. 18, 2014, *NobelBiz, Inc.* v. *Livevox, Inc.* and *Nobelbiz, Inc.* v. *Five9, Inc.*, 4:13-Cv-01773-YGR and 4:13-Cv-01846-YGR (N.D. Cal.).

Declaration of Robert Harkins in Support of Defendant's Claim Construction Brief, Jul. 18, 2014, Exhibit A—excerpt from the prosecution history of the '122 patent.

Declaration of Robert Harkins in Support of Defendant's Claim Construction Brief, Jul. 18, 2014, Exhibit B—dictionary definitions from Merriam-Webster's Collegiate Dictionary (10th Ed. Merriam-Webster, Inc. 1998), including definitions for "embed," "modify," outbound, "re-," "replace," and "replacement.".

Declaration of Robert Harkins in Support of Defendant's Claim Construction Brief, Jul. 18, 2014, Exhibit C—definition of the prefix "re" from Dictionary.com, from Random House Dictionary, 2014.

Declaration of Robert Harkins in Support of Defendant's Claim Construction Brief, Jul. 18, 2014, Exhibit D—definition of the words "replace" and "replacing" from Vocabulary.com.

Declaration of Robert Harkins in Support of Defendant'S Claim Construction Brief—Exhibit E—definition of the word "replacement" from the Free Dictionary, from Collins English Dictionary—Complete and Unabridged (HarperCollins Publishers) (2003).

Declaration of Robert Harkins in Support of Defendant's Claim Construction Brief, Jul. 18, 2014, Exhibit F—"Guatemala's Attorney General Faces Legal Fight to Stay in Office," America's Quarterly, Feb. 12, 2014.

Declaration of Robert Harkins in Support of Defendant's Claim Construction Brief, Jul. 18, 2014, Exhibit G—definitions from American Heritage Dictionary of the English Language (4th Ed. Houghton Miffin Co., 2000), including "embed," "modify," and "outbound.".

Declaration of Robert Harkins in Support of Defendant's Claim Construction Brief, Jul. 18, 2014, Exhibit H—definition of "modify" from Vocabulary.com, 2014.

Declaration of Robert Harkins in Support of Defendant's Claim Construction Brief, Jul. 18, 2014, Exhibit I—definition of "modify" from Dictionary.com, from Collins English Dictionary, Complete and Unabridged, 10th Ed. (William Collins Sons & Co. Ltd. 2009).

Declaration of Robert Harkins in Support of Defendant's Claim Construction Brief, Jul. 18, 2014, Exhibit J—definition of "outbound" from Dictionary.com, from Collins English Dictionary, Complete and Unabridged, 10th Ed. (William Collins Sons & Co. Ltd. 2009).

Declaration of Robert Harkins in Support of Defendant's Claim Construction Brief, Jul. 18, 2014, Exhibit K—definition of "area code" from Dictionary.com, from Collins English Dictionary, Complete and Unabridged, 10th Ed. (William Collins Sons & Co. Ltd. 2009).

Declaration of Robert Harkins in Support of Defendant's Claim Construction Brief, Jul. 18, 2014, Exhibit L—definition of "call processing" from Federal Standard 1037C, Telecommunications: Glossary of Telecommunication Terms, National Communications System Technology and Standards Division (Aug. 7, 1996), p. C-3.

Declaration of Robert Harkins in Support of Defendant's Claim Construction Brief, Jul. 18, 2014, Exhibit M—definition of "call processing" from Atis Telecom Glossary, Alliance for Telecommunications Industry Solutions, 2011.

Declaration of Robert Harkins in Support of Defendant's Claim Construction Brief, Jul. 18, 2014, Exhibit N—definition of "region" from Dictionary.com from Random House Dictionary (Random House Inc.) (2013).

Declaration of Robert Harkins in Support of Defendant's Claim Construction Brief, Jul. 18, 2014, Exhibit O—briefing filed by defendants in the Texas litigation on claim construction of the '122 patent.

Declaration of Robert Harkins in Support of Defendant's Claim Construction Brief, Jul. 18, 2014, Exhibit P—briefing filed by defendants in the Texas litigation related to a motion for summary judgment of invalidity due to indefiniteness.

Declaration of Robert Harkins in Support of Defendant's Claim Construction Brief, Jul. 18, 2014, Exhibit Q—excerpts from the invalidity contentions served on NobelBiz by LiveVox in this case.

Declaration of Robert Harkins in Support of Defendant's Claim Construction Brief, Jul. 18, 2014, Exhibit R—excerpts from the invalidity contentions served on NobelBiz by Five9 in this case.

Claim Construction Reply Brief, Aug. 1 ,2014, *NobelBiz, Inc.* v. *Livevox, Inc.* and *Nobelbiz, Inc.* v. *Five9, Inc.*, 4:13-cv-01846-YGR (N.D. Cal.).

Declaration of Ralph A. Dengler in Support of Nobelbiz'S Claim Construction Reply Brief, Aug. 1 ,2014, *NobelBiz, Inc.* v. *Livevox, Inc.* and *Nobelbiz, Inc.* v. *Five9, Inc.*, 4:13-cv-01773-YGR (N.D. Cal.).

Declaration of Ralph A. Dengler in Support of Nobelbiz's Claim Construction Reply Brief, Aug. 1 ,2014, Exhibit A—excerpt of Defendants'invalidity contention chart (Exhibit A21) from the above-captioned actions as to U.S. Pat. No. 8,565,399.

Declaration of Ralph A. Dengler in Support of Nobelbiz's Claim Construction Reply Brief, Aug. 1 ,2014, Exhibit B—excerpt of Federal Standard 1037C, Telecommunications: Glossary of Telecommunication Terms.

Declaration of Ralph A. Dengler in Support of Nobelbiz's Claim Construction Reply Brief, Aug. 1 ,2014, Exhibit C—excerpt of Defendants' invalidity contention chart (Exhibit A4) from the above-captioned actions as to U.S. Pat. No. 8,565,399.

Declaration of Ralph A. Dengler in Support of Nobelbiz's Claim Construction Reply Brief, Aug. 1 ,2014, Exhibit D—excerpt of Defendants' invalidity contention chart (Exhibit A8) from the above-captioned actions as to U.S. Pat. No. 8,565,399.

Opening Claim Construction Brief, Jun. 27, 2014, *NobelBiz, Inc.* v. *Livevox, Inc.* and *Nobelbiz, Inc.* v. *Five9, Inc.*, 4:13-cv-01773-YGR (N.D. Cal.).

Declaration of Ralph A. Dengler in Support of Nobelbiz's Opening Claim Construction Brief, Jun. 27, 2014, *NobelBiz, Inc.* v. *Livevox, Inc.* and *Nobelbiz, Inc.* v. *Five9, Inc.*, 4:13-cv-01773-YGR (N.D. Cal.).

Declaration of Ralph A. Dengler in Support of Nobelbiz's Opening Claim Construction Brief, Jun. 27, 2014, Exhibit A—Memorandum Opinion and Order by the Honorable Michael H. Schneider regarding claim construction of certain terms of U.S. Pat. No. 8,135,122, dated Dec. 13, 2013.

Declaration of Ralph A. Dengler in Support of Nobelbiz's Opening Claim Construction Brief, Jun. 27, 2014, Exhibit B—excerpt of LiveVox Inc.'s Disclosure of Invalidity Contentions regarding U.S. Pat. No. 8,135,122 pursuant to Patent Local Rule 3-3, dated May 13, 2013.

Declaration of Ralph A. Dengler in Support of Nobelbiz's Opening Claim Construction Brief, Jun. 27, 2014, Exhibit C—excerpt of LiveVox Inc,'s Disclosure of Invalidity Contentions regarding U.S. Pat. No. 8,565,399 pursuant to Patent Local Rule 3-3, dated Feb. 6, 2014.

Declaration of Ralph A. Dengler in Support of Nobelbiz's Opening Claim Construction Brief, Jun. 27, 2014, Exhibit D—Order Denying Defendants' Motion for Partial Summary Judgment of Indefiniteness by the Honorable Michael H. Schneider, dated Dec. 13, 2013.

Declaration of Ralph A. Dengler in Support of Nobelbiz's Opening Claim Construction Brief, Jun. 27, 2014, Exhibit E—excerpt of a claim chartas to U.S. Pat. No. 8,565,399.

(56) References Cited

OTHER PUBLICATIONS

Claim Construction Reply Brief, Aug. 1, 2014, *NobelBiz, Inc.* v. *Livevox, Inc.* and *Nobelbiz, Inc.* v. *Five9, Inc.*, 4:13-cv-01773-YGR (N.D. Cal.).
Plaintiff Nobelbiz Inc's Initial Disclosures Pursuant to Fed. R. Civ. P. 26 (a) (1) and Patent Local Rules, Sep. 16, 2013, *NobelBiz, Inc.* v. *Livevox, Inc.* and *Nobelbiz, Inc.* v. *Five9, Inc., Nobelbiz, Inc.* v. *Safesoft Solutions, Inc.* and *Nobelbiz, Inc.* v. *Veracity Networks, LLC*, 4:13-cv-01773-YGR (N.D. Cal.), 4:13-cv-01846-YGR (N.D. Cal.), 4:13- cv-02423-YGR (N.D. Cal.) and 4:13-cv-02518-YGR (N.D. Cal.).
Nobelbiz, Inc.'s First Supplemental Disclosures Pursuant to Fed. R. Civ. P. 26(a)(1) and Patent Local Rules, Dec. 9, 2013, *NobelBiz, Inc.* v. *Livevox, Inc.* and *Nobelbiz, Inc.* v. *Five9, Inc.*, 4:13-cv-01773-YGR (N.D. Cal.).
Nobelbiz, Inc.'s Second Supplemental Disclosures Pursuant to Fed. R. Civ. P. 26(a)(1) and Patent Local Rules, Jul. 16, 2014, *NobelBiz, Inc.* v. *Livevox, Inc.* and *Nobelbiz, Inc.* v. *Five9, Inc.*, 4:13- cv-01773-YGR (N.D. Cal.).
Defendant's Rule 26(a)(1) Initial Disclosures, *Nobelbiz, Inc.* v. *Five9, Inc.*, Nov. 7, 2013, 4:13-cv-01846-YGR (N.D. Cal.).
Defendant's Rule 26(a)(1) Initial Disclosures, Nov. 7, 2013, *NobelBiz, Inc.* v. *Livevox, Inc. LLC* , 4:13- cv-01773-YGR (N.D. Cal.).
Claim Construction Hearing Before the Honorable Michael H. Schneider, United States District Judge, Oct. 9, 2013, *NobelBiz, Inc.* v. *Global Connect, LLC* and *NobelBiz, Inc.* v. *TCN, Inc.*, 6:12-CV244 and 6:12-Cv-247 (E.D. Tex.).
Defendants' Technology Tutorial U.S. Pat. No. 8,135,122, Jun. 28, 2013, *NobelBiz, Inc.* v. *Global Connect, LLC* and *NobelBiz, Inc.* v. *TCN, Inc.*, 6:12-Cv-244 and 6:12-CV-247 (E.D. Tex.).
Defendants' Technology Tutorial U.S. Pat. No. 8,565,399, May 7, 2014, *NobelBiz, Inc.* v. *Global Connect, LLC* and *NobelBiz, Inc.* v. *TCN, Inc.*, 6:12-CV-244 and 6:12-CV-247 (E.D. Tex.).
Defendants' Presentation for Claim Construction Hearing, Oct. 9, 2013, *NobelBiz, Inc.* v. *Global Connect, LLC* and *NobelBiz, Inc.* v. *TCN, Inc.*, 6:12-CV-244 and 6:12-CV-247 (E.D. Tex.).
Nobelbiz's Tutorial on U.S. Pat. No. 8,135,122, Jun. 28, 2013, *NobelBiz, Inc.* v. *Global Connect, LLC* and *NobelBiz, Inc.* v. *TCN, Inc.*, 6:12-CV-244 and 6:12-CV-247 (E.D. Tex.).
Nobelbiz'S Tutorial on U.S. Pat. No. 8,565,399, May 2014, *NobelBiz, Inc.* v. *Global Connect, LLC* and *NobelBiz, Inc.* v. *TCN, Inc.*, 6:12-CV-244 and 6:12-CV-247 (E.D. Tex.).
Nobelbiz's Claim Construction U.S. Pat. No. 8,135,122 ("The '122 patent"), Oct. 9, 2013, *NobelBiz, Inc.* v. *Global Connect, LLC* and *NobelBiz, Inc.* v. *TCN, Inc.*, 6:12-CV-244 and 6:12-CV-247 (E.D. Tex.).
Plaintiff Nobelbiz, Inc.'s Motion to Dismiss Defendant Global Connect, L.L.C.'s Affirmative Defenses and Counterclaims, Apr. 11, 2014, *NobelBiz, Inc.* v. *Global Connect, LLC* and *NobelBiz, Inc.* v. *TCN, Inc.*, 6:12-CV-244 and 6:12-CV-247 (E.D. Tex.).
Defendant Global Connect's Opposition to Plaintiff's Motion to Dismiss Defendant's Affirmative Defenses and Counterclaims and Defendant Global Connect's Alternate Motion, Apr. 28, 2014, *NobelBiz, Inc.* v. *Global Connect, LLC* and *NobelBiz, Inc.* v. *TCN, Inc.*, 6:12-CV-244 and 6:12-CV-247 (E.D. Tex.).
Declaration of Ross Spencer Garsson in Support of Defendant Global Connect's Opposition to Plaintiff's Motion to Dismiss Defendant's Affirmative Defenses and Counterclaims, Apr. 28, 2014, *NobelBiz, Inc.* v. *Global Connect, LLC* and *NobelBiz, Inc.* v. *TCN, Inc.*, 6:12-CV244 and 6:12-CV-247 (E.D. Tex.).
Declaration of Ross Spencer Garsson in Support of Defendant Global Connect's Opposition to Plaintiff's Motion to Dismiss Defendant's Affirmative Defenses and Counterclaims, Apr. 28, 2014, Exhibit 1—*Syntellect Technology Corp.* v. *Brooktrout Technology, Inc.*, 1997 WL 419586 (N.D. Tex. 1997).
Declaration of Ross Spencer Garsson in Support of Defendant Global Connect's Opposition to Plaintiff's Motion to Dismiss Defendant's Affirmative Defenses and Counterclaims, Apr. 28, 2014, Exhibit 2—*WesternGeco* v. *Ion Geophysical Corp.*, 2009 Wl 3497123 (S. D. Tex. 2009).
Declaration of Ross Spencer Garsson in Support of Defendant Global Connect's Opposition to Plaintiff's Motion to Dismiss Defendant's Affirmative Defenses and Counterclaims, Apr. 28, 2014, Exhibit 3—*Lincoln National Life* v. *Jackson National Life Ins. Co.*, 2010 WL 1781013 (N.D. Ind. 2010).
Declaration of Ross Spencer Garsson in Support of Defendant Global Connect's Opposition to Plaintiff's Motion to Dismiss Defendant's Affirmative Defenses and Counterclaims, Apr. 28, 2014, Exhibit 4—M.P.E.P. § 2001.06(c).
Declaration of Ross Spencer Garsson in Support of Defendant Global Connect's Opposition to Plaintiff's Motion to Dismiss Defendant's Affirmative Defenses and Counterclaims, Apr. 28, 2014, Exhibit 5—*Kinetic Concept, Inc.* v. *Convatec Inc.*, 2010 WL 1427592 (M.D. N.C. 2010).
Joint Claim Construction and Prehearing Statement (P.R. 4-3), May 7, 2014, *NobelBiz, Inc.* v. *Global Connect, LLC and NobelBiz, Inc.* v. *TCN, Inc.*, 6:12-CV-244 and 6:12-CV-247 (Ed. Tex.).
Joint Claim Construction and Prehearing Statement (P.R. 4-3), Exhibit A—identifies the intrinsic and extrinsic evidence upon which the Parties intend to rely to support their proposed construction or to oppose any other Party's proposed construction. Sep. 18, 2013.
Nobelbiz's Reply in Support of Its Motion to Dismiss Global Connect's Affirmative Defenses and Counterclaims, May 12, 2014, *NobelBiz, Inc.* v. *Global Connect, LLC* and *NobelBiz, Inc.* v. *TCN, Inc.*, 6:12-CV-244 and 6:12-CV-247 (E.D. Tex.).
Notice of Supplemental Authority, May 15, 2014, *NobelBiz, Inc.* v. *Global Connect, LLC* and *NobelBiz, Inc.* v. *TCN, Inc.*, 6:12-CV-244 and 6:12-CV-247 (Ed. Tex.).
Notice of Supplemental Authority, May 15, 2014, Exhibit A—copy of the recent Order from the U.S. District Court, Northern District of California in case *Blackberry Limited* v. *Typo Products LLP*, 14-CV-00023-WHO.
Defendant Global Connect's Surreply in Opposition to Plaintiff's Motion to Dismiss Defendant's Affirmative Defenses and Counterclaims and Defendant Global Connects Reply in Support of Its Alternate Motion for Leave to Amend Its Pleadings, May 22, 2014, *NobelBiz, Inc.* v. *Global Connect, LLC and NobelBiz, Inc.* v. *TCN, Inc.*, 6:12-CV-244 and 6:12-CV-247 (E.D. Tex.).
Declaration of Ross Spencer Garsson in Support of Defendant Global Connect's Surreply in Opposition to Plaintiff's Motion to Dismiss Defendant's Affirmative Defenses and Counterclaims, May 22, 2014, *NobelBiz, Inc.* v. *Global Connect, LLC* and *NobelBiz, Inc.* v. *TCN, Inc.*, 6:12-CV-244 and 6:12-CV-247 (E.D. Tex.).
Declaration of Ross Spencer Garsson in Support of Defendant Global Connect's Surreply in Opposition to Plaintiff's Motion to Dismiss Defendant's Affirmative Defenses and Counterclaims, May 22, 2014, Exhibit 6—*Rolls-Royce PLC* v. *United Technologies Corp.*, 2011 U.S. Dist. Lexis 20679 (E.D. Va. Mar. 2, 2011).
Nobelbiz, Inc.'s Final Election of Asserted Claims, Jun. 6, 2014, *NobelBiz, Inc.* v. *Global Connect, LLC* and *NobelBiz, Inc.* v. *TCN, Inc.*, 6:12-CV-244 and 6:12-CV-247 (E.D. Tex.).
Nobelbiz's Renewed Motion to Dismiss Global Connect's and TCN's First Amended Counterclaim Regarding Unenforceability of U.S. Pat. No. 8,565,399, Jul. 3, 2014, *NobelBiz, Inc.* v. *Global Connect, LLC* and *NobelBiz, Inc.* v. *TCN, Inc.*, 6:12-CV-244 and 6:12-CV-247 (E.D. Tex.).
Declaration of Elizabeth L. Derieux in Support of Nobelbiz's Renewed Motion to Dismiss Global Connects and TCN's First Amended Counterclaim Regarding U.S. Pat. No. 8,565,399, Jul. 3, 2014, *NobelBiz, Inc.* v. *Global Connect, LLC* and *NobelBiz, Inc.* v. *TCN, Inc.*, 6:12-CV-244 and 6:12-CV-247 (E.D. Tex.).
Declaration of Elizabeth L. Derieux in Support of Nobelbiz's Renewed Motion to Dismiss Global Connects and TCN's First Amended Counterclaim Regarding U.S. Pat. No. 8,565,399, Jul. 3, 2014, Exhibit 1—Defendant Global Connect's Invalidity Contentions as to U.S. Pat. No. 8,135,122, dated Apr. 26, 2013.
Declaration of Elizabeth L. Derieux in Support of Nobelbiz's Renewed Motion to Dismiss Global Connects and TCN's First Amended Counterclaim Regarding U.S. Pat. No. 8,565,399, Jul. 3,

(56) References Cited

OTHER PUBLICATIONS

2014, Exhibit 2—Defendant TCN's Invalidity Contentions as to U.S. Pat. No. 8,135,122, dated Apr. 26, 2013.
Declaration of Elizabeth L. Derieux in Support of Nobelbiz's Renewed Motion to Dismiss Global Connects and TCN's First Amended Counterclaim Regarding U.S. Pat. No. 8,565,399, Jul. 3, 2014, Exhibit 3—Defendant Global Connect's 2004 User Manual or Guide.
Declaration of Elizabeth L. Derieux in Support of Nobelbiz's Renewed Motion to Dismiss Global Connects and TCN's First Amended Counterclaim Regarding U.S. Pat. No. 8,565,399, Jul. 3, 2014, Exhibit 4—Defendant TCN's 2004 User Manual or Guide.
Declaration of Elizabeth L. Derieux in Support of Nobelbiz's Renewed Motion to Dismiss Global Connects and TCN's First Amended Counterclaim Regarding U.S. Pat. No. 8,565,399, Jul. 3, 2014, Exhibit 5—correct document entitled, "Ex. A. Global Connect's Representative Claim Chart (Invalidity) for Global Connect's 2004 System.".
Declaration of Elizabeth L. Derieux in Support of Nobelbiz's Renewed Motion to Dismiss Global Connects and TCN's First Amended Counterclaim Regarding U.S. Pat. No. 8,565,399, Jul. 3, 2014, Exhibit 6—document entitled, "Ex. B Global Connect's Representative Claim Chart (Invalidity) for Sep. 2004 GC Users Guide.".
Declaration of Elizabeth L. Derieux in Support of Nobelbiz's Renewed Motion to Dismiss Global Connects and TCN's First Amended Counterclaim Regarding U.S. Pat. No. 8,565,399, Jul. 3, 2014, Exhibit 7—a document entitled, "Exhibit A.11 - TCN, Inc.'s 2004 System.".
Declaration of Elizabeth L. Derieux in Support of Nobelbiz's Renewed Motion to Dismiss Global Connects and TCN's First Amended Counterclaim Regarding U.S. Pat. No. 8,565,399, Jul. 3, 2014, Exhibit 8—37 C.F.R. 1.105.
Order Granting Nobelbiz'S Renewed Motion to Dismiss Global Connects and TCN's First Amended Counterclaim Regarding Unenforceability of U.S. Pat. No. 8,565,399, Jul. 3, 2014, *NobelBiz, Inc.* v. *Global Connect, LLC* and *NobelBiz, Inc.* v. *TCN, Inc.*, 6:12-CV-244 and 6:12-CV-247 (E.D. Tex.).
Defendants' Joint Claim Construction Brief Regarding U.S. Pat. No. 8,565,399, Jul. 3, 2014, *NobelBiz, Inc.* v. *Global Connect, LLC* and *NobelBiz, Inc.* v. *TCN, Inc.*, 6:12-CV-244 and 6:12-CV-247 (E.D. Tex.).
Declaration of Ross Spencer Garsson in Support of Defendants' Joint Claim Construction Brief Regarding U.S. Pat. No. 8,565,399, Jul. 3, 2014, *NobelBiz, Inc.* v. *Global Connect, LLC* and *NobelBiz, Inc.* v. *TCN, Inc.*, 6:12-CV-244 and 6:12-CV-247 (E.D. Tex.).
Declaration of Ross Spencer Garsson in Support of Defendants' Joint Claim Construction Brief Regarding U.S. Pat. No. 8,565,399, Jul. 3, 2014, Exhibit 1—U.S. Pat. No. 8,135,122.
Declaration of Ross Spencer Garsson in Support of Defendants' Joint Claim Construction Brief Regarding U.S. Pat. No. 8,565,399, Jul. 3, 2014, Exhibits 2A-2H—excerpts from the prosecution history file for U.S. Appl. No. 13/676,546, which issued as U.S. Pat. No. 8,565,399 ("The '399 Patent Prosecution History").
Declaration of Ross Spencer Garsson in Support of Defendants' Joint Claim Construction Brief Regarding U.S. Pat. No. 8,565,399, Jul. 3, 2014, Exhibit 2A—the Transaction History of the '399 Patent application from the '399 Patent Prosecution History.
Declaration of Ross Spencer Garsson in Support of Defendants' Joint Claim Construction Brief Regarding U.S. Pat. No. 8,565,399, Jul. 3, 2014, Exhibit 2B—copy of the originally-filed '399 Patent application from the '399 Patent Prosecution History.
Declaration of Ross Spencer Garsson in Support of Defendants' Joint Claim Constructions Brief Regarding U.S. Pat. No. 8,565,399, Jul. 3, 2014, Exhibit 2C—the Information Disclosure Statement filed in the '399 Patent Prosecution History on Jul. 11, 2013.
Declaration of Ross Spencer Garsson in Support of Defendants' Joint Claim Construction Brief Regarding U.S. Pat. No. 8,565,399, Jul. 3, 2014, Exhibit 2D—TCN's User's Manual filed in the '399 Patent Prosecution History on Jul. 11, 2013.
Declaration of Ross Spencer Garsson in Support of Defendants' Joint Claim Construction Brief Regarding U.S. Pat. No. 8,565,399, Jul. 3, 2014, Exhibit 2E—communication from the USPTO dated Jul. 18, 2013 in the '399 Patent Prosecution History.
Declaration of Ross Spencer Garsson in Support of Defendants' Joint Claim Construction Brief Regarding U.S. Pat. No. 8,565,399, Jul. 3, 2014, Exhibit 2F—Global Connect's User's Guide filed in the '399 Patent Prosecution History on Jul. 11, 2013.
Declaration of Ross Spencer Garsson in Support of Defendants' Joint Claim Construction Brief Regarding U.S. Pat. No. 8,565,399, Jul. 3, 2014, Exhibit 2G—the Information Disclosure Statement filed in the '399 Patent Prosecution History on Aug. 14, 2013.
Declaration of Ross Spencer Garsson in Support of Defendants' Joint Claim Construction Brief Regarding U.S. Pat. No. 8,565,399, Jul. 3, 2014, Exhibit 2H—Defendant Global Connect, LLC's Disclosures of Invalidity Contentions and Accompanying Document Production filed in the '399 Patent Prosecution History on Aug. 14, 2013.
Declaration of Ross Spencer Garsson in Support of Defendants' Joint Claim Construction Brief Regarding U.S. Pat. No. 8,565,399, Jul. 3, 2014, Exhibit 2I—copy of TCN, Inc.'s Invalidity Contentions filed in the '399 Patent Prosecution History on Aug. 14, 2013.
Declaration of Ross Spencer Garsson in Support of Defendants' Joint Claim Construction Brief Regarding U.S. Pat. No. 8,565,399, Jul. 3, 2014, Exhibit 3—claim chart comparing Global Connect's User's Guide to Claim 1 of the '399 Patent.
Declaration of Ross Spencer Garsson in Support of Defendants' Joint Claim Construction Brief Regarding U.S. Pat. No. 8,565,399, Jul. 3, 2014, Exhibit 4—an excerpt from the Free Dictionary, from American Heritage Dictionary of the English Language (4th Ed. Houghton Miffin Co.) (2000). Specifically, this excerpt is a copy of the definition of "outbound.".
Declaration of Ross Spencer Garsson in Support of Defendants' Joint Claim Construction Brief Regarding U.S. Pat. No. 8,565,399, Jul. 3, 2014, Exhibit 5—an excerpt from the Merriam-Webster's Collegiate Dictionary (10th Ed. Merriam-Webster, Incorporated) (1998). Specifically, the excerpt is a copy of the definition of "set.".
Declaration of Ross Spencer Garsson in Support of Defendants' Joint Claim Construction Brief Regarding U.S. Pat. No. 8,565,399, Jul. 3, 2014, Exhibit 6—an excerpt from Dictionary.com. Specifically, this excerpt is a copy of the definition of "set.".
Claim Construction Hearing Re: U.S. Pat. Nos. 8,135,122 and 8,565,399, Aug. 22, 2014, *NobelBiz, Inc.* v. *LiveVox, Inc.* and *NobelBiz, Inc.* v. *Five9, Inc.*, 4:13-cv-01773-YGR and 4:13-cv-01846-YGR (N.D. Cal.).
Claim Construction Presentation, U.S. Pat. Nos. 8,135,122 and 8,565,399, Presentation of Defendants LiveVox and Five9, Aug. 22, 2014, 4:13-cv-01773-YGR and 4:13-cv-01846-YGR (N.D. Cal.).
Defendant Livevox, Inc.'s Responses to Plaintiff's First Set of Interrogatories (Nos. 1-12), Aug. 28, 2014, 4:13-cv-01773-YGR (N.D. Cal.).
Defendant Livevox, Inc.'s Responses to Plaintiff's First Set of Interrogatories (Nos. 1-12), Aug. 28, 2014, Exhibit A, Livevox Non-Infringement Chart.
Verification for Defendant Livevox, Inc.'s Responses to Plaintiff's First Set of Interrogatories (Nos. 1-12), Aug. 28, 2014, 4:13-cv-01773-YGR (N.D. Cal.).
Defendant Global Connect's First Amended Objections and Answers to Nobelbiz, Inc.'s Third Set of Interrogatories (No. 14), Aug. 20, 2014, *NobelBiz, Inc.* v. *Global Connect, L.L.C.* and *NobelBiz, Inc.* v. *T C N Inc.*, 6:12-cv-244-MHS and 6:12-cv-247-MHS (Ed. Tex.).
Verification of Darrin Bird, Aug. 20, 2014, *NobelBiz, Inc.* v. *Global Connect, L.L.C.* and *NobelBiz, Inc.* v. *T C N Inc.*, 6:12-cv-244-MHS and 6:12-cv-247-MHS (E.D. Tex.).
Defendant FIVE9, Inc.'s Responses to Plaintiff's Interrogatories (Nos. 1-12), Aug. 28, 2014, 4:13-cv-01846-YGR, *NobelBiz, Inc.* v. *Five9, Inc.* (N.D. Cal.).
Defendant FIVE9, Inc.'s Responses to Plaintiff's Interrogatories (Nos. 1-12), Aug. 28, 2014, Exhibit A, FIVE9 Non-Infringement Chart.
Verification for Defendant FIVE9, Inc.'s Responses to Plaintiff's Interrogatories (Nos. 1-12), Aug. 28, 2014, 4:13-cv-01846-YGR, *NobelBiz, Inc.* v. *Five9, Inc.* (N.D. Cal.).

(56) References Cited

OTHER PUBLICATIONS

Defendant Global Connect's Second Amended Objections and Answers to Nobelbiz, Inc.'s First Set of Interrogatories (Nos. 1-11), Aug. 20, 2014, *NobelBiz, Inc. v. Global Connect, L.L.C.* and *NobelBiz, Inc. v. T C N Inc.*, 6:12-cv-244-MHS and 6:12-cv-247-MHS (E.D. Tex.).
Declaration of Ross Spencer Garsson in Support of Defendants' Joint Claim Construction Brief Regarding U.S. Pat. No. 8,565,399, Jul. 3, 2014, Exhibit 2A-2H—excerpts from the prosecution history file for U.S. Appl. No. 13/676,546, which issued as U.S. Pat. No. 8,565,399 ("The '399 Patent Prosecution History").
Declaration of Ross Spencer Garsson in Support of Defendants' Joint Claim Construction Brief Regarding U.S. Pat. No. 8,565,399, Jul. 3, 2014, Exhibit 7—37 C.F.R. § 1.97.
Declaration of Ross Spencer Garsson in Support of Defendants' Joint Claim Construction Brief Regarding U.S. Pat. No. 8,565,399, Jul. 3, 2014, Exhibit 8—37 C.F.R. § 1.98.
Defendants' Joint Claim Construction Sur-Replybrief Regarding U.S. Pat. No. 8,565,399, Jul. 17, 2014, *NobelBiz, Inc. v. Global Connect, LLC* and *NobelBiz, Inc. v. TCN, Inc.*, 6:12-CV-244 and 6:12-CV-247 (E.D. Tex.).
Declaration of Ross Spencer Garsson in Support of Defendants' Joint Claim Construction Sur-Reply Brief Regarding U.S. Pat. No. 8,565,399, Jul. 17, 2014, *NobelBiz, Inc. v. Global Connect, LLC* and *NobelBiz, Inc. v. TCN, Inc.*, 6:12-CV-244 and 6:12-CV-247 (Ed. Tex.).
Declaration of Ross Spencer Garsson in Support of Defendants' Joint Claim Construction Sur-Reply Brief Regarding U.S. Pat. No. 8,565,399, Jul. 17, 2014, Exhibit 2J-2K—excerpts from the prosecution history file for U.S. Appl. No. 13/676,546, which issued as U.S. Pat. No. 8,565,399 ("the '399 Patent Prosecution History").
Declaration of Ross Spencer Garsson in Support of Defendants' Joint Claim Construction Sur-Reply Brief Regarding U.S. Pat. No. 8,565,399, Jul. 17, 2014, Exhibit 2J—the Office Communication, dated Jul. 18, 2013 from the '399 Patent Prosecution History.
Declaration of Ross Spencer Garsson in Support of Defendants' Joint Claim Construction Sur-Reply Brief Regarding U.S. Pat. No. 8,565,399, Jul. 17, 2014, Exhibit 2K—the Notice of Allowability, dated Sep. 18, 2013 from the '399 Patent Prosecution History.
Defendants' Joint Objections to Plaintiff's Extrinsic Evidence and Defendants' Joint Motion to Strike Such Extrinsic Evidence and to Strike Portions of Plaintiff's Claim Construction Reply in Reliance Thereof, Jul. 17, 2014, *NobelBiz, Inc. v. Global Connect, LLC* and *NobelBiz, Inc. v. TCN, Inc.*, 6:12-CV-244 and 6:12-CV-247 (E.D. Tex.).
Declaration of Ross Spencer Garsson in Support of Defendants' Joint Objections and Joint Motion to Strike, Jul. 17, 2014, *NobelBiz, Inc. v. Global Connect, LLC* and *NobelBiz, Inc. v. TCN, Inc.*, 6:12-CV-244 and 6:12-CV-247 (E.D. Tex.).
Declaration of Ross Spencer Garsson in Support of Defendants' Joint Objections and Joint Motion to Strike, Jul. 17, 2014, Exhibit A—*TQP Development, LLC v Wells Fargo & Co.*, 2013 WL 6247363 (Ed. Tex. Dec. 2, 2013).
Declaration of Ross Spencer Garsson in Support of Defendants' Joint Objections and Joint Motion to Strike, Jul. 17, 2014, Exhibit B—*Lodsys, LLC v Brother Int'l Corp.*, 2013 WL 6442185 (E.D. Tex. Mar. 12, 2013).
[Proposed] Order Sustaining Defendants' Joint Objections to Plaintiff's Extrinisic Evidence and Granting Defendants' Joint Motion to Strike Plaintiff's Extrinsic Evidence and to Strike Portions of Plaintiff'S Claim Construction Reply in Reliance Thereof, Jul. 17, 2014, *NobelBiz, Inc. v. Global Connect, LLC and NobelBiz, Inc. v. TCN, Inc.*, 6:12-CV-244 and 6:12-CV-247 (E.D. Tex.).
Defendants' Alternate Motion for Leave to Amend Theirpleadings, Jul. 21, 2014, *NobelBiz, Inc. v. Global Connect, LLC* and *NobelBiz, Inc. v. TCN, Inc.*, 6:12-CV-244 and 6:12-CV-247 (E.D. Tex.).
Order Granting Defendants' Alternative Motion for Leave to Amend Their Pleadings, Jul. 21, 2014, *NobelBiz, Inc. v. Global Connect, LLC* and *NobelBiz, Inc. v. TCN, Inc.*, 6:12-CV-244 and 6:12-CV-247 (E.D. Tex.).

Nobelbiz'S Opposition to Defendants' Joint Objection and Motion to Strike Extrinsic Evidence, Jul. 22, 2014, *NobelBiz, Inc. v. Global Connect, LLC* and *NobelBiz, Inc. v. TCN, Inc.*, 6:12-CV-244 and 6:12-CV-247 (E.D. Tex.).
Order, Jul. 22, 2014, *NobelBiz, Inc. v. Global Connect, LLC* and *NobelBiz, Inc. v. TCN, Inc.*, 6:12-CV-244 and 6:12-CV-247 (E.D. Tex.).
Joint Claim Construction Chart, U.S. Pat. No. 8,565,399, Jul. 24, 2014, *NobelBiz, Inc. v. Global Connect, LLC* and *NobelBiz, Inc. v. TCN, Inc.*, 6:12-CV-244 and 6:12-CV-247 (Ed. Tex.).
TCN, Inc.'s Notice of Compliance, Jul. 28, 2014, *NobelBiz, Inc. v. Global Connect, LLC* and *NobelBiz, Inc. v. TCN, Inc.*, 6:12-CV-244 and 6:12-CV-247 (E.D. Tex.).
Defendants' Reply to Their Joint Objections and Motion to Strike Plaintiff's Extrinsic Evidence, Jul. 30, 2014, *NobelBiz, Inc. v. Global Connect, LLC* and *NobelBiz, Inc. v. TCN, Inc.*, 6:12-CV-244 and 6:12-CV-247 (E.D. Tex.).
Declaration of Clinton E. Duke in Support of Defendants' Reply to Their Joint Objections and Motion to Strike Plaintiff's Extrinsic Evidence, Jul. 30, 2014, *NobelBiz, Inc. v. Global Connect, LLC* and *NobelBiz, Inc. v. TCN, Inc.*, 6:12-CV-244 and 6:12-CV-247 (E.D. Tex.).
Nobelbiz's Reply in Support of Its Renewed Motion to Dismiss Global Connects and Ton's First Amended Counterclaim Regarding Unenforceability of U.S. Pat. No. 8,565,399, Aug. 1, 2014, *NobelBiz, Inc. v. Global Connect, LLC* and *NobelBiz, Inc. v. TCN, Inc.*, 6:12-CV-244 and 6:12-CV-247 (E.D. Tex.).
TCN, Inc.'s Responses to NobelBiz's Third Set of Interrogatories (No. 171 to TCN), May 5, 2014, *NobelBiz, Inc. v. Global Connect, LLC* and *NobelBiz, Inc. v. TCN, Inc.*, 6:12-CV-244 and 6:12-CV-247 (E.D. Tex.).
Civil docket for *NobelBiz, Inc. v. Five 9, Inc.*, 6:12-Cv-00243-MHS (Ed. Tex), Sep. 18, 2013.
Civil docket for *NobelBiz, Inc. v. Five 9, Inc.*, 4:13-cv-01846-YGR (n. D. Cal.), Sep. 18, 2013.
Complaint, Apr. 3, 2012, *NobelBiz, Inc. v. Five 9, Inc.*, 6:12-cv-00243-MHS (E.D. Tex).
Declaration of Charles H. Chevalier in Support of Plaintiffs Application for Preliminary Injunction, Apr. 5, 2012, *NobelBiz, Inc. v. Five 9, Inc.*, 6:12-cv-00243-MHS (Ed. Tex).
Declaration of Charles H. Chevalier in Support of Plaintiffs Application for Preliminary Injunction, Apr. 5, 2012, Exhibit 1—a Product Overview taken from Defendant's webpage www.Five9.com.
Declaration of Charles H. Chevalier in Support of Plaintiffs Application for Preliminary Injunction, Apr. 5, 2012, Exhibit 2—an email from Defendant to NobelBiz dated Mar. 20, 2012.
Plaintiff's Application for Preliminary Injunction and Brief in Support, Apr. 5, 2012, *NobelBiz, Inc. v. Five 9, Inc.*, 6:12-cv-00243-LED (Ea Tex.).
Plaintiff's Application for Preliminary Injunction and Brief in Support, Apr. 5, 2012, Exhibit B—Infringement Chart.
Order Granting Plaintiff's Application for Preliminary Injunction, Apr. 5, 2012, *NobelBiz, Inc. v. Five 9, Inc.*, 6:12-cv-00243-LED (E.D. Tex.).
Declaration of James Siminoff in Support of Plaintiffs Application for a Preliminary Injunction, Apr. 5, 2012, *NobelBiz, Inc. v. Five 9, Inc.*, 6:12-cv-00243-LED (E.D. Tex.).
Fives, Inc.'s Objection to Plaintiff's Untimely Filed Exhibit B and Related Motions [Docs 21& 22], Jun. 13, 2012, *NobelBiz, Inc. v. Five 9, Inc.*, 6:12-cv-00243-LED (Ed. Tex.).
Plaintiff's Reply Brief in Support of Its Application for Preliminary Injunction, Jun. 15, 2012, *NobelBiz, Inc. v. Five 9, Inc.*, 6:12-cv-00243-LED (E.D. Tex.).
Plaintiff's Reply Brief in Support of Its Application for Preliminary Injunction, Jun. 15, 2012, Exhibit C—Nobelbiz's Reply Chart to Five 9's "Prior Art" Chart (Exh. D to Harkins Decl.).
Supplemental Declaration of James Siminoff in Support of Plaintiff's Reply Brief in Support of Its Application for Preliminary Injunction, Jun. 11, 2012, *NobelBiz, Inc. v. Five 9, Inc.*, 6:12-cv-00243-LED (E.D. Tex).
Joint Discovery/Case Management Plan, Mar. 14, 2013, *NobelBiz, Inc. v. Five 9, Inc.*, 6:12-cv-243, *NobelBiz, Inc. v. Global Connect,*

(56) References Cited

OTHER PUBLICATIONS

LLC 6:12-cv-244, *NobelBiz, Inc.* v. *Livevox, Inc.*, 6:12-cv-246, *NobelBiz, Inc.* v. *TCN, Inc.*, 6:12-cv-247 (E.D. Tex.).
Amended Complaint, Oct. 21, 2013, *NobelBiz, Inc.* v. *Five 9, Inc.*, 4:13-cv-01846-YGR (N.D. Cal.).
Amended Complaint, Oct. 21, 2013, Exhibit A—webmaster@five9.com home page.
Amended Complaint, Oct. 21, 2013, Exhibit B—U.S. Pat. No. 8,135,122 to Siminoff.
Amended Complaint, Oct. 21, 2013, Exhibit "C" Pending—*NobelBiz* v. *Five9*, Civil Action No. CV-13-01846-YGR.
Amended Complaint, Oct. 5, 2009, Exhibit D—McGuire, Kelly, "Call Center on Demand Provider Releases New On-Demand Call Center Software".
Amended Complaint, Nov. 6, 2009, Exhibit E—McGuire, Kelly, "Additional Features of Five9's Release 7.3 Upgrades User Experience".
Amended Complaint, Oct. 21, 2013, Exhibit F—Five9 "Focus on Results" webpage.
Amended Complaint, Oct. 21, 2013, Exhibit G—http://www.five9.com, Log in Forum.
Amended Complaint, Oct. 21, 2013, Exhibit H—http://www.five9.com, Five9 University "A Solid Foundation for Building Skills".
Corrected Amended Complaint, Oct. 23, 2013, *NobelBiz, Inc.* v. *Five 9, Inc.*, 4:13-cv-01846-YGR (N.D. Cal.).
Corrected Amended Complaint, Oct. 23, 2013, Exhibit A—webmaster@five9.com home page.
Corrected Amended Complaint, Oct. 23, 2013, Exhibit B—U.S. Pat. No. 8,135,122 to Siminoff.
Corrected Amended Complaint, Oct. 23, 2013, Exhibit C—U.S. Pat. No. 8,565,399 to Siminoff.
Corrected Amended Complaint, Oct. 5, 2009, Exhibit D—McGuire, Kelly, "Call Center on Demand Provider Releases New On-Demand Call Center Software".
Corrected Amended Complaint, Nov. 6, 2009, Exhibit E—McGuire, Kelly, "Additional Features of Five9's Release 7.3 Upgrades User Experience".
Corrected Amended Complaint, Oct. 23, 2013, Exhibit F—Five9 "Focus on Results" webpage.
Corrected Amended Complaint, Oct. 23, 2013, Exhibit G—http://www.five9.com, Log in Forum.
Corrected Amended Complaint, Oct. 23, 2013, Exhibit H—http://www.five9.com, Five9 University "A Solid Foundation for Building Skills".
Stipulation and [Proposed] Order Re: Corrected Amended Complaint, Dec. 4, 2013, *NobelBiz, Inc.* v. *Five 9, Inc.*, 4:13-cv-01846-YGR (N.D. Cal.).
Civil Docket for *NobelBiz, Inc.* v. *LiveVox, Inc.*, 6:12-cv-00246-MHS (E.D. Tex.), Sep. 18, 2013.
Civil Docket for *NobelBiz, Inc.* v. *LiveVox, Inc.*, 4:13-cv-01773-YGR (N.D. Cal.), Sep. 18, 2013
Complaint, Apr. 3, 2012, *NobelBiz, Inc.* v. *LiveVox, Inc.* 6:12-cv-00246-LED (Ed. Tex.).
Declaration of Charles H. Chevalier in Support of Plaintiff's Application for a Preliminary Injunction, Apr. 5, 2012, *NobelBiz, Inc.* v. *LiveVox, Inc.* 6:12-cv-00246-LED (E.D. Tex.).
Declaration of Charles H. Chevalier in Support of Plaintiff's Application for a Preliminary Injunction, Apr. 5, 2012, Exhibit 1—a letter from NobelBiz to Defendant (Louis Somme, President, LiveVox, Inc.) dated Feb. 22, 2010.
Declaration of Charles H. Chevalier in Support of Plaintiff's Application for a Preliminary Injunction, Apr. 5, 2012, Exhibit 2—a letter from NobelBiz to Defendant (John McNamara, Chief Marketing Officer, LiveVox, Inc.) dated Feb. 22, 2010.
Declaration of Charles H. Chevalier in Support of Plaintiff's Application for a Preliminary Injunction, Apr. 5, 2012, Exhibit 3—a letter from Aca International to Defendant dated Mar. 10, 2009.
Declaration of Charles H. Chevalier in Support of Plaintiff's Application for a Preliminary Injunction, Apr. 5, 2012, Exhibit 4—copy of a printout from the Defendant's website with the URL: http://www.livevox.com/industries/collections/.
Declaration of Charles H. Chevalier in Support of Plaintiff's Application for a Preliminary Injunction, Apr. 5, 2012, Exhibit 5—a printout from the Defendant's website with the URL: http://www.livevox.com/industries/collections/http://www.livevox.com/news/livevox-enhancesdialercompliance-with-account-penetration-settings/.
Declaration of Charles H. Chevalier in Support of Plaintiff's Application for a Preliminary Injunction, Apr. 5, 2012, Exhibit 6—an email from NobelBiz to Defendant dated Mar. 20, 2012.
Declaration of Charles H. Chevalier in Support of Plaintiff's Application for a Preliminary Injunction, Apr. 5, 2012, Exhibit 7—an email from Defendant to NobelBiz dated Mar. 20, 2012.
Plaintiff's Application for Preliminary Injunction and Brief in Support, Apr. 5, 2012, *NobelBiz, Inc.* v. *LiveVox, Inc.* 6:12-cv-00246-LED (E.D. Tex.).
Plaintiff's Application for Preliminary Injunction and Brief in Support, Apr. 5, 2012, Exhibit A—U.S. Pat. No. 8,135,122 to Siminoff.
[Proposed] Order Granting Plaintiff's Application for Preliminary Injunction, Apr. 5, 2012, *NobelBiz, Inc.* v. *LiveVox, Inc.* 6:12-cv-00246-LED (E.D. Tex.).
Declaration of James Siminoff in Support of Plaintiffs Application for a Preliminary Injunction, Apr. 5, 2012, *NobelBiz, Inc.* v. *LiveVox, Inc.* 6:12-cv-00246-LED (E.D. Tex.).
Livevox, Inc.'s Answer to Complaint, May 31, 2012, *NobelBiz, Inc.* v. *LiveVox, Inc.* 6:12-cv-00246-LED (E.D. Tex.).
Livevox, Inc.'s Objection to Plaintiff's Untimely Filed Exhibit B and Related Motions [Docs 32 & 33], Jun. 13, 2012, *NobelBiz, Inc.* v. *LiveVox, Inc.* 6:12-cv-00246-LED (E.D. Tex.).
Plaintiff's Reply Brief in Support of Its Application for Preliminary Injunction, Jun. 15, 2012, *NobelBiz, Inc.* v. *LiveVox, Inc.* 6:12-cv-00246-LED (E.D. Tex.).
Plaintiff's Reply Brief in Support of Its Application for Preliminary Injunction, Jun. 15, 2012, Exhibit C—Nobelbiz's Reply Chart to Livevox's "Prior Art" Chart (Exh. D to Harkins Decl).
Supplemental Declaration of James Siminoff in Support of Plaintiff's Reply Brief in Support of Its Application for Preliminary Injunction, Jun. 11, 2012, *NobelBiz, Inc.* v. *LiveVox, Inc.* 6:12-cv-00246-LED (E.D. Tex.).
Corrected Amended Complaint, Oct. 23, 2013, Exhibit J—"SafeSoft Solutions: The agent friendly call center vendor", www.telecommassociation.com/vendor/safesoft/120326-5.htm.
Corrected Amended Complaint, Oct. 23, 2013, Exhibit K—"SafeSoft Solutions: The agent friendly call center vendor", www.telecommassociation.com/vendor/safesoft/120322-4.htm.
Corrected Amended Complaint, Oct. 23, 2013, Exhibit L—www.safesoftsolutions.com/free-trial/.
Corrected Amended Complaint, Oct. 23, 2013, Exhibit M—www.safesoftsolutions.com/support-center/setup-training/.
Order Dismissing Case, Nov. 8, 2013, *NobelBiz, Inc.* v. *Safesoft Solutions Inc.*, 4:13-cv-02423-YGR (N.D. Cal.).
Civil Docket for *NobelBiz, Inc.* v. *Veracity Networks, LLC*, 4:13-cv-02518-YGR (N.D. Cal.). Sep. 18, 2013.
Complaint, Jun. 4, 2013, *NobelBiz, Inc.* v. *Veracity Networks, LLC*, 4:13-cv-02518-YGR (N.D. Cal.).
Complaint, Jun. 4, 2013, Exhibit A—U.S. Pat. No. 8,135,122 to Siminoff.
Civil Docket for *NobelBiz, Inc.* v. *AireSpring, Inc.*, 6:12-cv-00242-LED (E.D. Tex), Sep. 18, 2013.
Complaint, Apr. 3, 2012, *NobelBiz, Inc.* v. *AireSpring, Inc.*, 6:12-cv-00242-LED (E.D. Tex).
Declaration of Charles H. Chevalier in Support of Plaintiff'S Application for a Preliminary Injunction, Apr. 5, 2012, *NobelBiz, Inc.* v. *AireSpring, Inc.*, 6:12-cv-00242-LED (F.D. Tex).
Declaration of Charles H. Chevalier in Support of Plaintiff's Application for a Preliminary Injunction, Apr. 5, 2012, Exhibit 1—letter from Defendant to NobelBiz dated Nov. 22, 2011.
Declaration of Charles H. Chevalier in Support of Plaintiff's Application for a Preliminary Injunction, Apr. 5, 2012, Exhibit 2—Defendant's Master Service Agreement obtained from Defendant's website at http://www.airespring.com/serviceterms/128-master-service-agreement.html.

(56) References Cited

OTHER PUBLICATIONS

Declaration of Charles H. Chevalier in Support of Plaintiff's Application for a Preliminary Injunction, Apr. 5, 2012, Exhibit 3—an email from Defendant to NobelBiz dated Mar. 22, 2012.
Plaintiff's Application for Preliminary Injunction and Brief in Support, Apr. 5, 2012, *NobelBiz, Inc.* v. *AireSpring, Inc.*, 6:12-cv-00242-LED (E.D. Tex).
Plaintiff's Application for Preliminary Injunction and Brief in Support, Apr. 5, 2012, Exhibit A—U.S. Pat. No. 7,899,169 to Siminoff.
Order Granting Plaintiff's Application for Preliminary Injunction, Apr. 5, 2012, *NobelBiz, Inc.* v. *AireSpring, Inc.*, 6:12-cv-00242-LED (E.D. Tex).
Declaration of James Siminoff in Support of Plaintiffs Application for a Preliminary Injunction, Apr. 5, 2012, *NobelBiz, Inc.* v. *AireSpring, Inc.*, 6:12-cv-00242-LED (E.D. Tex).
Order of Dismissal, Jul. 23, 2012, *NobelBiz, Inc.* v. *AireSpring, Inc.*, 6:12-cv-00242-LED (E.D. Tex).
Civil Docket for *NobelBiz, Inc.* v. *Connect First, Inc.*, 6:12-cv-00549-LED (E.D. Tex.), Sep. 18, 2013.
Complaint, Aug. 20, 2012, *NobelBiz, Inc.* v. *Connect First, Inc.*, 6:12-cv-00549-LED (E.D. Tex.).
Order of Dismissal, Sep. 20, 2012, *NobelBiz, Inc.* v. *Connect First, Inc.*, 6:12-cv-00549-LED (E.D. Tex.).
Civil Docket for *NobelBiz, Inc.* v. *Global Connect, L.L.C.*, 6:12-cv-00244-MHS (E.D. Tex.). Sep. 18, 2013.
Complaint, Apr. 3, 2012, *NobelBiz, Inc.* v. *Global Connect, L.L.C.*, 6:12-cv-00244-MHS (E.D. Tex.).
Declaration of Charles H. Chevalier in Support of Plaintiff's Application for a Preliminary Injunction, Apr. 5, 2012, *NobelBiz, Inc.* v. *Global Connect, LLC.*, 6:12-cv-00244-MHS (Ed. Tex.).
Declaration of Charles H. Chevalier in Support of Plaintiff's Application for a Preliminary Injunction, Apr. 5, 2012, Exhibit 1—a facsimile from Defendant to NobelBiz dated Sep. 8, 2011.
Declaration of Charles H. Chevalier in Support of Plaintiff's Application for a Preliminary Injunction, Apr. 5, 2012, Exhibit 2—an email from Defendant to NobelBiz dated Mar. 20, 2012.
Plaintiff's Application for Preliminary Injunction and Brief in Support, Apr. 5, 2012, *NobelBiz, Inc.* v. *Global Connect, LLC.*, 6:12-cv-00244-MHS (Ed. Tex.).
Declaration of James Siminoff in Support of Plaintiffs Application for a Preliminary Injunction, Apr. 5, 2012, *NobelBiz, Inc.* v. *Global Connect, L.L.C.*, 6:12-cv-00244-MHS (Ed. Tex.).
Plaintiff's Reply Brief in Support of Its Application for Preliminary Injunction, Jun. 15, 2012, *NobelBiz, Inc.* v. *Global Connect, L.L.C.*, 6:12-cv-00244-MHS (Ed. Tex.).
Plaintiff's Reply Brief in Support of Its Application for Preliminary Injunction, Jun. 15, 2012, Exhibit C—Report and Order—Before the Federal Communications Commission Washington, D.C 20554, WC Docket. No. 11-39.
Supplemental Declaration of James Siminoff in Support of Plaintiff's Reply Brief in Support of Its Application for Preliminary Injunction, Jun. 11, 2012, *NobelBiz, Inc.* v. *Global Connect, L.L.C.*, 6:12-cv-00244-MHS (E.D. Tex.).
Amended Complaint, Apr. 25, 2013, *NobelBiz, Inc.* v. *Global Connect, L.L.C.*, 6:12-cv-00244-MHS (E.D. Tex.).
Amended Complaint, Apr. 25, 2013, Exhibit A—of U.S. Pat. No. 8,135,122 to Siminoff.
Defendants' Joint Surreply in Opposition to Plaintiff's Renewed Motion to Dismiss Defendants' First Amended Counterclaim Regarding Unenforceability of U.S. Pat. No. 8,565 399, Aug. 11, 2014, *NobelBiz, Inc.* v. *Global Connect, LLC*, 6:12-cv-244-MHS and *NobelBiz, Inc.* V. *TNC, Inc.*, 6:12-Cv-247-MHS (E.D. Tex.).
Civil Docket for *NobelBiz, Inc.* v. *Global Connect, L.L.C.*, 6:13-cv-00804-MHS (E.D. Tex.), Sep. 18, 2013.
Complaint, Oct. 21, 2013, *NobelBiz, Inc.* v. *Global Connect, L.L.C.*, 6:13-cv-00804-MHS (E.D. Tex.).
Complaint, Oct. 21, 2013, Exhibit A—"Global Connect Releases GC1 Peak Dialer.".
Complaint, Oct. 21, 2013, Exhibit B—"Latest News".
Complaint, Oct. 21, 2013, Exhibit C—Assessment and Technology Staff Members.
Complaint, Jun. 19, 2012, Exhibit D—Wiser, Tracey, "Call Transfer and Account Call Escalation Enhancements Offer GC1 Peak Dialer Users Even More Power, Productivity and Profit".
Complaint, Oct. 21, 2013, Exhibit E—"Interactive Collections Communications", www.paystreamadvisors.com.
Order to Meet, Report, and Appear At Scheduling Conference, Jan. 7, 2014, *NobelBiz, Inc.* v. *Global Connect, LLC*, 6:13-cv-804 and *NobelBiz, Inc.* v. *TNC, Inc.*, 6:13-cv-805 (E.D. Tex.).
Joint Discovery/Case Management Plan, Jan. 7, 2014, *NobelBiz, Inc.* v. *Global Connect, LLC*, 6:13-cv-804 (E.D. Tex.).
Order Denying Motions to Dismiss, Feb. 26, 2014, *NobelBiz, Inc.* v. *Global Connect, LLC, and TCN, Inc.*, 6:13-cv-804 (E.D. Tex.).
Order Consolidating Cases, Feb. 27, 2014, *NobelBiz, Inc. v. Global Connect, LLC*, 6:12-cv-244 and *NobelBiz, Inc.* v. *TNC, Inc.*, 6:12-cv-247 (E.D. Tex.).
Civil Docket for *NobelBiz, Inc.* v. *inContact, Inc.*, 6:12-cv-00272-LED (E.D. Tex.), Sep. 18, 2013.
Complaint, Apr. 17, 2012, *NobelBiz, Inc.* v. *inContact, Inc.*, 6:12-cv-00272-LED (E.D. Tex.).
Order, Dec. 3, 2012, *NobelBiz, Inc.* v. *LiveVox, Inc.* 6:12-cv-00246-LED (E.D. Tex.).
Amended Complaint, Oct. 21, 2013, *NobelBiz, Inc.* v. *LiveVox, Inc.* 4:13-cv-01773-YGR (N.D. Cal.).
Amended Complaint, Oct. 20, 2013, Exhibit A—www.livevox.com/about-livevox/contact-us/.
Amended Complaint, Oct. 21, 2013, Exhibit "C" Pending—*NobelBiz* v. *LiveVox*, Civil Action NO. Cv-13-01773-YGR.
Amended Complaint, Dec. 15, 2009, Exhibit D—Narain, Divya, "LiveVox Adds New Enhancements to State Dialing Compliance Suite", outbound-call•center.tmcnet.com/topics/hosted-call•center/articles/70977-livevox• adds-new-enhancements-statedialing-compliance•suite.htm.
Amended Complaint, Oct. 21, 2013, Exhibit E—a letter from ACA International to Defendant dated Mar. 10, 2009.
Amended Complaint, Oct. 21, 2013, Exhibit F—LiveVox Call Details for Apr. 04, 2010, https://line.livevox.com/ livevox/carrier_usage/2010/April/LiveVox_Call_Details0404201.
Amended Complaint, Oct. 21, 2013, Exhibit G—a letter from NobelBiz to Defendant (Louis Somme, President, LiveVox, Inc.) dated Feb. 22, 2010.
Amended Complaint, Oct. 21, 2013, Exhibit H—https://twitter.com/LiveVoxTraining.
Corrected Amended Complaint, Oct. 23, 2013, *NobelBiz, Inc.* v. *LiveVox, Inc.* 4:13-cv-01773-YGR (N.D. Cal.).
Corrected Amended Complaint, Oct. 23, 2013, Exhibit A—www.livevox.com/about-livevox/contact-us/.
Corrected Amended Complaint, Oct. 23, 2013, Exhibit C—of U.S. Pat. No. 8,565,399 to Siminoff.
Corrected Amended Complaint, Dec. 15, 2009, Exhibit D—Narain, Divya, "LiveVox Adds New Enhancements to State Dialing Compliance Suite", outbound-call•centertmcnetcom/topics/hosted-call•center/ articles/70977-livevovadds-new-enhancements-state•dialing-compliance•suite.htm.
Corrected Amended Complaint, Dec. 15, 2009, Exhibit E—a letter from ACA International to Defendant dated Mar. 10, 2009.
Corrected Amended Complaint, Oct. 23, 2013, Exhibit F—LiveVox Call Details for Apr. 04, 2010, https://line. livevox.com/livevox/carrier_usage/2010/April/LiveVox_Call_Details0404201.
Corrected Amended Complaint, Oct. 23, 2013, Exhibit G—a letter from NobelBiz to Defendant (Louis Somme, President, LiveVox, Inc.) dated Feb. 22, 2010.
Corrected Amended Complaint, Oct. 23, 2013, Exhibit H—https://twitter.com/LiveVoxTraining.
Stipulation and [Proposed] Order Re: Corrected Amended Complaint, Dec. 4, 2013, *NobelBiz, Inc.* v. *LiveVox, Inc.* 4:13-cv-01773-YGR (N.D. Cal.).
Joint Tutorial Regarding U.S. Pat. No. 8,135,122 and 8,565,399, *NobelBiz, Inc.* v. *LiveVox, Inc.*, 4:13-cv-01773-YGR and *NobelBiz, Inc.* v. *Five 9, Inc.*, 4:13-cv-01846-YGR (N.D. Cal.), Sep. 18, 2013.
Civil Docket for *Safesoft Solutions Inc* v. *Nobelbiz Inc*, 2:13-cv-07915-ODW-CW (C.D. Cal.), Sep. 18, 2013.

(56) References Cited

OTHER PUBLICATIONS

Civil Docket for *NobelBiz, Inc.* v. *Safesoft Solutions Inc.*, 4:13-cv-02423-YGR (N.D. Cal.), Sep. 18, 2013.
Complaint, May 29, 2013, *NobelBiz, Inc.* v. *Safesoft Solutions Inc.* 3:13-cv-02423-WHA (N.D. Cal.).
Joint Case Management Statement, Sep. 16, 2013, *NobelBiz, Inc.* v. *Safesoft Solutions Inc.*, 4:13- cv-02423-YGR (N.D. Cal.).
Amended Complaint, Oct. 21, 2013, *NobelBiz, Inc.* v. *Safesoft Solutions Inc.*, 4:13-cv-02423-YGR (N.D. Cal.).
Amended Complaint, Oct. 21, 2013, Exhibit A—www.safesoftsolutions.com/products/call-center-features/localtouch/.
Amended Complaint, Oct. 21, 2013, Exhibit B—Wayback Machine, www.safesoftsolutions.com/products/callcenter-features/local-touch/.
Amended Complaint, Oct. 21, 2013, Exhibit C—web.archive.org/web/20130131035034/http://www. safesolutions.com/products/call-center-features/local-touch/.
Amended Complaint, Oct. 21, 2013, Exhibit D—4.6 Areacode Based Caller ID, webcache.googleusercontent.com/search.
Amended Complaint, Oct. 21, 2013, Exhibit E—MarketDialer Lite Admin Faq, support.safesolutions.comlindax.php?pg=kb.printer.friendly&id=13#p692.
Amended Complaint, Oct. 21, 2013, Exhibit F—www.marketdialer.com/features.php.
Amended Complaint, Oct. 21, 2013, Exhibit G—U.S. Pat. No. 8,135,122 to Siminoff.
Amended Complaint, Oct. 21, 2013, Exhibit "H" Pending—*NobelBiz* v. *SafeSoft*, Civil Action No. Cv-13/2423YGR.
Amended Complaint, Feb. 22, 2012, Exhibit I—Baldwin, Dan, "Competitive Intelligence: How do SafeSoft's Hosted Call Center Solutions Compare to What You're Using Now?", www.businessphonenews.com/2012/02/competitive-intelligence-how-do-safesofts-hosted-call-center-solutions-compare-to-what-youre-using-n.htm.
Amended Complaint, Oct. 21, 2013 Exhibit J—"SafeSoft Solutions: the agent friendly call center vendor", www.telecommassociation.com/vendor/safesoft/120326-5.htm.
Amended Complaint, Oct. 21, 2013 Exhibit K—"SafeSoft Solutions: the agent friendly call center vendor", www.telecommassociation.com/vendor/safesoft/120322-4.htm.
Amended Complaint, Oct. 21, 2013, Exhibit L—www.safesoftsolutions.com/free-trial/.
Amended Complaint, Oct. 21, 2013, Exhibit M—www.safesoftsolutions.com/support-center/setup-training/.
Corrected Amended Complaint, Oct. 23, 2013, *NobelBiz, Inc.* v. *Safesoft Solutions Inc.*, 4:13-cv-02423-YGR (N.D. Cal.).
Corrected Amended Complaint, Oct. 23, 2013, Exhibit A—www.safesoftsolutions.com/products/call-centerfeatures/local-touch/.
Corrected Amended Complaint, Oct. 23, 2013, Exhibit B—Wayback Machine, www.safesoftsolutions.com/products/call-center-features/local-touch/.
Corrected Amended Complaint, Oct. 23, 2013, Exhibit C—web.archive.org/web120130131035034/http://www.safesolutions.com/products/call-center-features/local-touch/.
Corrected Amended Complaint, Oct. 23, 2013, Exhibit D—4.6 Areacode Based Caller ID, webcache.googleusercontent.com/search.
Corrected Amended Complaint, Oct. 23, 2013, Exhibit E—MarketDialer Lite Admin FAQ, support. safesolutions.comlindax.php?pg=kb.printerfriendly&id=13#p692.
Corrected Amended Complaint, Oct. 23, 2013, Exhibit F—www.marketdialer.comlfeatures.php.
Corrected Amended Complaint, Oct. 23, 2013, Exhibit G—U.S. Pat. No. 8,135,122 to Siminoff.
Corrected Amended Complaint, Oct. 23, 2013, Exhibit H—U.S. Pat. No. 8,565,399 to Siminoff.
Corrected Amended Complaint, Oct. 23, 2013, Exhibit I—Feb. 22, 2012, Exhibit I—Baldwin, Dan, "Competitive Intelligence: How do SafeSoft's Hosted Call Center Solutions Compare to What You're Using Now?", www.businessphonenews.com/2012/02/competitive-intelligence-how-do-safesofts-hosted-call-center-solutionscompare-to-what-youre-using-n.htm.
Order Granting Plaintiff's Application for Preliminary Injunction, Apr. 5, 2012, *NobelBiz, Inc.* v. *TCN,Inc.* 6:12-cv-000247-LED (E.D. Tex.).
Declaration of James Siminoff in Support of Plaintiffs Application for a Preliminary Injunction, Apr. 5, 2012, *NobelBiz, Inc.* v. *TCN,Inc*, 6:12-cv-000247-LED (Ea Tex.).
Plaintiff's Reply Brief in Support of Its Application for Preliminary Injunction, Jun. 15, 2012, *NobelBiz, Inc.* v. *TCN,Inc*, 6:12-cv-000247-LED (E.D. Tex.).
Supplemental Declaration of James Siminoff in Support of Plaintiff's Reply Brief in Support of Its Application for Preliminary Injunction, Jun. 11, 2012, *NobelBiz, Inc.* v. *TCN,Inc*, 6:12- cv-000247-LED (E.D. Tex.).
Amended Complaint, Apr. 25, 2013, *NobelBiz, Inc.* v. *TCN,Inc*, 6:12-cv-000247-LED (E.D. Tex.).
Amended Complaint, Apr. 25, 2013, Exhibit A—U.S. Pat. No. 8,135,122 to Siminoff.
Defendants' Joint Surreply in Opposition to Plaintiff's Renewed Motion to Dismiss Defendants' First Amended Counterclaim Regarding Unenforceability of U.S. Pat. No. 8,565 399, Aug. 11, 2014, *NobelBiz, Inc.* v. *Global Connect, LLC*, 6:12-cv-244-MHS and *NobelBiz, Inc.* v. *TCN, Inc.*, 6:12-Cv-247-MHS (E.D. Tex.).
Civil Docket for *NobelBiz, Inc.* v. *T C N, Inc.*, 6:13-cv-00805-MHS (E.D. Tex.), Sep. 18, 2013.
Complaint, Oct. 21, 2013, *NobelBiz, Inc.* v. *T C N, Inc.*, 6:13-cv-00805-MHS (E.D. Tex.).
Complaint, Oct. 21, 2013, Exhibit A—"Collections Made Easy with TCN at the #ACAConv".
Complaint, Oct. 21, 2013, Exhibit B—"TCN's Local Caller ID Feature Increases Customer Contact Rates by 50-100%".
Complaint, Oct. 21, 2013, Exhibit C—"Collections".
Complaint, Oct. 21, 2013, Exhibit D—"Downloads".
Complaint, Oct. 21, 2013, Exhibit E—"Management Login".
Order Consolidating Cases, Feb. 27, 2014, *NobelBiz, Inc.* v. *Global Connect, LLC*, 6:12-cv-244-MHS and *NobelBiz, Inc.* v. *TCN, Inc.*, 6:12-cv-247-MHS (E.D. Tex.).
Complaint, Apr. 17, 2012, Exhibit A—U.S. Pat. No. 8,135,122 to Siminoff.
Plaintiff's Application for Preliminary Injunction and Brief in Support, Apr. 17, 2012, *NobelBiz, Inc.* v. *inContact, Inc.*, 6:12-cv-00272-LED (E.D. Tex.).
Plaintiff's Application for Preliminary Injunction and Brief in Support, Apr. 17, 2012, Exhibit A—U.S. Pat. No. 8,135,122 to Siminoff.
Plaintiff's Application for Preliminary Injunction and Brief in Support, Apr. 17, 2012, Exhibit B—Infringement Chart.
Declaration of James Siminoff in Support of Plaintiff's Application for a Preliminary Injunction, Apr. 16, 2012, *NobelBiz, Inc.* v. *inContact, Inc.*, 6:12-cv-00272-LED (E.D. Tex.).
Declaration of Charles H. Chevalier in Support of Plaintiff's Application for a Preliminary Injunction, Apr. 17, 2012, *NobelBiz, Inc.* v. *inContact, Inc.*, 6:12-cv-00272-LED (E.D. Tex.).
Declaration of Charles H. Chevalier in Support of Plaintiff's Application for a Preliminary Injunction, Apr. 17, 2012, Exhibit 1—a blog posting from the inContact BlogTM having the URL: http://blog.incontact.com/blog/henry-standre/jurisdictionits-not-just-important-its-law.
Declaration of Charles H. Chevalier in Support of Plaintiff's Application for a Preliminary Injunction, Apr. 17, 2012, Exhibit 2—an email exchange between Defendant and NobelBiz dated from Mar. 22, 2012 to Mar. 30, 2012.
Answer and Counterclaim of Defendant Incontact, Inc. To Nobelbiz, Inc.'S Complaint, Jun. 8, 2012, *NobelBiz, Inc.* v. *inContact, Inc.*, 6:12-cv-00272-LED (E.D. Tex.).
Defendant and Counterclaim Plaintiff Incontact, Inc.'s Opposition to Plaintiff's Motion for Preliminary Injunction, Jun. 8, 2012, *NobelBiz, Inc.* v. *inContact, Inc.* and *inContact, Inc.* v. *NobelBiz, Inc.*, 6:12-cv-00272-LED (E.D. Tex.).
Defendant and Counterclaim Plaintiff Incontact, Inc.'s Opposition to Plaintiff's Motion for Preliminary Injunction, Jun. 8, 2012, Exhibit B—Administration User Guide.

(56) References Cited

OTHER PUBLICATIONS

Defendant and Counterclaim Plaintiff Incontact, Inc.'s Opposition to Plaintiff's Motion for Preliminary Injunction, Jun. 8, 2012, Exhibit C—Product Overview.
Order of Dismissal, Aug. 9, 2012, *NobelBiz, Inc.* v. *inContact, Inc.*, 6:12-cv-00272-LED (E.D. Tex.).
Civil Docket for *NobelBiz, Inc.* v. *InsideSales.com*, 6:13-cv-00360-MHS (E.D. Tex.), Sep. 18, 2013.
Complaint, Apr. 25, 2013, *NobelBiz, Inc.* v. *InsideSales.com*, 6:13-cv-00360-MHS (E.D. Tex.).
Complaint, Apr. 25, 2013, Exhibit A—U.S. Pat. No. 8,135,122 to Siminoff.
Answer to Complaint and Counterclaims of Defendant Insidesales.com, Inc., Jan. 8, 2014, *NobelBiz, Inc.* v. *InsideSales.com*, 6:13-cv-00360-MHS (Ed. Tex.).
Nobelbiz, Inc.'s Answer to Defendant InsideSales.com, Inc.'s Counterclaims, Feb. 3, 2014, *NobelBiz, Inc.* v. *InsideSales.com*, 6:13-cv-00360-MHS (E.D. Tex.).
First Amended Complaint, May 21, 2014, *NobelBiz, Inc.* v. *InsideSales.com*, 6:13-cv-00360-MHS (E.D. Tex.).
First Amended Complaint, May 21, 2014, Exhibit A—U.S. Pat. No. 8,135,122 to Siminoff.
First Amended Complaint, May 21, 2014, Exhibit B—U.S. Pat. No. 8,565,399 to Siminoff.
Civil Docket for *NobelBiz, Inc.* v. *Intelligent Contacts, Inc.*, 6:12-cv-00831-MHS (E.D. Tex.), Sep. 18, 2013.
Complaint, Oct. 30, 2012, *NobelBiz, Inc.* v. *Intelligent Contacts6, Inc.*, 6:12-cv-00831-MHS (E.D. Tex.).
Order Denying Motion for Default Judgment, Feb. 11, 2014, *NobelBiz, Inc.* v. *Intelligent Contacts, Inc.*, 6:12-cv-00831-MHS (F.D. Tex.).
Order Vacating Entry of Default and Dismissing Case, Apr. 23, 2014, *NobelBiz, Inc.* v. *Intelligent Contacts, Inc.*, 6:12-cv-00831-MHS (E.D. Tex.).
Final Judgment, Apr. 23, 2014, *NobelBiz, Inc.* v. *Intelligent Contacts, Inc.*, 6:12-cv-00831-MHS (E.D. Tex.).
Civil Docket for *NobelBiz, Inc.* v. *Omega Services, LLC*, 6:12-cv-00432-LED (E.D. Tex.), Sep. 18, 2013.
Complaint, Jul. 6, 2012, *NobelBiz, Inc.* v. *Omega Services, LLC*, 6:12-cv-00432-LED (E.D. Tex.).
Complaint, Jul. 6, 2012, Exhibit A—U.S. Pat. No. 7,899,169 to Siminoff.
Order of Dismissal, Aug. 30, 2012, *NobelBiz, Inc.* v. *Omega Services, LLC*, 6:12-cv-00432-LED (E.D. Tex.).
Civil Docket for *NobelBiz, Inc.* v. *Stage 2 Networks, L.L.C.*, 6:12-cv-00308-LED (E. D. Tex.), Sep. 18, 2013.
Complaint, May 8, 2012, *NobelBiz, Inc.* v. *Stage 2 Networks, L.L.C.*, 6:12-cv-00308-LED (E. D. Tex.).
Complaint, May 8, 2012, Exhibit A—U.S. Pat. No. 8,135,122 to Siminoff.
Plaintiff's Application for Preliminary Injunction and Brief in Support, May 10, 2012, *NobelBiz, Inc.* v. *Stage 2 Networks, LLC.*, 6:12-cv-00308-LED (E. D. Tex.).
Plaintiff's Application for Preliminary Injunction and Brief in Support, May 10, 2012, Exhibit A—U.S. Pat. No. 8,135,122 to Siminoff.
Declaration of James Siminoff in Support of Plaintiff's Application for a Preliminary Injunction, May 10, 2012, *NobelBiz, Inc.* v. *Stage 2 Networks, L.L.C.*, 6:12-cv-00308-LED (E. D. Tex.).
Declaration of Charles H. Chevalier in Support of Plaintiff's Application for a Preliminary Injunction, May 8, 2012, *NobelBiz, Inc.* v. *Stage 2 Networks, L.L.C.*, 6:12-cv-00308-LED (E. D. Tex.).
Declaration of Charles H. Chevalier in Support of Plaintiff's Application for a Preliminary Injunction, May 8, 2012, Exhibit 1—a news release dated Jan. 26, 2010 having the title Stage 2 Networks Launches New eCONNECTSM Product.
Declaration of Charles H. Chevalier in Support of Plaintiff's Application for a Preliminary Injunction, May 8, 2012, Exhibit 2—an email exchange between Defendant and NobelBiz dated from Mar. 22, 2012 to Mar. 27, 2012.
Declaration of Charles H. Chevalier in Support of Plaintiff's Application for a Preliminary Injunction, May 8, 2012, Exhibit 3—a CRE8 Group Inc. posting having the URL: http://www.cre8groupinc.com/portfolio/cre8group_collateral_portfolio/files/assets/seo/page4.html.
Declaration of Charles H. Chevalier in Support of Plaintiff's Application for a Preliminary Injunction, May 8, 2012, Exhibit 4—a web page obtained from Defendant's website having the URL: http://www.stage2networks.com/company.php.
Order of Dismissal, Jul. 2, 2012, *NobelBiz, Inc.* v. *Stage 2 Networks, L.L.C.*, 6:12-cv-00308-LED (E. D. Tex.).
Order of Dismissal, Jul. 5, 2012, *NobelBiz, Inc.* v. *Stage 2 Networks, L.L.C.*, 6:12-cv-00308-LED (E. D. Tex.).
Civil Docket for *NobelBiz, Inc.* v. *T C N, Inc.*, 6:12-cv-00247-MHS (E.D. Tex.), Sep. 18, 2013.
Complaint, Apr. 3, 2012, *NobelBiz, Inc.* v. *T C N, Inc.*, 6:12-cv-00247-LED (E.D. Tex.).
Declaration of Charles H. Chevalier in Support of Plaintiff's Application for a Preliminary Injunction, Apr. 5, 2012, *NobelBiz, Inc.* v. *T C N, Inc.*, 6:12-cv-00247-LED (E.D. Tex.).
Declaration of Charles H. Chevalier in Support of Plaintiff's Application for a Preliminary Injunction, Apr. 5, 2012, Exhibit 1—a letter to Defendants from NobelBiz dated Apr. 20, 2009.
Declaration of Charles H. Chevalier in Support of Plaintiff's Application for a Preliminary Injunction, Apr. 5, 2012, Exhibit 2—a printout from Defendant's website with the URL:https://www.tcnp3.com/home/press/tcn-releases-local-idincreases-customer-contact-rates-by-50-100/.
Plaintiff's Application for Preliminary Injunction and Brief in Support, Apr. 5, 2012, *NobelBiz, Inc.* v. *T C N, Inc.*, 6:12-cv-00247-LED (E.D. Tex.).
Defendants' Joint Objections to Plaintiff's Extrinsic Evidence and Defendants' Joint Motion to Strike Such Extrinsic Evidence and to Strike Portions of Plaintiff's Claim Construction Reply in Reliance Thereof, Jul. 17, 2014, *NobelBiz, Inc.* v. *Global Connect, LLC* and *NobelBiz, Inc.* v. *TCN, Inc.*, 6:12-CV-244 and 6:12-CV-247 (E.D. Tex.).
Declaration of Ross Spencer Garsson in Support of Defendants' Joint Objections and Joint Motion to Strike, Jul. 17, 2014, Exhibit A—*TQP Development, LLC* v *Wells Fargo & Co.*, 2013 WL 6247363 (E.D. Tex. Dec. 2, 2013).
Declaration of Ross Spencer Garsson in Support of Defendants' Joint Objections and Joint Motion to Strike, Jul. 17, 2014, Exhibit B—*Lodsys, LLC* v *Brother Int 'l Corp.*, 2013 WL 6442185 (E.D. Tex. Mar. 12, 2013).
[Proposed] Order Sustaining Defendants' Joint Objections to Plaintiff's Extrinisic Evidence and Granting Defendants' Joint Motion to Strike Plaintiff's Extrinsic Evidence and to Strike Portions of Plaintiff's Claim Construction Reply in Reliance Thereof, *NobelBiz, Inc.* v. *Global Connect, LLC* and *NobelBiz, Inc.* v. *TCN, Inc.*, 6:12-CV-244 and 6:12-CV-247 (E.D. Tex.), Sep. 18, 2013.
Defendants' Alternate Motion for Leave to Amend Their Pleadings, Jul. 21, 2014, *NobelBiz, Inc.* v. *Global Connect, LLC* and *NobelBiz, Inc.* v. *TCN, Inc.*, 6:12-CV-244 and 6:12-CV-247 (E.D. Tex.).
Order Granting Defendants' Alternative Motion for Leave to Amend Their Pleadings, Jul. 21,.2014, *NobelBiz, Inc.* v. *Global Connect, LLC* and *NobelBiz, Inc.* v. *TCN, Inc.*, 6:12-CV-244 and 6:12-CV-247 (E.D. Tex.).
Joint Claim Construction Chart, U.S. Pat. No. 8,565,399, Jul. 24, 2014, *NobelBiz, Inc.* v. *Global Connect, LLC* and *NobelBiz, Inc.* v. *TCN, Inc.*, 6:12-CV-244 and 6:12-CV-247 (E.D. Tex.).
Global Connect, L.L.C.'s Notice of Compliance, Jul. 24, 2014, *NobelBiz, Inc.* v. *Global Connect, LLC* and *NobelBiz, Inc.* v. *TCN, Inc.*, 6:12-CV-244 and 6:12-CV-247 (E.D. Tex.).
Defendants' Reply to Their Joint Objections and Motion to Strike Plaintiff's Extrinsic Evidence, Jul. 30, 2014, *NobelBiz, Inc.* v. *Global Connect LLC* and *NobelBiz, Inc.* v. *TCN, Inc.*, 6:12-CV-244 and 6:12-CV-247 (E.D. Tex.).
Nobelbiz's Reply in Support of Its Renewed Motion to Dismiss Global Connects and TCN's First Amended Counterclaim Regarding Unenforceability of U.S. Pat. No. 8,565,399, Aug. 1, 2014, *NobelBiz, Inc.* v. *Global Connect, LLC* and *NobelBiz, Inc.* v. *TCN, Inc.*, 6:12-CV-244 and 6:12-CV-247 (E.D. Tex.).

(56) References Cited

OTHER PUBLICATIONS

Defendant Global Connect's Answers and Objections to Nobelbiz, Inc.'s Third Set of Interrogatories (No. 14), Aug. 1, 2014, *NobelBiz, Inc.* v. *Global Connect, LLC* and *NobelBiz, Inc.* v. *TCN, Inc.*, 6:12-CV-244 and 6:12-CV-247 (E.D. Tex.).
Verification of Darrin Bird, Apr. 17, 2014, *NobelBiz, Inc.* v. *Global Connect, LLC* and *NobelBiz, Inc.* v. *TCN, Inc.*, 6:12-CV-244 and 6:12-CV-247 (E.D. Tex.).
Plaintiff NobelBiz, Inc.'s Objections and Responses to TCN's First Set of Interrogatories (Nos. 1-13), Aug. 26, 2013, *NobelBiz, Inc.* v. *Global Connect, LLC* and *NobelBiz, Inc.* v. *TCN, Inc.*, 6:12-CV-244 and 6:12-CV-247 (E.D. Tex.).
Plaintiff Nobelbiz, Inc.'s First Supplemental and Amended Objections and Responses to TCN's First Set of Interrogatories (Nos. 1-13), Aug. 5, 2014, *NobelBiz, Inc.* v. *Global Connect, LLC* and *NobelBiz, Inc.* v. *TCN, Inc.*, 6:12-CV-244 and 6:12-CV-247 (E.D. Tex.).
Plaintiff Nobelbiz, Inc.'s Motion to Dismiss Defendant TCN, Inc.'s Affirmative Defenses and Counterclaims, Apr. 11, 2014, *NobelBiz, Inc.* v. *Global Connect, LLC* and *NobelBiz, Inc.* v. *TCN, Inc.*, 6:12-CV244 and 6:12-CV-247 (E.D. Tex.).
Order, Apr. 11, 2014, *NobelBiz, Inc.* v. *Global Connect, LLC* and *NobelBiz, Inc.* v. *TCN, Inc.*, 6:12-CV-244 and 6:12-CV-247 (E.D. Tex.).
Defendant TCN's Opposition to Plaintiff's Motion to Dismiss Defendant's Affirmative Defenses and Counterclaims and Defendant TCN's Alternate Motion for Leave to Amend Its Pleadings, Apr. 28, 2014, *NobelBiz, Inc.* v. *Global Connect, LLC* and *NobelBiz, Inc.* v. *TCN, Inc.*, 6:12-CV-244 and 6:12-CV-247 (E.D. Tex.).
Defendant TCN's Opposition to Plaintiff's Motion to Dismiss Defendant's Affirmative Defenses and Counterclaims and Defendant TCN's Alternate Motion for Leave to Amend Its Pleadings, Apr. 28, 2014, Exhibit 1—*Syntellect Technology Corp.* v. *Brooktrout Technology, Inc.*, Jul. 9, 1997, 3:96-CV-2789G, WL 419586 (N.D.Tex.).
Defendant TCN's Opposition to Plaintiff's Motion to Dismiss Defendant's Affirmative Defenses and Counterclaims and Defendant TCN's Alternate Motion for Leave to Amend Its Pleadings, Apr. 28, 2014, Exhibit 2—*Westerngeco* v. *Ion Geophysical Corp.*, Oct. 28, 2009, 09-cv-1827, WL 3497123 (S.D.Tex.).
Defendant TCN's Opposition to Plaintiff's Motion to Dismiss Defendant's Affirmative Defenses and Counterclaims and Defendant Tcn's Alternate Motion for Leave to Amend Its Pleadings, Apr. 28, 2014, Exhibit 3—*Lincoln National Life* v. *Jackson National Life Insurance Company and Jackson National Life Insurance Company of New York*, May 3, 2010, 1:07-CV-265, WL 1781013 (N. D.Ind.).
Declaration of Elizabeth L. Derieux in Support of Nobelbiz's Renewed Motion to Dismiss Global Connects and TCN's First Amended Counterclaim Regarding U.S. Pat. No. 8,565,399,.Jul. 3, 2014, Exhibit 5—a document entitled, "Ex. A. Global Connect's Representative Claim Chart (Invalidity) for Global Connect's 2004 System.".
Memorandum Opinion and Order, Sep. 15, 2014, *NobelBiz, Inc.* v. *Global Connect, L.L.C.* and *NobelBiz, Inc.* v. *TCN, Inc.*, 6:12-cv-244-MHS and 6:12-cv-247-MHS (E.D. Tex).
Memorandum Opinion and Order, Sep. 15, 2014, Attachment A—Summary of Final Constructions.
Order Granting Motion to Dismiss Indirect Infringement Claims, Oct. 12, 2014, *NobelBiz, Inc.* v. *InsideSales.com, Inc.*, 6:13-cv-360-MHS (E.D. Tex).
Defendants' Final Election of Asserted Prior Art, Oct. 10, 2014, *NobelBiz, Inc.* v. *Global Connect, L.L.C.* and *NobelBiz, Inc.* v. *TCN, Inc.*, 6:12-cv-244-MHS and 6:12-cv-247-MHS (E.D. Tex).
Reporter's Transcript of Proceedings, Aug. 22, 2014, *NobelBiz, Inc.* v. *Livevox, Inc.* and *NobelBiz, Inc.*v. *TCN, Inc.*, C-13/1773 YGR and C-13/1846 YGR (N.D. Cal).
Expert Report of Dewayne E. Perry, Ph.D, Regarding Invalidity of U.S. Pat. No. 8,135,122 and U.S. Pat. No. 8,565,399, Oct. 17, 2014, *NobelBiz, Inc.* v. *Global Connect, L.L.C.* and *NobelBiz, Inc.* v. *TCN, Inc.*, 6:12-cv-244-MHS and 6:12-cv-247-MHS (E.D. Tex).

Expert Report of Dewayne E. Perry, Ph.D, Regarding Invalidity of U.S. Pat. No. 8,135,122 and U.S. Pat. No. 8,565,399, Oct. 17, 2014, Appendix A—curriculum vitae.
Expert Report of Dewayne E. Perry, Ph.D, Regarding Invalidity of U.S. Pat. No. 8,135,122 and U.S. Pat. No. 8,565,399, Oct. 17, 2014, Appendix B—Expert Witness Resume: Cases with Depositions/Testimony.
Expert Report of Dewayne E. Perry, Ph.D, Regarding Invalidity of U.S. Pat. No. 8,135,122 and U.S. Pat. No. 8,565,399, Oct. 17, 2014, Appendix C—List of Documents Provided to Defendants' Expert Witness, Dewayne E. Perry, Ph.D.
Letter to Ralph A. Dengler, Esq., Oct. 17, 2014, *NobelBiz, Inc.* v. *Global Connect, L.L.C.* and *NobelBiz, Inc.* v. *TCN, Inc.*, 6:12-cv-244-MHS and 6:12-cv-247-MHS (E.D. Tex).
Order Denying Plaintiff's Renewed Motion to Dismiss Defendants' Inequitable Conduct Counterclaim, Oct. 27, 2014, *Nobelbiz, Inc.* vs. *Global Connect, L.L.C.* and *Nobelbiz, Inc.* vs. *TCN, Inc.*, 6:12-cv-244-MHS and 6:12-cv-244-MHS (E.D. Tex.).
TCN, Inc.'s Motion for Summary Judgment of Invalidity and Non-Infringement of All Asserted Claims of U.S. Pat. No. 8,135,122 and U.S. Pat. No. 8,565,399, Dec. 17, 2014, *NobelBiz, Inc.* v. *Global Connect, L.L.C.* and *NobelBiz, Inc.* v. *TCN, Inc.*, 6:12-cv-244-MHS and 6:12-cv-247-MHS (E.D. Tex.).
[Proposed] Order Granting Defendant T C N, Inc.'s Motion for Summary Judgment of Invalidity and Non-Infringement of All Asserted Claims of U.S. Pat. No. 8,135,122 and U.S. Pat. No. 8,565,399, *NobelBiz, Inc.* v. *TCN, Inc.*, 6:12-cv-244-MHS and 6:12-cv-247-MHS (E.D. Tex.), Sep. 18, 2013.
T C N, Inc.'s Motion for Summary Judgment of Invalidity and Non-Infringement of All Asserted Claims of U.S. Pat. No. 8,135,122 and U.S. Pat. No. 8,565,399, Dec. 17, 2014, Exhibit A—U.S. Pat. No. 8,135,122 to Siminoff.
T C N, Inc.'s Motion for Summary Judgment of Invalidity and Non-Infringement of All Asserted Claims of U.S. Pat. No. 8,135,122 and U.S. Pat. No. 8,565,399, Dec. 17, 2014, Exhibit B—U.S. Pat. No. 8,565,399 to Siminoff.
T C N, Inc.'s Motion for Summary Judgment of Invalidity and Non-Infringement of All Asserted Claims of U.S. Pat. No. 8,135,122 and U.S. Pat. No. 8,565,399, Dec. 17, 2014, Exhibit C—Redacted.
T C N, Inc.'s Motion for Summary Judgment of Invalidity and Non-Infringement of All Asserted Claims of U.S. Pat. No. 8,135,122 and U.S. Pat. No. 8,565,399, Dec. 17, 2014, Exhibit D—Expert Report of Dewayne E. Perry, Ph.D, Regarding Invalidity of U.S. Pat. No. 8,135,122 and U.S. Pat. No. 8,565,399.
T C N, Inc.'s Motion for Summary Judgment of Invalidity and Non-Infringement of All Asserted Claims of U.S. Pat. No. 8,135,122 and U.S. Pat. No. 8,565,399, Dec. 17, 2014, Exhibit E—Expert Report of Dewayne E. Perry, Ph.D, Regarding Non-Infringement of U.S. Pat. No. 8,135,122 and 8,565,399.
T C N, Inc.'s Motion for Summary Judgment of Invalidity and Non-Infringement of All Asserted Claims of U.S. Pat. No. 8,135,122 and U.S. Pat. No. 8,565,399, Dec. 17, 2014, Exhibit F—Deposition of Defendant Global Connect, L.L.C.'s 30(b)(6) Deposition Notice to Nobelbiz, Inc. and in His Individual Capacity James Y. Siminoff, Nov. 25, 2014.
Declaration of Jesse H. Bird in Support of TCN, Inc.'s Motion for Summary Judgment of Invalidity and Non-Infringement of All Asserted Claims of U.S. Pat. No. 8,135,122 and U.S. Pat. No. 8,565,399, Dec. 17, 2014, *NobelBiz, Inc.* v. *Global Connect, L.L.C.* and *NobelBiz, Inc.* v. *TCN, Inc.*, 6:12-cv-244-MHS and 6:12-cv-247-MHS (E.D. Tex.).
Declaration of Jesse H. Bird in Support of TCN, Inc.'s Motion for Summary Judgment of Invalidity and Non-Infringement of All Asserted Claims of U.S. Pat. No. 8,135,122 and U.S. Pat. No. 8,565,399, Dec. 17, 2014, Exhibit 1—portions of TCN's 2004 User's Manual.
Global Connect, L.L.C.'s Motion for Summary Judgment of Invalidity and Non-Infringement of All Asserted Claims of U.S. Pat. No. 8,135,122 and U.S. Pat. No. 8,565,399, Dec. 17, 2014, *NobelBiz, Inc.* v. *Global Connect, L.L.C.* and *NobelBiz, Inc.* v. *TCN, Inc.*, 6:12-cv-244-MHS and 6:12-cv-247-MHS (E.D. Tex.).
Order Granting Global Connect, L.L.C.'s Motion for Summary Judgment of Invalidity and Non-Infringement of All Asserted Claims of

(56) References Cited

OTHER PUBLICATIONS

U.S. Pat. No. 8,135,122 and U.S. Pat. No. 8,565,399, Dec. 17, 2014, *NobelBiz, Inc.* v. *Global Connect, L.L.C.* and *NobelBiz, Inc.* v. *TCN, Inc.*, 6:12-cv-244-MHS and 6:12-cv-247-MHS (E.D. Tex.).
Global Connect, L.L.C.'s Motion for Summary Judgment of Invalidity and Non-Infringement of All Asserted Claims of U.S. Pat. No. 8,135,122 and U.S. Pat. No. 8,565,399, Dec. 17, 2014, Exhibit A—U.S. Pat. No. 8,135,122 to Siminoff.
Global Connect, L.L.C.'s Motion for Summary Judgment of Invalidity and Non-Infringement of All Asserted Claims of U.S. Pat. No. 8,135,122 and U.S. Pat. No. 8,565,399, Dec. 17, 2014, Exhibit B—U.S. Pat. No. 8,565,399 to Siminoff.
Global Connect, L.L.C.'s Motion for Summary Judgment of Invalidity and Non-Infringement of All Asserted Claims of U.S. Pat. No. 8,135,122 and U.S. Pat. No. 8,565,399, Dec. 17, 2014, Exhibit C—Redacted.
Global Connect, L.L.C.'s Motion for Summary Judgment of Invalidity and Non-Infringement of All Asserted Claims of U.S. Pat. No. 8,135,122 and U.S. Pat. No. 8,565,399, Dec. 17, 2014, Exhibit D—Uncertified Draft Transcript, Dec. 10, 2014 at Greenberg Traurig, Boston, MA.
Global Connect, L.L.C.'s Motion for Summary Judgment of Invalidity and Non-Infringement of All Asserted Claims of U.S. Pat. No. 8,135,122 and U.S. Pat. No. 8,565,399, Dec. 17, 2014, Exhibit E—Expert Report of Dewayne E. Perry, Ph.D, Regarding Invalidity of U.S. Pat. No. 8,135,122 and U.S. Pat. No. 8,565,399.
Global Connect, L.L.C.'s Motion for Summary Judgment of Invalidity and Non-Infringement of All Asserted Claims of U.S. Pat. No. 8,135,122 and U.S. Pat. No. 8,565,399, Dec. 17, 2014, Exhibit F—Videotaped Deposition of of Global Connect, L.L.C. By Darrin Bird, Jan. 24, 2014. Austin, TX.
Global Connect, L.L.C.'s Motion for Summary Judgment of Invalidity and Non-Infringement of All Asserted Claims of U.S. Pat. No. 8,135,122 and U.S. Pat. No. 8,565,399, Dec. 17, 2014, Exhibit G—Declaration of Darrin Bird in Support of Defendant Global Connect's Motion for Summary Judgment Brief.
Declaration of Darrin Bird in Support of Defendant Global Connect's Motion for Summary Judgment Brief, Dec. 17, 2014, Exhibit G1—Global Connect's 2004 Users Guide for the Global Connect 2004 System.
Declaration of Darrin Bird in Support of Defendant Global Connect's Motion for Summary Judgment Brief, Dec. 17, 2014, Exhibits G2-G5—printouts of electronic business records of a broadcast made using Global connect's system on Aug. 14, 2004.
Declaration of Darrin Bird in Support of Defendant Global Connect's Motion for Summary Judgment Brief, Dec. 17, 2014, Exhibit G6—printout of an electronic business record of broadcast made using Global Connect's System on Mar. 9, 2005.
Declaration of Darrin Bird in Support of Defendant Global Connect's Motion for Summary Judgment Brief, Dec. 17, 2014, Exhibit G7—brochure of Global Connect dated around Sep. 2004.
Global Connect, L.L.C.'s Motion for Summary Judgment of Invalidity and Non-Infringement of All Asserted Claims of U.S. Pat. No. 8,135,122 and U.S. Pat. No. 8,565,399, Dec. 17, 2014, Exhibit H—Declaration of David "Chris" Crenshaw in Support of Defendant Global Connects Motion for Summary Judgment Brief.
Global Connect, L.L.C.'s Motion for Summary Judgment of Invalidity and Non-Infringement of All Asserted Claims of U.S. Pat. No. 8,135,122 and U.S. Pat. No. 8,565,399, Dec. 17, 2014, Exhibit I—Videotaped Deposition of Global Connect, by David "Chris" Crenshaw, Jan. 17, 2014, Austin, Texas.
Global Connect, L.L.C.'s Motion for Summary Judgment of Invalidity and Non-Infringement of All Asserted Claims of U.S. Pat. No. 8,135,122 and U.S. Pat. No. 8,565,399, Dec. 17, 2014, Exhibit J—Expert Report of Dewayne E. Perry. Ph.D. Regarding Non-Infringement of U.S. Pat. No. 8,135,122 and U.S. Pat. No. 8,565,399.
Global Connect, L.L.C.'s Motion for Summary Judgment of Invalidity and Non-Infringement of All Asserted Claims of U.S. Pat. No. 8,135,122 and U.S. Pat. No. 8,565,399, Dec. 17, 2014, Exhibit K—a chart setting forth this comparison between Global Connect's prior art System and the remaining Accused Claims of the '122 patent.
Global Connect, L.L.C.'s Motion for Summary Judgment of Invalidity and Non-Infringement of All Asserted Claims of U.S. Pat. No. 8,135,122 and U.S. Pat. No. 8,565,399, Dec. 17, 2014, Exhibit L—a chart setting forth this comparison between Global Connect's prior art System and the Accused Claims of the '399 patent.
TCN, Inc's Notice of Compliance, Dec. 10, 2014, *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.).
TCN, Inc's Notice of Compliance, Dec. 10, 2014, Exhibit 1—Letter Brief Opposing Request for Leave to File Daubert Motions to the Honorable Michael H. Schneider.
Global Connect, L.L.C.'s Notice of Compliance, Nov. 26, 2014, *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.).
Global Connect, L.L.C.'s Notice of Compliance, Nov. 26, 2014, Exhibit 1—Letter Brief Requesting Leave to File Summary Judgment and Daubert Motions to the Honorable Michael H. Schneider.
T C N, Inc's Notice of Compliance, Nov. 26, 2014, *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.).
T C N, Inc's Notice of Compliance, Nov. 26, 2014, Exhibit 1—Letter Brief Requesting Leave to File Summary Judgment and Daubert Motions to the Honorable Michael H. Schneider.
First Amended Counterclaim, Dec. 8, 2014, *Nobelbiz, Inc.* vs. *Insidesales.com, Inc.*, 6:13- cv-00360-MHS (E.D. Tex).
Deposition of Defendant Global Connect, L.L.C.'s 30(b)(6) Deposition Notice to Nobelbiz, Inc. and in His Individual Capacity James Y. Siminoff, Dec. 1, 2014, *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.).
Answer to Second Amended Complaint, Nov. 17, 2014, *Nobelbiz, Inc.* vs. *Insidesales.com, Inc.*, 6:13-cv-00360-MHS (E.D. Tex).
T C N, Inc's Notice of Compliance, Dec. 10, 2014, *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.).
TCN, Inc's Notice of Compliance, Dec. 10, 2014, Exhibit 1—Letter Brief Opposing Request for Leave to File Summary Judgment Motions to the Honorable Michael H. Schneider.
Global Connect, L.L.C.'s Notice of Compliance, Dec. 10, 2014, *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.).
Global Connect, L.L.C.'s Notice of Compliance, Dec. 10, 2014, Exhibit 1—Letter Brief Opposing Request for Leave to File Daubed Motions to the Honorable Michael H. Schneider.
Global Connect, L.L.C.'s Notice of Compliance, Dec. 10, 2014, Exhibit 1—Letter Brief Opposing Request for Leave to File Motion for Summary Judgmentto the Honorable Michael H. Schneider.
Defendant Insidesales.Com, Inc.'s P.R. 3-3 Invalidity Contentions, *NobelBiz, Inc.* v. *Insidesales.com, Inc.*, May 1, 2015, 6:13-cv-00360-RWS (E.D., Tex.).
Defendant Insidesales.Com, Inc.'s P.R. 3-3 Invalidity Contentions, *NobelBiz, Inc.* v. *Insidesales.com, Inc.*, May 1, 2015, Exhibit 1, P.R. 3-3(c) Chart for U.S. Pat. No. 5,274,699.
Defendant Insidesales.Com, Inc.'s P.R. 3-3 Invalidity Contentions, *NobelBiz, Inc.* v. *Insidesales.com, Inc.*, May 1, 2015, Exhibit 2, P.R. 3-3(c) Chart for U.S. Pat. No. 5,590,184.
Defendant Insidesales.Com, Inc.'s P.R. 3-3 Invalidity Contentions, *NobelBiz, Inc.* v. *Insidesales.com, Inc.*, May 1, 2015, Exhibit 3, P.R. 3-3(c) Chart for U.S. Pat. No. 5,740,538.
Defendant Insidesales.Com, Inc.'s P.R. 3-3 Invalidity Contentions, *NobelBiz, Inc.* v. *Insidesales.com, Inc.*, May 1, 2015, Exhibit 4, P.R. 3-3(c) Chart for U.S. Pat. No. 5,784,444.
Defendant Insidesales.Com, Inc.'s P.R. 3-3 Invalidity Contentions, *NobelBiz, Inc.* v. *Insidesales.com, Inc.*, May 1, 2015, Exhibit 5, P.R. 3-3(c) Chart for U.S. Pat. No. 5,864,612.
Defendant Insidesales.Com, Inc.'s P.R. 3-3 Invalidity Contentions, *NobelBiz, Inc.* v. *Insidesales.com, Inc.*, May 1, 2015, Exhibit 6, P.R. 3-3(c) Chart for U.S. Pat. No. 5,901,209.
Defendant Insidesales.Com, Inc.'s P.R. 3-3 Invalidity Contentions, *NobelBiz, Inc.* v. *Insidesales.com, Inc.*, May 1, 2015, Exhibit 25, P.R. 3-3(c) Chart for U.S. Pat. No. 8,027,332.

(56) References Cited

OTHER PUBLICATIONS

Notice of Compliance, *NobelBiz, Inc.* v. *Insidesales.com, Inc.*, May 1, 2015, 6:13-cv-00360-RWS (E.D., Tex.).
Asterisk Open Source Software, Digium, Inc, Sep. 18, 2013.
Spoofcard.com, Sep. 18, 2013.
PiPhone.com, Sep. 18, 2013.
CallNotes.com, Sep. 18, 2013.
SecretCalls.net, Sep. 18, 2013.
StayUnknown.com, Sep. 18, 2013.
SpoofTech.com, Sep. 18, 2013.
Defendant Insidesales.com, Inc.'s P.R. 3-3 Invalidity Contentions, *NobelBiz, Inc.* v. *Insidesales.com, Inc.*, May 1, 2015, Exhibit 7, P.R. 3-3(c) Chart for U.S. Pat. No. 6,101,246.
Defendant Insidesales.com, Inc.'s P.R. 3-3 Invalidity Contentions, *NobelBiz, Inc.* v. *Insidesales.com, Inc.*, May 1, 2015, Exhibit 8, P.R. 3-3(c) Chart for U.S. Pat. No. 6,343,120.
Defendant Insidesales.com, Inc.'s P.R. 3-3 Invalidity Contentions, *NobelBiz, Inc.* v. *Insidesales.com, Inc.*, May 1, 2015, Exhibit 9, P.R. 3-3(c) Chart for U.S. Pat. App. Pub. No. 2002/0061100.
Defendant Insidesales.com, Inc.'s P.R. 3-3 Invalidity Contentions, *NobelBiz, Inc.* v. *Insidesales.com, Inc.*, May 1, 2015, Exhibit 10, P.R. 3-3(c) Chart for U.S. Pat. App. Pub. No. 2002/0080942.
Defendant Insidesales.com, Inc.'s P.R. 3-3 Invalidity Contentions, *NobelBiz, Inc.* v. *Insidesales.com, Inc.*, May 1, 2015, Exhibit 11, P.R. 3-3(c) Chart for U.S. Pat. App. Pub. No. 2002/0181681.
Defendant Insidesales.com, Inc.'s P.R. 3-3 Invalidity Contentions, *NobelBiz, Inc.* v. *Insidesales.com, Inc.*, May 1, 2015, Exhibit 12, P.R. 3-3(c) Chart for U.S. Pat. App. Pub. No. 2003/0007616.
Defendant Insidesales.com, Inc.'s P.R. 3-3 Invalidity Contentions, *NobelBiz, Inc.* v. *Insidesales.com, Inc.*, May 1, 2015, Exhibit 13, P.R. 3-3(c) Chart for U.S. Pat. App. Pub. No. 2003/0147519.
Defendant Insidesales.com, Inc.'s P.R. 3-3 Invalidity Contentions, *NobelBiz, Inc.* v. *Insidesales.com, Inc.*, May 1, 2015, Exhibit 14, P.R. 3-3(c) Chart for U.S. Pat. App. Pub. No. 2003/0198326.
Defendant Insidesales.com, Inc.'s P.R. 3-3 Invalidity Contentions, *NobelBiz, Inc.* v. *Insidesales.com, Inc.*, May 1, 2015, Exhibit 15, P.R. 3-3(c) Chart for U.S. Pat. No. 6,704,406.
Defendant Insidesales.com, Inc.'s P.R. 3-3 Invalidity Contentions, *NobelBiz, Inc.* v. *Insidesales.com, Inc.*, May 1, 2015, Exhibit 16, P.R. 3-3(c) Chart for U.S. Pat. No. 6,714,535.
Defendant Insidesales.com, Inc.'s P.R. 3-3 Invalidity Contentions, *NobelBiz, Inc.* v. *Insidesales.com, Inc.*, May 1, 2015, Exhibit 17, P.R. 3-3(c) Chart for U.S. Pat. App. Pub. No. 2004/0266415.
Defendant Insidesales.com, Inc.'s P.R. 3-3 Invalidity Contentions, *NobelBiz, Inc.* v. *Insidesales.com, Inc.*, May 1, 2015, Exhibit 18, P.R. 3-3(c) Chart for U.S. Pat. App. Pub. No. 2005/0053213.
Defendant Insidesales.com, Inc.'s P.R. 3-3 Invalidity Contentions, *NobelBiz, Inc.* v. *Insidesales.com, Inc.*, May 1, 2015, Exhibit 19, P.R. 3-3(c) Chart for U.S. Pat. App. Pub. No. 2005/0190908.
Defendant Insidesales.com, Inc.'s P.R. 3-3 Invalidity Contentions, *NobelBiz, Inc.* v. *Insidesales.com, Inc.*, May 1, 2015, Exhibit 20, P.R. 3-3(c) Chart for U.S. Pat. App. Pub. No. 2006/0045243.
Defendant Insidesales.com, Inc.'s P.R. 3-3 Invalidity Contentions, *NobelBiz, Inc.* v. *Insidesales.com, Inc.*, May 1, 2015, Exhibit 21, P.R. 3-3(c) Chart for U.S. Pat. No. 7,027,575.
Defendant Insidesales.com, Inc.'s P.R. 3-3 Invalidity Contentions, *NobelBiz, Inc.* v. *Insidesales.com, Inc.*, May 1, 2015, Exhibit 22, P.R. 3-3(c) Chart for U.S. Pat. App. Pub. No. 2006/0140200.
Defendant Insidesales.com, Inc.'s P.R. 3-3 Invalidity Contentions, *NobelBiz, Inc.* v. *Insidesales.com, Inc.*, May 1, 2015, Exhibit 23, P.R. 3-3(c) Chart for U.S. Pat. App. Pub. No. 2006/0188083.
Defendant Insidesales.com, Inc.'s P.R. 3-3 Invalidity Contentions, *NobelBiz, Inc.* v. *Insidesales.com, Inc.*, May 1, 2015, Exhibit 24, P.R. 3-3(c) Chart for U.S. Pat. App. Pub. No. 2007/0064895.
Defendants' Joint Sur-Reply to Nobelbiz's Motion for Summary Judgment of No Inequitable Conduct, Infringement, No Invalidity and No Unclean Hands, Feb. 5, 2015, *NobelBiz, Inc.* v. *Global Connect, L.L.C.* and *NobelBiz, Inc.* v. *T C N, Inc.*, 6:12-cv-244-RWS and 6:12-cv-247-RWS (E.D. Tex.).

Plaintiff's Notice of Related Claim Construction Decision and Adoption of "Geographic Region" Construction, Sep. 16, 2014, *NobelBiz, Inc.* v. *Livevox, Inc.* and *NobelBiz, Inc.* v. *Five9, Inc.* 13-01773 YGR (N.D. Cal.).
Plaintiff's Notice of Related Claim Construction Decision and Adoption of "Geographic Region" Construction, Sep. 16, 2014, Exhibit A, Memorandum Opinion and Order, *NobelBiz, Inc.* v. *Global Connect, L.L.C.* and *NobelBiz, Inc.* v. *T C N, Inc.*, 6:12-cv-244-RWS and 6:12-cv-247-RWS (E.D. Tex.).
Plaintiff's Notice of Related Claim Construction Decision and Adoption of "Geographic Region" Construction, Sep. 16, 2014, Exhibit B, Memorandum Opinion and Order, *NobelBiz, Inc.* v. *Global Connect, L.L.C.* and *NobelBiz, Inc.* v. *T C N, Inc.*, 6:12-cv-244-RWS and 6:12-cv-247-RWS (E.D. Tex.).
Order Construing Claim Terms in Dispute, Jan. 16, 2015, *NobelBiz, Inc.* v. *Livevox, Inc.* and *NobelBiz, Inc.* v. *Five9, Inc.*, 13-cv-1773-YGR and 13-cv-1846-YGR (N.D. Cal.).
Nobelbiz's Trial Exhibit List for Global Connect, Redacted, Exhibit N, *NobelBiz* v. *Global Connect*—First Amended Trial Exhibit List, Sep. 8, 2013.
Nobelbiz's Trial Exhibit List for TCN, Redacted, Exhibit P, *NobelBiz* v. *TCN*—First Amended List of Trial Exhibits, Sep. 8, 2013.
Global Connects Trial Exhibit List, Redacted, Exhibit R, Defendant Global Connect, L.L.C.'s Second Amended Exhibit List, Feb. 11, 2015, *NobelBiz, Inc.* v. *Global Connect, L.L.C.* and *NobelBiz, Inc.* v. *T C N, Inc.*, 6:12-cv-244-RWS and 6:12-cv-247-RWS (E.D. Tex.).
TCN's Trial Exhibit List, Redacted, Exhibit T, Defendant TCN, Inc.'s Second Amended Exhibit List, Feb. 11, 2015, *NobelBiz, Inc.* v. *Global Connect, L.L.C.* and *NobelBiz, Inc.* v. *T C N, Inc.*, 6:12-cv-244-RWS and 6:12-cv-247-RWS (E.D. Tex.).
Nobelbiz's Trial Brief, Redacted, Feb. 13, 2015, *NobelBiz, Inc.* v. *Global Connect, L.L.C.* and *NobelBiz, Inc.* v. *T C N, Inc.*, 6:12-cv-244-RWS and 6:12-cv-247-RWS (E.D. Tex.).
Defendants' Joint Proposed Findings of Fact and Conclusions of Law, Feb. 13, 2015, *NobelBiz, Inc.* v. *Global Connect, L.L.C.* and *NobelBiz, Inc.* v. *T C N, Inc.*, 6:12-cv-244-RWS and 6:12-cv-247-RWS (E. D. Tex.).
Nobelbiz's Proposed Findings of Fact and Conclusions of Law in Support of No Inequitable Conduct and No Unclean Hands, Feb. 13, 2015, *NobelBiz, Inc.* v. *Global Connect, L.L.C.* and *NobelBiz, Inc.* v. *T C N, Inc.*, 6:12-cv-244-RWS and 6:12-cv-247-RWS (E.D. Tex.).
Nobelbiz's Sur-Reply in Opposition to Defendants' Motion for Summary Judgment, Redacted, Feb. 2, 2015, *NobelBiz, Inc.* v. *Global Connect, L.L.C.* and *NobelBiz, Inc.* v. *T C N, Inc.*, 6:12-cv-244-RWS and 6:12-cv-247-RWS (E.D. Tex.).
Defendants' Reply Memorandum in Support of Their Motions for Summary Judgment of Invalidity and Non-Infringement of All Asserted Claims of U.S. Pat. No. 8,135,122 and U.S. Pat. No. 8,565,399, Redacted, Jan. 22, 2015, *NobelBiz, Inc.* v. *Global Connect, L.L.C.* and *NobelBiz, Inc.* v. *T C N, Inc.*, 6:12-cv-244-RWS and 6:12-cv-247-RWS (E.D. Tex.).
Defendants' Reply Memorandum in Support of Their Motions for Summary Judgment of Invalidity and Non-Infringement of All Asserted Claims of U.S. Pat. No. 8,135,122 and U.S. Pat. No. 8,565,399, Jan. 22, 2015, Exhibit K, Global Connect's Summary Judgment Motion (GC Dkt. No. 214-18 and 19).
Defendants' Reply Memorandum in Support of Their Motions for Summary Judgment of Invalidity and Non-Infringement of All Asserted Claims of U.S. Pat. No. 8,135,122 and U.S. Pat. No. 8,565,399, Jan. 22, 2015, Exhibit L, Dr. Perry's Invalidity Report that was attached to Global Connect's summary judgment motion (GC Dkt. No. 214-5).
Report of Meeting on Joint Discovery/Case Management Plan, *NobelBiz, Inc.* v. *Insidesales.com, Inc.*, Jan. 16, 2015, 6:13-cv-00360-MHS (E.D. Tex.).
Report of Meeting on Joint Discovery/Case Management Plan, *NobelBiz, Inc.* v. *Insidesales.com, Inc.*, Jan. 16, 2015, Attachment A, Protective Order.
Report of Meeting on Joint Discovery/Case Management Plan, *NobelBiz, Inc.* v. *Insidesales.com, Inc.*, Jan. 16, 2015, Attachment B, Proposed Schedule.
Declaration of Andrew P. Macarthur in Support of Nobelbiz's Reply in Support of Its Motion for Summary Judgment of No Inequitable

(56) References Cited

OTHER PUBLICATIONS

Conduct, Infringement, No Invalidity, and No Unclean Hands, Jan. 26, 2014, *NobelBiz, Inc.* v. *Global Connect, L.L.C.* and *NobelBiz, Inc.* v. *T C N, Inc.*, 6:12-cv-244-RWS and 6:12-cv-247-RWS (E.D. Tex.).
Nobelbiz's Reply in Support of Its Motion for Summary Judgment of No Inequitable Conduct, Infringement, No Invalidity and No Unclean Hands, Redacted, Jan. 26, 2014, *NobelBiz, Inc.* v. *Global Connect, L.L.C.* and *NobelBiz, Inc.* v. *T C N, Inc.*, 6:12-cv-244-RWS and 6:12-cv-247-RWS (E.D. Tex.).
Declaration of Andrew P. MacArthur in Support of Nobelbiz's Reply in Support of Its Motion for Summary Judgment of No Inequitable Conduct, Infringement, No Invalidity, and No Unclean Hands, Jan. 26, 2014, Exhibit 73, an e-mail dated Jan. 28, 2014 containing a "draft of the Joint Case Management plan" from Defendant's counsel.
Declaration of Andrew P. MacArthur in Support of Nobelbiz's Reply in Support of Its Motion for Summary Judgment of No Inequitable Conduct, Infringement, No Invalidity, and No Unclean Hands, Jan. 26, 2014, Redacted, Exhibit 74, a document bates labeled as NB0053838 from bates range NB0053838-NB0053839 and designated Confidential.
Declaration of Andrew P. MacArthur in Support of Nobelbiz's Reply in Support of Its Motion for Summary Judgment of No Inequitable Conduct, Infringement, No Invalidity, and No Unclean Hands, Jan. 26, 2014, Exhibit 75, a letter from Ross S. Garsson on Jun. 20, 2013.
Declaration of Andrew P. MacArthur in Support of Nobelbiz's Reply in Support of Its Motion for Summary Judgment of No Inequitable Conduct, Infringement, No Invalidity, and No Unclean Hands, Jan. 26, 2014, Exhibit 76, a letter from Clinton E. Duke on Jun. 20, 2013.
Declaration of Andrew P. MacArthur in Support of Nobelbiz's Reply in Support of Its Motion for Summary Judgment of No Inequitable Conduct, Infringement, No Invalidity, and No Unclean Hands, Jan. 26, 2014, Exhibit 77, an excerpt of Global Connect's '122 invalidity contentions.
Declaration of Andrew P. MacArthur in Support of Nobelbiz's Reply in Support of Its Motion for Summary Judgment of No Inequitable Conduct, Infringement, No Invalidity, and No Unclean Hands, Jan. 26, 2014, Redacted, Exhibit 78, an excerpt of TCN's '122 invalidity contentions.
Defendants' Opposition to Plaintiff's Motion for Summary Judgment of No Inequitable Conduct, Infringement, No Invalidity, and No Unclean Hands, Jan. 16, 2015, Redacted, *NobelBiz, Inc.* v. *Global Connect, L.L.C.* and *NobelBiz, Inc.* v. *T C N, Inc.*, 6:12-cv-244-RWS and 6:12-cv-247-RWS (E.D. Tex.).
Order Denying Plaintiff's Plaintiff's Motion for Summary Judgment of No Inequitable Conduct, Infringement, No Invalidity, and No Unclean Hands, Jan. 16, 2015, *NobelBiz, Inc.* v. *Global Connect, L.L.C.* and *NobelBiz, Inc.* v. *T C N, Inc.*, 6:12-cv-244-RWS and 6:12-cv-247-RWS (E.D. Tex.).
Declaration of Ross Spencer Garsson in Support of Defendant Global Connect's Opposition to Plaintiff Nobelbiz's Motion for Summary Judgment of No Inequitable Conduct, Infringement, No Invalidity, and No Unclean Hands, Jan. 15, 2015, *NobelBiz, Inc.* v. *Global Connect, L.L.C.* and *NobelBiz, Inc.* v. *T C N, Inc.*, 6:12-cv-244-RWS and 6:12-cv-247-RWS (E.D. Tex.).
Declaration of Ross Spencer Garsson in Support of Defendant Global Connect's Opposition to Plaintiff Nobelbiz's Motion for Summary Judgment of No Inequitable Conduct, Infringement, No Invalidity, and No Unclean Hands, Jan. 15, 2015, Exhibit DX1, Dr. Dewayne Perry's Oct. 17, 2014 Expert Report Regarding the Invalidity of U.S. Pat. No. 8,135,122 and U.S. Pat. No. 8.565.399.
Declaration of Ross Spencer Garsson in Support of Defendant Global Connect's Opposition to Plaintiff Nobelbiz's Motion for Summary Judgment of No Inequitable Conduct, Infringement, No Invalidity, and No Unclean Hands, Jan. 15, 2015, Exhibit DX2, Dr. Dewayne Perry's Nov. 17. 2014 Expert Report Regarding Non-Infringement of U.S. Pat. No. 8,135,122 and 8,565,399 with respect to Defendant T C N, Inc.
Declaration of Ross Spencer Garsson in Support of Defendant Global Connect's Opposition to Plaintiff Nobelbiz'S Motion for Summary Judgment of No Inequitable Conduct, Infringement, No Invalidity, and No Unclean Hands, Jan. 15, 2015, Exhibit DX3, excerpts from Dr. Dewayne Perry's Nov. 17, 2014 Expert Report Regarding Non-Infringement of U.S. Pat. No. 8,135,122 and 8,565,399 with respect to Defendant Global Connect, L.L.C.
Declaration of Ross Spencer Garsson in Support of Defendant Global Connect's Opposition to Plaintiff Nobelbiz's Motion for Summary Judgment of No Inequitable Conduct, Infringement, No Invalidity, and No Unclean Hands, Jan. 15, 2015, Exhibit DX4, Redacted, excerpts from the Jan. 24, 2014 deposition of Darrin Bird.
Declaration of Ross Spencer Garsson in Support of Defendant Global Connect's Opposition to Plaintiff Nobelbiz's Motion for Summary Judgment of No Inequitable Conduct, Infringement, No Invalidity, and No Unclean Hands, Jan. 15, 2015, Exhibit DX5, Redacted, excerpts from the Jan. 17, 2014 deposition of David Crenshaw.
Declaration of Ross Spencer Garsson in Support of Defendant Global Connect's Opposition to Plaintiff Nobelbiz's Motion for Summary Judgment of No Inequitable Conduct, Infringement, No Invalidity, and No Unclean Hands, Jan. 15, 2015, Exhibit DX6, excerpts from the Nov. 25, 2014 deposition of James Siminoff.
Declaration of Ross Spencer Garsson in Support of Defendant Global Connect's Opposition to Plaintiff Nobelbiz's Motion for Summary Judgment of No Inequitable Conduct, Infringement, No Invalidity, and No Unclean Hands, Jan. 15, 2015, Exhibit DX7, Redacted, excerpts from the Dec. 18, 2014 deposition of Arthur T. Brody, Ph.D.
Declaration of Ross Spencer Garsson in Support of Defendant Global Connect's Opposition to Plaintiff Nobelbiz's Motion for Summary Judgment of No Inequitable Conduct, Infringement, No Invalidity, and No Unclean Hands, Jan. 15, 2015, Exhibit DX8, Darrin Bird's Declaration with accompanying exhibits executed Dec. 17, 2014.
Declaration of Ross Spencer Garsson in Support of Defendant Global Connect's Opposition to Plaintiff Nobelbiz's Motion for Summary Judgment of No Inequitable Conduct, Infringement, No Invalidity, and No Unclean Hands, Jan. 15, 2015, Exhibit DX9A-DX9I, excerpts from the File History of the '399 Patent Application.
Declaration of Ross Spencer Garsson in Support of Defendant Global Connect's Opposition to Plaintiff Nobelbiz's Motion for Summary Judgment of No Inequitable Conduct, Infringement, No Invalidity, and No Unclean Hands, Jan. 15, 2015, DX10A, excerpts from Global Connect's Invalidity Contentions for the '122 Patent.
Declaration of Ross Spencer Garsson in Support of Defendant Global Connect's Opposition to Plaintiff Nobelbiz's Motion for Summary Judgment of No Inequitable Conduct, Infringement, No Invalidity, and No Unclean Hands, Jan. 15, 2015, DX10B, excerpts from Global Connect's Invalidity Contentions for the '399 Patent.
Declaration of Ross Spencer Garsson in Support of Defendant Global Connect's Opposition to Plaintiff Nobelbiz's Motion for Summary Judgment of No Inequitable Conduct, Infringement, No Invalidity, and No Unclean Hands, Jan. 15, 2015, Exhibit DX10C, excerpts from TCN's Invalidity Contentions for the '122 Patent.
Declaration of Ross Spencer Garsson in Support of Defendant Global Connect's Opposition to Plaintiff Nobelbiz's Motion for Summary Judgment of No Inequitable Conduct, Infringement, No Invalidity, and No Unclean Hands, Jan. 15, 2015, Exhibit DX10D, excerpts from TCN's Invalidity Contentions for the '399 Patent.
Declaration of Ross Spencer Garsson in Support of Defendant Global Connect's Opposition to Plaintiff Nobelbiz's Motion for Summary Judgment of No Inequitable Conduct, Infringement, No Invalidity, and No Unclean Hands, Jan. 15, 2015, DX11A, excerpts from the prosecution of the U.S. Appl. No. 14/030,384.
Declaration of Ross Spencer Garsson in Support of Defendant Global Connect's Opposition to Plaintiff Nobelbiz's Motion for Summary Judgment of No Inequitable Conduct, Infringement, No Invalidity, and No Unclean Hands, Jan. 15, 2015, DX11B, a printout of the status of U.S. Appl. No. 14/030,384 on Jan. 15, 2015.
Declaration of Ross Spencer Garsson in Support of Defendant Global Connect's Opposition to Plaintiff Nobelbiz's Motion for Summary Judgment of No Inequitable Conduct, Infringement, No Invalidity, and No Unclean Hands, Jan. 15, 2015, Exhibit DX12A, Nobelbiz's Disclosure of Asserted Claims and Infringement Contentions filed Mar. 18, 2013.
Declaration of Ross Spencer Garsson in Support of Defendant Global Connect's Opposition to Plaintiff Nobelbiz's Motion for Summary Judgment of No Inequitable Conduct, Infringement, No Invalidity,

(56) References Cited

OTHER PUBLICATIONS and No Unclean Hands, Jan. 15, 2015, Exhibit DX12B, Nobelbiz's Disclosure of Asserted Claims and Infringement Contentions filed Jan. 29, 2014.
Declaration of Ross Spencer Garsson in Support of Defendant Global Connect's Opposition to Plaintiff Nobelbiz's Motion for Summary Judgment of No Inequitable Conduct, Infringement, No Invalidity, and No Unclean Hands, Jan. 15, 2015, Exhibit DX13, excerpts from Global Connect's Third Amended Privilege Log.
Nobelbiz'S Opposition to Defendant's Motion for Summary Judgment, Jan. 12, 2015, Redacted, *NobelBiz, Inc.* v. *Global Connect, L.L.C.* and *NobelBiz, Inc.* v. *T C N, Inc.*, 6:12-cv-244-RWS and 6:12-cv-247-RWS (E. D. Tex.).
Declaration of Andrew P. MacArthur in Support of Nobelbiz's Opposition to Defendant's Motion for Summary Judgment, Jan. 12, 2015, Exhibit 55, excerpts from the deposition transcript of Jesse Bird dated Jan. 23, 2014 and designated Confidential.
Declaration of Andrew P. MacArthur in Support of Nobelbiz's Opposition to Defendant's Motion for Summary Judgment, Jan. 12, 2015, Exhibit 56, a document bates labeled as TCN046245-TCN046249 and designated Confidential.
Declaration of Andrew P. MacArthur in Support of Nobelbiz's Opposition to Defendant's Motion for Summary Judgment, Jan. 12, 2015, Exhibit 57, three bates labeled documents: (a) TCN012914-TCN012969 and designated Confidential; (b) TCNO16192-TCN016193 and designated Confidential; and (c) TCN052938-TCN052996 and designated Confidential Attorneys' Eyes Only.
Declaration of Andrew P. MacArthur in Support of Nobelbiz's Opposition to Defendant's Motion for Summary Judgment, Jan. 12, 2015, Exhibit 58, a document bates labeled as TCN220865-TCN220868 and designated Confidential—Attorneys Eyes Only.
Declaration of Andrew P. MacArthur in Support of Nobelbiz's Opposition to Defendant's Motion for Summary Judgment, Jan. 12, 2015, Exhibit 59, a document bates labeled as TCN050163-TCNO50165and designated Confidential.
Declaration of Andrew P. MacArthur in Support of Nobelbiz's Opposition to Defendant's Motion for Summary Judgment, Jan. 12, 2015, Exhibit 60, a document bates labeled as GC-000647 from GC-000610-GC-000650 and designated Confidential Attorney Eyes Only.
Declaration of Andrew P. MacArthur in Support of Nobelbiz's Opposition to Defendant's Motion for Summary Judgment, Jan. 12, 2015, Exhibit 61, a document bates labeled as GC007399-G0007402 and designated Confidential Information Attorneys Eyes Only.
Declaration of Andrew P. MacArthur in Support of Nobelbiz's Opposition to Defendant's Motion for Summary Judgment, Jan. 12, 2015, Exhibit 62, a document bates labeled as TCNO00970.
Declaration of Andrew P. MacArthur in Support of Nobelbiz's Opposition to Defendant's Motion for Summary Judgment, Jan. 12, 2015, Exhibit 63, a document bates labeled as TCN046075-TCN046076 and designated Confidential.
Declaration of Andrew P. MacArthur in Support of Nobelbiz's Opposition to Defendant's Motion for Summary Judgment, Jan. 12, 2015, Exhibit 64, excerpts from the deposition transcript of Dr. Arthur Brody dated Dec. 18, 2014 and designated Highly Confidential Attorneys' Eyes Only.
Declaration of Andrew P. MacArthur in Support of Nobelbiz's Opposition to Defendant's Motion for Summary Judgment, Jan. 12, 2015, Exhibit 65, a document bates labeled as TCNO14055 and designated Confidential.
Declaration of Andrew P. MacArthur in Support of Nobelbiz's Opposition to Defendant's Motion for Summary Judgment, Jan. 12, 2015, *NobelBiz, Inc.* v. *Global Connect, L.L.C.* and *NobelBiz, Inc.* v. *T C N, Inc.*, 6:12-cv-244-RWS and 6:12-cv-247-RWS (E.D. Tex.).
Declaration of Andrew P. MacArthur in Support of Nobelbiz's Opposition to Defendant's Motion for Summary Judgment, Jan. 12, 2015, Exhibit 45, excerpts from the deposition transcript of David Chris Crenshaw dated Jan. 17, 2014 and designated Highly Confidential Attorneys' Eyes Only.
Declaration of Andrew P. MacArthur in Support of Nobelbiz's Opposition to Defendant's Motion for Summary Judgment, Jan. 12, 2015, Exhibit 46, a document bates labeled as GC-005928 and designated Confidential Information Attorneys' Eyes Only.
Declaration of Andrew P. MacArthur in Support of Nobelbiz's Opposition to Defendant's Motion for Summary Judgment, Jan. 12, 2015, Exhibit 47, excerpts from the deposition transcript of Darrin Bird dated Jan. 24, 2014 and designated Highly Confidential Attorneys' Eyes Only.
Declaration of Andrew P. MacArthur in Support of Nobelbiz's Opposition to Defendant's Motion for Summary Judgment, Jan. 12, 2015, Exhibit 48, a document bates labeled as GC014155-GC014157 and designated Confidential Information Attorneys' Eyes Only.
Declaration of Andrew P. MacArthur in Support of Nobelbiz's Opposition to Defendant's Motion for Summary Judgment, Jan. 12, 2015, Exhibit 49, a document bates labeled as GC014155-GC014157 and designated Confidential Information Attorneys' Eyes Only.
Declaration of Andrew P. MacArthur in Support of Nobelbiz's Opposition to Defendant's Motion for Summary Judgment, Jan. 12, 2015, Exhibit 50, excerpts of Global Connect Responses to NobelBiz's Interrogatories dated Oct. 1, 2014 and designated Attorneys' Eyes Only.
Declaration of Andrew P. MacArthur in Support of Nobelbiz's Opposition to Defendant's Motion for Summary Judgment, Jan. 12, 2015, Exhibit 51, a document bates labeled as NB0053836-NB0053837 and designated Confidential.
Declaration of Andrew P. MacArthur in Support of Nobelbiz's Opposition to Defendant's Motion for Summary Judgment, Jan. 12, 2015, Exhibit 52, a document bates labeled as NB0053840-NB0053841 and NB0053842 and designated Confidential.
Declaration of Andrew P. MacArthur in Support of Nobelbiz's Opposition to Defendant's Motion for Summary Judgment, Jan. 12, 2015, Exhibit 53, a document bates labeled as GC000689-690 from bates range GC000684-GC000699 and designated Confidential Attorneys Eyes Only.
Declaration of Andrew P. MacArthur in Support of Nobelbiz's Opposition to Defendant's Motion for Summary Judgment, Jan. 12, 2015, Exhibit 54, a document bates labeled as GC005757-G0005760 and designated Confidential Information Attorneys Eyes Only.
Declaration of Andrew P. MacArthur in Support of Nobelbiz's Opposition to Defendant's Motion for Summary Judgment, Jan. 12, 2015, Exhibit 66, a document bates labeled as TCN016192-TCN016193 and designated Confidential.
Declaration of Andrew P. MacArthur in Support of Nobelbiz's Opposition to Defendant's Motion for Summary Judgment, Jan. 12, 2015, Exhibit 67, excerpts from the deposition transcript of David Bethers dated Jan. 22, 2014 and designated Confidential.
Declaration of Andrew P. MacArthur in Support of Nobelbiz's Opposition to Defendant's Motion for Summary Judgment, Jan. 12, 2015, Exhibit 68, a document bates labeled as TCN227993-TCN227994 and designated Confidential.
Declaration of Andrew P. MacArthur in Support of Nobelbiz's Opposition to Defendant's Motion for Summary Judgment, Jan. 12, 2015, Exhibit 69, a document bates labeled as TCN046964-TCN046965 and designated Confidential.
Declaration of Andrew P. MacArthur in Support of Nobelbiz's Opposition to Defendant's Motion for Summary Judgment, Jan. 12, 2015, Exhibit 70, an excerpt of TCN's Response to NobelBiz's First Set of Interrogatories (Nos. 1-11) dated Jun. 14, 2013.
Declaration of Andrew P. MacArthur in Support of Nobelbiz's Opposition to Defendant's Motion for Summary Judgment, Jan. 12, 2015, Exhibit 71, a document bates labeled as TCN001488-TCN001499 and designated Confidential.
Declaration of Andrew P. MacArthur in Support of Nobelbiz's Opposition to Defendant's Motion for Summary Judgment, Jan. 12, 2015, Exhibit 72, an excerpt of TCN's Response to Interrogatory No. 17 dated May 5, 2014.
Declaration of Andrew P. MacArthur in Support of Nobelbiz's Motions for Summary Judgment, Dec. 22, 2014, *NobelBiz, Inc.* v. *Global Connect, L.L.C.* and *NobelBiz, Inc.* v. *T C N, Inc.*, 6:12-cv-244-RWS and 6:12-cv-247-RWS (E.D. Tex.).

(56) References Cited

OTHER PUBLICATIONS

Declaration of Andrew P. MacArthur in Support of Nobelbiz's Motions for Summary Judgment, Dec. 22, 2014, Exhibit 1, a document bates labeled as NB0055007-NB0055915.

Declaration of Andrew P. MacArthur in Support of Nobelbiz's Motions for Summary Judgment, Dec. 22, 2014, Exhibit 2, a document bates labeled as NB0055916-NB0055933.

Declaration of Andrew P. MacArthur in Support of Nobelbiz's Motions for Summary Judgment, Dec. 22, 2014, Exhibit 3, excerpts from the deposition transcript of James Y. Siminoff dated Nov. 25, 2014 and designated Highly Confidential Attorneys' Eyes Only.

Declaration of Andrew P. MacArthur in Support of Nobelbiz's Motions for Summary Judgment, Dec. 22, 2014, Exhibit 4, excerpts from the deposition transcrip of Darrin Bird dated Jan. 24, 2014 and designated Highly Confidentail Attorneys' Eyes Only.

Declaration of Andrew P. MacArthur in Support of Nobelbiz's Motions for Summary Judgment, Dec. 22, 2014, Exhibit 5, a document bates labeled as GC-002455 and designated Confidential Information Attorneys' Eyes Only.

Declaration of Andrew P. MacArthur in Support of Nobelbiz's Motions for Summary Judgment, Dec. 22, 2014, Exhibit 6, excerpts from the deposition transcript of David Chris Crenshaw dated Jan. 17, 2014 and designated Highly Confidential Attorneys' Eyes Only.

Declaration of Andrew P. MacArthur in Support of Nobelbiz's Motions for Summary Judgment, Dec. 22, 2014, Exhibit 7, a document bates labeled as GC015197-GC015325 and designated Confidential Information/Attorneys' Eyes Only.

Declaration of Andrew P. MacArthur in Support of Nobelbiz's Motions for Summary Judgment, Dec. 22, 2014, Exhibit 8, a document bates labeled as GC-015668-GC-015671 from bates range GC-015668-GC-015673 and designated Confidential Information/Attorneys' Eyes Only.

Declaration of Andrew P. MacArthur in Support of Nobelbiz's Motions for Summary Judgment, Dec. 22, 2014, Exhibit 9, a document bates labeled as TCN-213607-TCN-213609 and designated Confidential—Attorneys' Eyes Only.

Declaration of Andrew P. MacArthur in Support of Nobelbiz's Motions for Summary Judgment, Dec. 22, 2014, Exhibit 10, excerpts from the deposition transcript of Jesse Bird dated Jan. 23, 2014 and designated Confidential.

Declaration of Andrew P. MacArthur in Support of Nobelbiz's Motions for Summary Judgment, Dec. 22, 2014, Exhibit 11, excerpts from the deposition transcript of David Bethers dated Jan. 22, 2014 and designated Confidential.

Declaration of Andrew P. MacArthur in Support of Nobelbiz's Motions for Summary Judgment, Dec. 22, 2014, Exhibit 12, excerpts of TCN Responses to NobelBiz's First Set of Interrogatories (Nos. 1-11) dated Jun. 14, 2013 and designated Confidential Attorneys' Eyes Only.

Declaration of Andrew P. MacArthur in Support of Nobelbiz's Motions for Summary Judgment, Dec. 22, 2014, Exhibit 13, a document bates labeled as TCN001072-TCN001075 and designated Confidential—Attorneys' Eyes Only.

Declaration of Andrew P. MacArthur in Support of Nobelbiz's Motions for Summary Judgment, Exhibit 14, a document bates labeled as TCN-239854-TCN-239857 and designated Confidential—Attorneys' Eyes Only.

Declaration of Andrew P. MacArthur in Support of Nobelbiz's Motions for Summary Judgment, Dec. 22, 2014, Exhibit 15, a document bates labeled as TCN000971.

Declaration of Andrew P. MacArthur in Support of Nobelbiz's Motions for Summary Judgment, Dec. 22, 2014, Exhibit 16, a document bates labeled as TCN-252096-TCN-252098 and designated Confidential.

Declaration of Andrew P. MacArthur in Support of Nobelbiz's Motions for Summary Judgment, Dec. 22, 2014, Exhibit 17, a document bates labeled as TCN-048747 and designated Confidential.

Declaration of Andrew P. MacArthur in Support of Nobelbiz's Motions for Summary Judgment, Dec. 22, 2014, Exhibit 18, a document bates labeled as TCN001429 from bates range TCN001425-TCN001439 and designated Confidential.

Declaration of Andrew P. MacArthur in Support of Nobelbiz's Motions for Summary Judgment, Dec. 22, 2014, Exhibit 19, a document bates labeled as TCN-015343-TCN-015349 and designated Confidential.

Declaration of Andrew P. MacArthur in Support of Nobelbiz's Motions for Summary Judgment, Dec. 22, 2014, Exhibit 20, a document bates labeled as TCN-046050 and designated Confidential.

Declaration of Andrew P. MacArthur in Support of Nobelbiz's Motions for Summary Judgment, Dec. 22, 2014, Exhibit 21, a document bates labeled as TCN-046051 and designated Confidential.

Declaration of Andrew P. MacArthur in Support of Nobelbiz's Motions for Summary Judgment, Dec. 22, 2014, Exhibit 22, a document bates labeled as TCN-046052-TCN-046053 and designated Confidential.

Declaration of Andrew P. MacArthur in Support of Nobelbiz's Motions for Summary Judgment, Dec. 22, 2014, Exhibit 23, a document bates labeled as TCN-046054-TCN-046056 and designated Confidential.

Declaration of Andrew P. MacArthur in Support of Nobelbiz's Motions for Summary Judgment, Dec. 22, 2014, Exhibit 24, a document bates labeled as TCN000966-TCN000969.

Declaration of Andrew P. MacArthur in Support of Nobelbiz's Motions for Summary Judgment, Dec. 22, 2014, Exhibit 25, a document bates labeled as TCN001565 from bates range TCN001565-TCN001598 and designated Confidential.

Declaration of Andrew P. MacArthur in Support of Nobelbiz's Motions for Summary Judgment, Dec. 22, 2014, Exhibit 26, a document bates labeled as TCN-001557 and designated Confidential.

Declaration of Andrew P. MacArthur in Support of Nobelbiz's Motions for Summary Judgment, Dec. 22, 2014, Exhibit 27, a document bates labeled as TCN-003159-TCN-003161 and designated Confidential.

Declaration of Andrew P. MacArthur in Support of Nobelbiz's Motions for Summary Judgment, Dec. 22, 2014, Exhibit 28, excerpts from a document entitled "Expert Report of Dewayne E. Perry, Pd.D. Regarding Invalidity of U.S. Pat. No. 8,135,122 and U.S. Pat. No. 8,565,399.".

Declaration of Andrew P. MacArthur in Support of Nobelbiz's Motions for Summary Judgment, Dec. 22, 2014, Exhibit 29, a document bates labeled as GC04564 from bates range GC-004562-GC-004596 and designated Confidential Information/Attorneys' Eyes Only.

Declaration of Andrew P. MacArthur in Support of Nobelbiz's Motions for Summary Judgment, Dec. 22, 2014, Exhibit 30, a document bates labeled as GC08870 from bates range GC-008868-GC-008904 and designated Confidential Information/Attorneys' Eyes Only.

Declaration of Andrew P. MacArthur in Support of Nobelbiz's Motions for Summary Judgment, Dec. 22, 2014, Exhibit 31, a document bates labeled as GC-015658-GC-015667 from bates range GC-015652-GC-015667 and designated Confidential Information/Attorneys' Eyes Only.

Declaration of Andrew P. MacArthur in Support of Nobelbiz's Motions for Summary Judgment, Dec. 22, 2014, Exhibit 32, a document bates labeled as GC02459 from bates range GC-002457-GC-002460.

Declaration of Andrew P. MacArthur in Support of Nobelbiz's Motions for Summary Judgment, Dec. 22, 2014, Exhibit 33, Sep. 8, 2011 letter from Mr. Morishita and designated as NB62a at the deposition of Mr. Darrin Bird.

Declaration of Andrew P. MacArthur in Support of Nobelbiz's Motions for Summary Judgment, Dec. 22, 2014, Exhibit 34, a document bates labeled as NB0054980-NB0054989.

Declaration of Andrew P. MacArthur in Support of Nobelbiz's Motions for Summary Judgment, Dec. 22, 2014, Exhibit 35, a document bates labeled as NB0036018-NB0036023.

Declaration of Andrew P. MacArthur in Support of Nobelbiz's Motions for Summary Judgment, Dec. 22, 2014, Exhibit 36, a document bates labeled as GC06643 from bates range GC-006599-GC-006646 and designated Confidential Information/Attorneys' Eyes Only.

(56) References Cited

OTHER PUBLICATIONS

Declaration of Andrew P. MacArthur in Support of Nobelbiz's Motions for Summary Judgment, Dec. 22, 2014, Exhibit 37, a document bates labeled as GC-002456 and designated Confidential Attorneys' Eyes Only.

Declaration of Andrew P. MacArthur in Support of Nobelbiz's Motions for Summary Judgment, Dec. 22, 2014, Exhibit 38, a document bates labeled as GC-002434 from bates range GC-002172-GC-002454 and designated Confidential Information/Attorneys' Eyes Only.

Declaration of Andrew P. MacArthur in Support of Nobelbiz's Motions for Summary Judgment, Dec. 22, 2014, Exhibit 39, a document bates labeled as GC-002438-GC-002440 from the bates range GC-002172-GC-002454 and designated Confidential Information/Attorneys' Eyes Only.

Declaration of Andrew P. MacArthur in Support of Nobelbiz's Motions for Summary Judgment, Dec. 22, 2014, Exhibit 40, a document bates labeled as GC015648-GC015649 from the bates range GC-015326-GC-015651 and designated Confidential Information/Attorneys' Eyes Only.

Declaration of Andrew P. MacArthur in Support of Nobelbiz's Motions for Summary Judgment, Dec. 22, 2014, Exhibit 41, a document bates labeled as TCN213594 and designated Confidential—Attorneys' Eyes Only.

Declaration of Andrew P. MacArthur in Support of Nobelbiz's Motions for Summary Judgment, Dec. 22, 2014, Exhibit 42, a document bates labeled as TCN213583-TCN213585 and designated Confidential—Attorneys' Eyes Only.

Declaration of Andrew P. MacArthur in Support of Nobelbiz's Motions for Summary Judgment, Dec. 22, 2014, Exhibit 43, a document bates labeled as GC-000819.

Declaration of Andrew P. MacArthur in Support of Nobelbiz's Motions for Summary Judgment, Dec. 22, 2014, Exhibit 44, excerpts of Global Connect Answers & Objections NobelBiz 1st Set of Interrogatories (Nos. 1-11) dated Jun. 14, 2013.

Order, Dec. 22, 2014, *NobelBiz, Inc.* v. *Global Connect, L.L.C.* and *NobelBiz, Inc.* v. *T C N, Inc.*, 6:12-cv-244-RWS and 6:12-cv-247-RWS (E.D. Tex.).

Declaration of Dr. Arthur Brody in Support of Nobelbiz's Motions for Summary Judgment, Dec. 19, 2014, *NobelBiz, Inc.* v. *Global Connect, L.L.C.* and *NobelBiz, Inc.* v. *T C N, Inc.*, 6:12-cv-244-RWS and 6:12-cv-247-RWS (E.D. Tex.).

Declaration of Dr. Arthur Brody in Support of Nobelbiz's Motions for Summary Judgment, Dec. 19, 2014, Exhibit A, my Global Connect Infringement Report, including accompanying Exhibits 1-6, submitted in the Global Connect case. It is designated as Confidential under the Protective Order in this case.

Declaration of Dr. Arthur Brody in Support of Nobelbiz's Motions for Summary Judgment, Dec. 19, 2014, Exhibit B, my TCN Infringement Report, including accompanying Exhibits 1-5, submitted in the TCN case. It is designated as Confidential under the Protective Order in this case.

Declaration of Dr. Arthur Brody in Support of Nobelbiz's Motions for Summary Judgment, Dec. 19, 2014, Exhibit C, my Validity Report as to both Defendants, including accompanying Exhibits 1-7. It is designated as Confidential under the Protection Order in this case.

Declaration of Dr. Arthur Brody in Support of Nobelbiz's Motions for Summary Judgment, Dec. 19, 2014, Exhibit D, my Rebuttal Report as to both Defendants. It is designated as Confidential under the Protection Order in this case.

Nobelbiz's Brief in Support of Its Motion for Summary Judgment of No Inequitable Conduct, Infringement, No Invalidity, and No Unclean Hands, Dec. 22, 2014, *NobelBiz, Inc.* v. *Global Connect, L.L.C.* and *NobelBiz, Inc.* v. *T C N, Inc.*, 6:12-cv-244-RWS and 6:12-cv-247-RWS (E.D. Tex.).

Nobelbiz, Inc.'s Answer to Defendant Insidesales.Com, Inc.'s First Amended Counterclaim, Mar. 4, 2015, *NobelBiz, Inc.* v. *InsideSales.com, Inc.* 6:13-cv-00360-RWS (E.D. Tex.).

Reporter's Transcript of Pretrial Conference, May 14, 2015 *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.).

Reporter's Transcript of Pretrial Conference, Sealed Portion 1 (Dkt. 299), May 14, 2015 *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.).

Reporter's Transcript of Pretrial Conference, Sealed Portion 2 (Dkt 300), May 14, 2015 *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.).

Reporter's Transcript of Pretrial Conference, Sealed Portion 3 (Dkt 301), May 14, 2015 *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.).

Reporter's Transcript of Pretrial Conference, Sealed Portion 4 (Dkt 302), May 14, 2015 *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.).

Reporter's Transcript of Pretrial Conference, Sealed Portion 5 (Dkt 303), May 14, 2015 *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.).

Reporter's Transcript of Pretrial Conference, Sealed Portion 6 (Dkt 304), May 14, 2015 *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.).

Defendant's Mini Tutorial and Demonstrative Slides, May 14, 2015 Exhibit—Powerpoint slides utilized in pretrial conference of *Nobelbiz, Inc.* v. *Global Connect, L.L.C.* and *Nobelbiz, Inc.* v. *T C N, Inc.*, 6:12-cv-244-MHS and 6:12-cv-00247-MHS (Ed. Tex.) to the Honorable Robert W. Schroeder III.

Plaintiff's Demonstrative Slides, May 14, 2015 Exhibit—Powerpoint slides utilized in pretrial Hearing of *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.) to the Honorable Robert W. Schroeder III.

Supplementary Expert Report of Dewayne E. Perry, Ph.D, Regarding Invalidity of U.S. Pat. No. 8,135,122 and U.S. Pat. No. 8,565,399, in *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.), Sep. 18, 2013.

Reporter's Transcript of Pretrial Conference, Aug. 25, 2015 *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.).

Transcript of Jury Trial, Day 5, Sep. 14, 2015, Before the Honorable Robert W. Schroeder III, United States District Court in *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.).

Transcript of Jury Trial, Day 6, Sep. 15, 2015, Before the Honorable Robert W. Schroeder III, United States District Court in *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.).

Dr. Brody's Rule 26(a)(2) Rebuttal Report Pursuant to the Courts July 16th Order in *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.).

Dr. Brody's Powerpoint Slides Relating to Validity of the Patents in *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.), Sep. 18, 2013.

Dr. Perry's Powerpoint Slides Relating to Non-Infringement and Invalidity in *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.), Sep. 18, 2013.

Order re Summary Judgment Motions (Dkt. 310) in *Nobelbiz, Inc.* v. *Global Connect, L.L.C.* and *Nobelbiz, Inc.* v. *T C N, Inc.*, 6:12-cv-244-MHS and 6:12-cv-00247-MHS (Ed. Tex.), Sep. 18, 2013

Nobelbiz's Brief in Support of Its Renewed Motion to Strike and Preclude Defendants' Technical Expert, Dr. Dewayne Perry (Dkt. 313) in *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.), Sep. 18, 2013.

(56) References Cited

OTHER PUBLICATIONS

Nobelbiz's Brief in Support of Its Renewed Motion for Summary Judgment of No Invalidity.(Dkt. 314) in *Nobelbiz, Inc. v. Global Connect, L.L.C.* and *Nobelbiz, Inc.* v. *T C N, Inc.*, 6:12-cv-244-MHS and 6:12-cv-00247-MHS (E.D. Tex.), Sep. 18, 2013.

Defendants' Joint Opposition to Nobelbiz's Renewed Motion to Strike and Preclude Defendants' Technical Expert, Dr. Dewayne Perry (Dkt. 316) in *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.), Sep. 18, 2013.

Defendants' Joint Opposition to Nobelbiz's Renewed Motion for Summary Judgment of No Invalidity (Dkt. 317) in *Nobelbiz, Inc.* v. *Global Connect, L.L.C.* and *Nobelbiz, Inc.* v. *T C N, Inc.*, 6:12-cv-244-MHS and 6:12-cv-00247-MHS (Ed. Tex.), Sep. 18, 2013.

Nobelbiz's Reply Brief in Support of Its Renewed Motion to Strike and Preclude Defendants' Technical Expert, Dr. Dewayne Perry (dkt. 318) in *Nobelbiz, Inc.* v. *Global Connect, L.L.C.* and *Nobelbiz, Inc.* v. *T C N, Inc.*, 6:12-cv-244-MHS and 6:12-cv-MHS (E.D. Tex.), Sep. 18, 2013.

Nobelbiz's Reply Brief in Support of Its Renewed Motion for Summary Judgment of No Invalidity (Dkt. 319) in *Nobelbiz, Inc.* v. *Global Connect, L.L.C.* and *Nobelbiz, Inc* . v. *T C N, Inc.*, 6:12- cv-244-MHS and 6:12-cv-00247-MHS (Ed. Tex.), Sep. 18, 2013.

Defendants' Joint Surreply in Opposition to Nobelbiz's Renewed Motion to Strike and Preclude Defendants' Technical Expert, Dr. Dewayne Perry (Dkt. 320) in *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.), Sep. 18, 2013.

Defendants' Joint Surreply in Opposition to Nobelbiz's Renewed Motion for Summary Judgment of No Invalidity (Dkt. 321) in *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.), Sep. 18, 2013.

Order Re Summaryjudgment and in Limine Motions (Dkt. 329) in *Nobelbiz, Inc.* v. *Global Connect, L.L.C.* and *Nobelbiz, Inc.* v. *T C N, Inc.*, 6:12-cv-244-MHS and 6:12-cv-00247-MHS (E.D. Tex.), Sep 18, 2013.

Jury Verdict (Dkt. 350) in *Nobelbiz, Inc.* v. *Global Connect, L.L.C.* and *Nobelbiz, Inc.* v. *T C N, Inc.*, 6:12-cv-244-MHS and 6:12-cv-00247-MHS (F.D. Tex.), Sep. 18, 2013.

\* cited by examiner

Fig. 5

| Index | Column A | Column B | Column C |
|---|---|---|---|
| 1 | 954-444-0001 | 201-111-xxxx | 201-111-0001 |
| 2 | 954-444-0001 | 212-222-xxxx | 212-222-0001 |
| 3 | 954-444-0001 | 212-333-xxxx, Mon – Fri | 212-333-0001 |
| 4 | 954-444-0001 | 212-333-xxxx, Sat and Sun | 212-333-0002 |
| 5 | 954-444-0001 | 917-xxx-xxxx | 917-111-0001 |
| 6 | 998-111-0001 | 917-xxx-xxxx | 917-111-0001 |

SYSTEM AND METHOD FOR MODIFYING COMMUNICATION INFORMATION (MCI)

CROSS-REFERENCE TO RELATED APPLICATIONS

This application claims priority to and is a continuation of U.S. application Ser. No. 13/676,546, filed Nov. 14, 2012, now U.S. Pat. No. 8,565,399, which claims priority to and is a continuation of pending U.S. application Ser. No. 13/013,233, filed Jan. 25, 2011, which claims priority to and is a continuation of U.S. application Ser. No. 11/584,176, filed Oct. 20, 2006, now U.S. Pat. No. 7,899,169, which claims priority to U.S. provisional patent application Ser. No. 60/728,717, filed Oct. 20, 2005, entitled System and Method for Modifying Communication Information (MCI), the disclosures of which are incorporated herein by reference.

BACKGROUND OF THE INVENTION

In certain forms of communication, the party being contacted (the "Target") may have the opportunity to know information about the party attempting to originate a communication (the "Originator") before the Target interacts with the Originator. Two notable forms of communication where this is true are telephone and e-mail. In each of those forms of communication, the Target may learn some information about the Originator, such as the Originator's telephone number or email address, before the Target agrees to accept data or create a two-way communication, i.e. a conversation. The information the Target receives may also be used to allow the Target to identify or contact the Originator.

When an Originator, such as a telemarketing firm, wishes to contact a Target, such as an individual, via telephone, the Originator may insert into the caller ID field a telephone number where the Originator may be contacted. When making a call, the Originator inserts a telephone number used at the location from which the call originated, e.g. a call center. However, the Originator may call a Target in an area distant from the Originator. As a result, if the Target wishes to call back the Originator at the telephone number listed, e.g. to be put on a Do Not Call List (DNC) or to receive other information, the Target may have to pay long distance charges to do so. However, the Originator may operate telephone numbers that are a local call from the Target, or are at least closer to the Target, and therefore less expensive to call, than the Originator's telephone number that appears on the Target's caller ID.

Therefore, it would be desirable to implement a system to modify a communication from an Originator to provide a callback number or other contact information to the Target that may be closer to or local to the Target, in order to reduce or eliminate the payment of long distance toll charges in the event the Target dials the callback number.

SUMMARY OF THE INVENTION

The present disclosure relates to a method for processing a communication between a first party and a second party. A communication is received from the first party, the communication having first party information, and second party information. An entry in a database is identified that matches at least one of the first party information and the second party information and for which a predetermined rule is satisfied. A telephone number associated with the matching database entry is selected. The selected telephone number is transmitted to the second party.

BRIEF DESCRIPTION OF THE DRAWINGS

FIG. 5 is a example of a routing table according to an aspect of the system and method of the present disclosure.

DETAILED DESCRIPTION OF THE DRAWINGS

Figure 2:
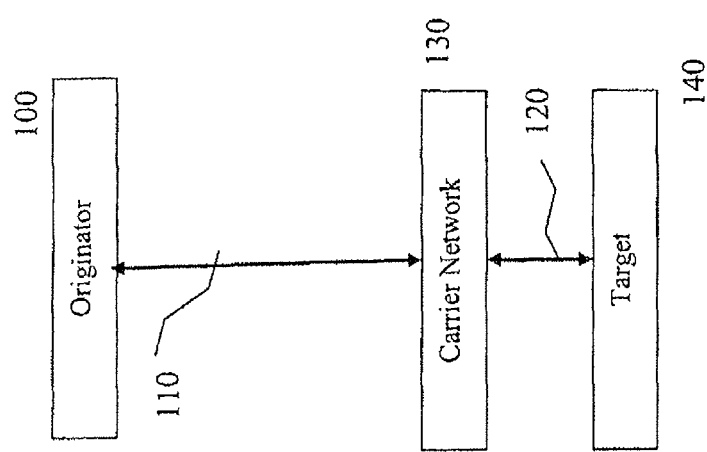
FIG. 2 is a view of an end-to-end telecommunication connection found in related art.

FIG. 2 is a view of an end-to-end contact as would occur during standard communication between Originator 100 (e.g. call center, person or organization) and Target 140 (e.g. a person or organization) using Carrier Network 130 (e.g. telecommunication provider). Information, such as Target 140 telephone number, may be transmitted from Originator 100 to Carrier Network 130 via physical/virtual connection 110 (e.g. phone line, voice T1, voice DS3) for an outbound call. Carrier Network 130 routes the call to Target 140 using, for example, a circuit switch, softswitch, or other routing intelligent system (not shown).

Figure 1:
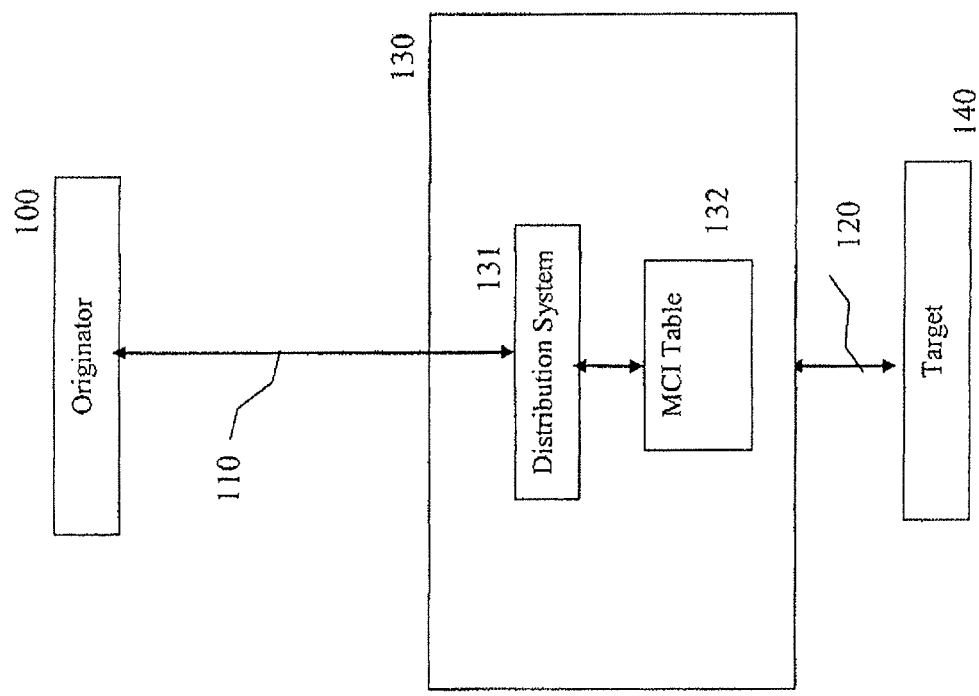
FIG. 1 is a view of an end-to-end telecommunication connection according to an aspect of the system and method of the present disclosure.

FIG. 1 illustrates aspects of the system of the present disclosure and includes Originator 100 which may transmit a call (including, e.g. sound and other data) through physical/virtual connection 110 to Target 140 through Carrier Network 130. Originator 100 may transmit data including signaling messages of telecommunication protocols (e.g., SS7, C7, ISDN, SIP, H.323, MGCP, MEGACO, IAX2) that may be used to identify or contact Originator 100. This may include caller ID information such as telephone number and subscriber name associated with Originator 100 telephone number.

Originator 100 may transmit Target Identifying Information, including Target 140 telephone number and other information via physical/virtual connection 110 to Carrier Network 130 for outbound calls. Target Identifying Information may include geographic location information about Target 140, which may be determined based on Caller ID of Target 140 in conjunction with telephone subscriber database information.

Carrier Network 130 may route the call to Distribution System 131 which may check each call for a trigger, such as information in the call or where the call originated from, such as which physical/virtual connection 110. Distribution System 131 may be a circuit switch, softswitch, or other routing intelligent system. Distribution System 131 may communicate with a table of data, such as, MCI Table 132, based on the trigger for the call. MCI Table 132 may be stored in a computer, server, database, flash memory or other computing storage device. Target 140 may receive information from the MCI Table 132 in the Caller ID field on received call via physical/virtual connection 120.

In one aspect, the system and method of the present disclosure may operate within or may be connected to Carrier Network 130. In other aspects, the system and method may operate in Originator's 100 PBX (e.g. corporate phone system, predictive dialer, call distribution system) or may be attached to or embedded within Originator's 100 communication device (e.g. telephone, VoIP phone, VoIP soft phone).

Figure 3:
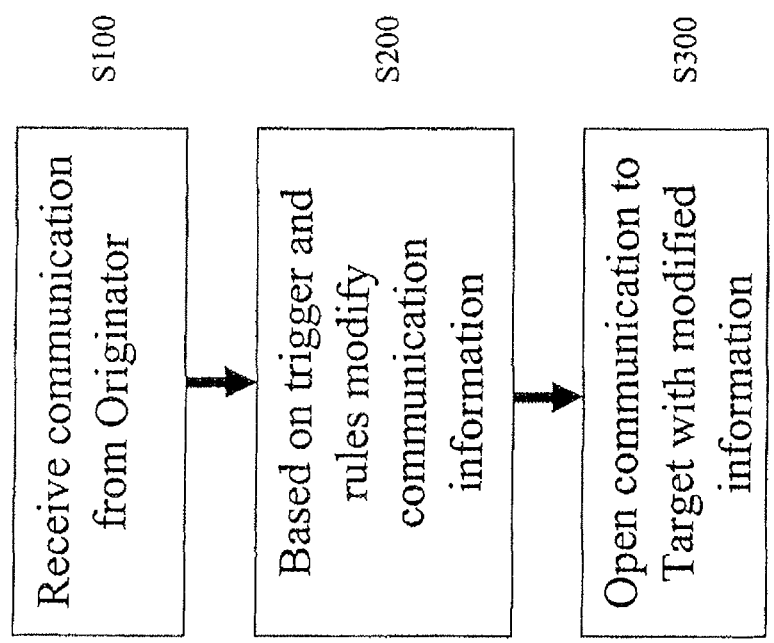
FIG. 3 is a process flow of communication traveling from Originator to Target according to an aspect of the system and method of the present disclosure.

FIG. 3 shows the process flow where in Step S100 a communication is received by Carrier Network 130 from Originator 100. In one aspect, the system of the present invention may receive from Originator 100 Target Identifying Information and a trigger. As described above, Target Identifying Information may include the telephone number of Target 140. A trigger may be one or more predetermined numbers in the Caller ID field, one or more predetermined numbers appended to the telephone number of Target 140 when transmitted by Originator 100, or may be another predetermined communication between Originator 100 and the system.

In Step S200, the system checks the communication for the existence of trigger information and Target Identifying Information, and, based on this information, the system may modify the communication. Rules and data used to modify the communication may be stored in a table database, such as MCI Table 132 shown in FIG. 5.

As shown in FIG. 5, MCI Table 132 column A is a list of triggers, column B is a list of Target Identifying Information, and column C is a list of modified information that may be displayed to Target 140.

When the system of the present disclosure receives a call from Originator 100, the system may check for one of the triggers located in column A to determine whether this communication may be modified. In one aspect, the system may be initiated manually, e.g. using a website, and may be used to process communications originating from a specific physical or virtual area, e.g. one or more telephone lines, so that any communication originating from one of these areas will be processed by the system. If the system does not receive a trigger or is not initiated manually, then the system may pass the communication on to Target 140 without modifying data.

If the system has been manually initiated or finds the communication contains a trigger listed in column A, the system may then search column B for one or more entries associated with the trigger in column A based on the Target Identifying Information included in the communication. Column B entries may be telephone numbers, portions of telephone numbers, street addresses or geographic designations, such as country, state, city, or township. Column B entries may also include rules indicating how or when they may be applied, for example, days of the week and/or times of day.

In one aspect, the system may search a telephone number in column B that matches Target 140 telephone number. In another aspect, if multiple column B entries for a given trigger match the area code of the Target 140 telephone number, the system may select the column B entry based on prefix. If there are no acceptable column B entries for a trigger, the system may pass the communication without alterations thereto.

In other aspects, column B entries may be selected based on predetermined Originator 100 preference, by geographic proximity to Target 140.

Based on the results of the search in column B, information in the communication may be modified to appear as what is shown in the corresponding entry in column C, i.e. the telephone number in column C may be displayed in the Caller ID field in the call to Target 140.

Using information in MCI Table 132 in FIG. 5, suppose for example, the system encounters a telephone call coming from Originator 100 telephone number 954-444-0001 that is made to Target 140 having telephone number 212-333-1234 on a weekday. The system may note the incoming caller ID field 954-444-0001 and attempt to match this to a trigger entry in column A. In this case, the number 954-444-0001 has five matches in column A, corresponding to table index entries A1 through A5. Once one or more acceptable entries are found in column A, the system may then compare Target ID information, in this case 212-333-1234, with one or more entries in column B corresponding to the one or more acceptable entries in column A.

In one aspect, the "x" character may be used as a wildcard to signify any character or number. Although not shown, such a wildcard character may also be used in elsewhere in the table.

In one aspect, the system may compare the Target ID information with the entries in column B by area code, prefix, and other rules, such as time of day. It will be clear to one of ordinary skill that the type, order and priority of such data comparison may be configurable.

Continuing the example, of the presently eligible entries 1-5 in column B, only entries 2, 3, and 4 match the area code "212" of the Target ID information, and of those, entries 3 and 4 match both the area code "212" and prefix "333" of the Target ID information. Column B entries 3 and 4 each contain a rule relating to the day of the week the call is made. In this example, because the call is placed on a weekday, column B entry 3 is the closest match to the Target ID information, and all rules of that entry are satisfied.

Based on this match in column B, the system may modify the communication to send an outbound Caller ID to Target 140 having the contents of entry 3 in column C, here 212-333-0001. Therefore, Target 140 may then make a return call to a local telephone number 212-333-0001 at a local area code (212), rather than potentially incurring long distance charges by making a return call to Originator 100 at a non-local number 954-444-0001 at a non-local area code (954).

In Step S300 the system then establishes the communication with Target 140 containing modified information.

Originator 100 may receive calls made to the telephone numbers listed in column C. Originator 100 may operate the telephone numbers listed in column C and/or calls to the telephone numbers in column C may be directed to telephone numbers used by Originator 100, in a manner described below with reference to FIG. 4.

Figure 4:
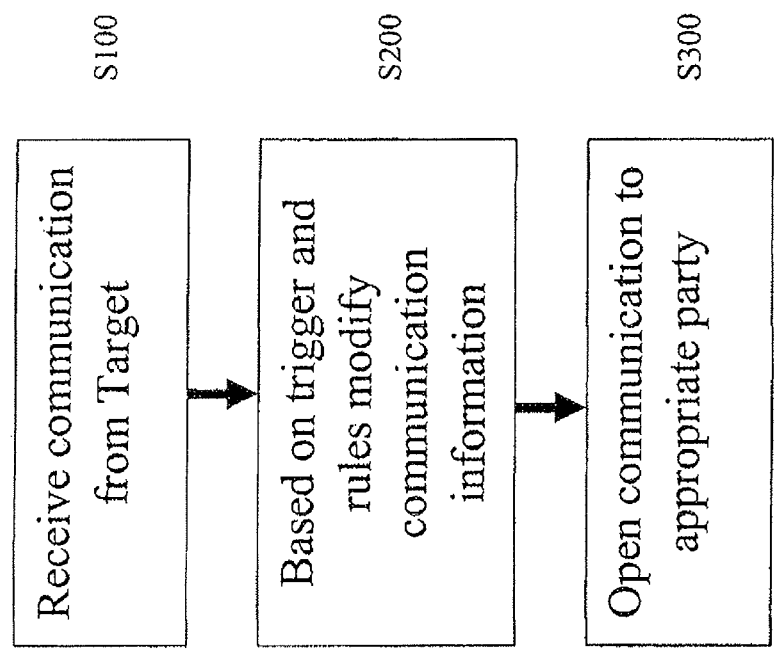
FIG. 4 is a process flow of communication traveling from Target to Originator according to an aspect of the system and method of the present disclosure.

FIG. 4 shows the process flow, according to an aspect of the invention, when a communication is initiated by Target 140 to Originator 100. The system may receive the communication from Target 140 in Step S100. In Step S200, based on a set of rules, Target Identifying Information and the telephone number Target 140 is calling, the system may modify and/or route the communication to Originator 100. Originator 100 may receive the communication at an inbound customer service center or voice recording, at a predetermined telephone number. When routing and/or modifying Target 140 call, the system may use a table.

In Step S300, the system sends the communication to the appropriate party. When the system routes a call from Target 140 to Originator 100, the system may pass any one of the following information to Originator 100: the telephone number of Target 140, the "trigger" number in column A associated with that telephone number, or other identifier correlated to the Target 140, such as geographic location of the Target 140. In addition, the system can forward the call from Target 140 to a telephone number, trunk line, IP address as a VoIP call, or any other form of return communication as predetermined rules dictate.

Although illustrative embodiments have been described herein in detail, it should be noted and will be appreciated by those skilled in the art that numerous variations may be made within the scope of this invention without departing from the principle of this invention and without sacrificing its chief advantages.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

What is claimed is:

1. A system for handling a plurality of outbound calls from a call originator using a private branch exchange to a plurality of call targets, the system comprising:
   a database storing a plurality of outgoing telephone numbers, each outgoing telephone number having one of two or more area codes; and
   the private branch exchange having an information processor configured to:
   a) process a first trigger comprising at least an area code of a first telephone number of a first call target;
   b) select from the database a first outgoing telephone number from the plurality of outgoing telephone numbers where the first outgoing telephone number has at least an area code the same as the area code of the telephone number of the first call target;
   c) set first caller identification data of a first outbound call to the first outgoing telephone number;
   d) originate the first outbound call and transmit the first caller identification data to the first call target in connection with the first outbound call;
   e) process a second trigger comprising at least an area code of a second telephone number of a second call target, the second telephone number having at least an area code different from the area code of the first telephone number of the first call target;
   f) select from the database a second outgoing telephone number from the plurality of outgoing telephone numbers where the second outgoing telephone number has at least an area code the same as the area code of the second telephone number of the second call target, the second outgoing telephone number having at least an area code different from the area code of the first telephone number of the first call target;
   g) set second caller identification data of a second outbound call to the second outgoing telephone number; and
   h) originate the second outbound call and transmit the second caller identification data to the second call target in connection with the second outbound call.

2. The system of claim 1, wherein two of the plurality of outgoing telephone numbers have the same area code but different prefixes.

3. The system of claim 1, wherein the private branch exchange is operated by the call originator.

4. The system of claim 1, wherein the first caller identification data is included in a first signaling message, and the second caller identification data is included in a second signaling message.

5. The system of claim 1, wherein the private branch exchange comprises one of a corporate phone system, a predictive dialer, and a call distribution system.

6. The system of claim 1, wherein the selected first outgoing telephone number has an area code and a prefix the same as an area code and a prefix of the first telephone number of the first call target.

7. The system of claim 1, wherein the selected first outgoing telephone number has an area code different from an area code of a telephone number of the call originator.

8. A private branch exchange comprising a computer for handling outbound calls from a call originator to first and second call targets, the computer comprising:
   memory having at least one region for storing computer executable program code; and
   the private branch exchange having a processor for executing the computer executable program code stored in the memory, where the computer executable program code comprises:
   a) code for processing at least a portion of a telephone number of the first call target;
   b) code for accessing a database storing a plurality of outgoing telephone numbers, each outgoing telephone number having one of two or more area codes;
   c) code for selecting from the database a first selected telephone number from the plurality of outgoing telephone numbers based on at least a portion of the telephone number of the first call target, the first selected telephone number having an area code from a geographic region the same as a geographic region of an area code of the telephone number of the first call target;
   d) code for setting caller identification data of the first outbound call to the first selected telephone number;
   e) code for originating the first outbound call and transmitting the caller identification data to the first call target in connection with the first outbound call;
   f) code for processing at least a portion of a telephone number of the second call target;
   g) code for accessing the database storing the plurality of outgoing telephone numbers;
   h) code for selecting from the database a second selected telephone number from the plurality of outgoing telephone numbers based on at least a portion of the telephone number of the second call target, the second selected telephone number having an area code from a geographic region the same as a geographic region of an area code of the telephone number of the second call target, the second selected telephone number having at least an area code different from the area code of the first telephone number of the first call target;
   i) code for setting caller identification data of the second outbound call to the second selected telephone number; and
   j) code for originating the second outbound call and transmitting the caller identification data to the second call target in connection with the second outbound call.

9. The computer of claim 8, wherein the geographic region is one of a state and other municipality smaller than a state.

10. The computer of claim 8, wherein the private branch exchange is operated by the call originator.

11. The computer of claim 8, wherein the caller identification data for the first call target is included in a first signaling message, and the caller identification data for the second call target is included in a second signaling message.

12. The computer of claim 8, wherein the private branch exchange comprises one of a corporate phone system, a predictive dialer, and a call distribution system.

13. A system for handling an outbound call from a call originator using a private branch exchange to a call target, the system comprising:
   a database storing a plurality of outgoing telephone numbers, wherein an area code of one outgoing telephone number is different from an area code of another outgoing telephone number; and
   the private branch exchange having an information processor controlled by the call originator and configured to:
   a) process a trigger comprising at least an area code of a telephone number of the call target;
   b) select from the database a telephone number from the plurality of outgoing telephone numbers where the selected telephone number has at least an area code the same as the area code of the telephone number of the call target;

c) set caller identification data of the outbound call to the selected telephone number; and d) originate the outbound call and transmit the set caller identification data to the call target in connection with the outbound call.

14. The system of claim 13, wherein the private branch exchange, is operated by the call originator.

15. The system of claim 13, wherein the caller identification data is included in a signaling message.

16. The system of claim 13, wherein the private branch exchange comprises one of a corporate phone system, a predictive dialer, and a call distribution system.

17. The system of claim 13, wherein the selected telephone number has an area code and a prefix the same as an area code and a prefix of the telephone number of the call target.

18. The system of claim 13, wherein the selected telephone number has an area code different from an area code of a telephone number of the call originator.

19. A computer for handling an outbound call from a call originator using a private branch exchange to a call target, the computer comprising:

memory having at least one region for storing computer executable program code; and the private branch exchange having a processor for executing the computer executable program code stored in the memory, where the computer executable program code comprises:

code for processing at least a portion of a telephone number of the call target;

code for accessing a database storing a plurality of outgoing telephone numbers, wherein an area code of one outgoing telephone number is different from an area code of another outgoing telephone number;

code for selecting from the database a telephone number from the plurality of outgoing telephone numbers based on at least a portion of the telephone number of the call target, the selected telephone number having an area code from a geographic region the same as a geographic region of an area code of the telephone number of the call target;

code for setting caller identification data of the outbound call to the selected telephone number; and code for originating the outbound call and transmitting the set caller identification data to the call target in connection with the outbound call.

20. The computer of claim 19, wherein the geographic region is one of a state and other municipality smaller than a state.

21. The computer of claim 19, wherein the private branch exchange, is operated by the call originator.

22. The computer of claim 19, wherein the caller identification data is included in a signaling message.

23. The computer of claim 19, wherein the private branch exchange comprises one of a corporate phone system, a predictive dialer, and a call distribution system.

24. A computer implemented method for handling an outbound call from a call originator using a private branch exchange to a call target comprising:

processing a trigger in the form of at least a portion of a telephone number of the call target;

accessing a database storing a plurality of outgoing telephone numbers, wherein an area code of one outgoing telephone number is different from an area code of another outgoing telephone number;

selecting from the database a telephone number from the plurality of outgoing telephone numbers based on at least a portion of the telephone number of the call target, the selected telephone number having an area code from a geographic region the same as a geographic region of an area code of the telephone number of the call target;

setting caller identification data of the outbound call to the selected telephone number; and originating the outbound call and transmitting the set caller identification data to the call target in connection with the outbound call.

25. The computer implemented method of claim 24, wherein the geographic region is one of a state and other municipality smaller than a state.

26. The computer implemented method of claim 24, wherein the private branch exchange is operated by the call originator.

27. The computer implemented method of claim 24, wherein the set caller identification data is included in a signaling message.

28. The computer implemented method of claim 24, wherein the private branch exchange comprises one of a corporate phone system, a predictive dialer, and a call distribution system.

* * * * *